United States Patent
Wu et al.

(10) Patent No.: US 11,750,326 B2
(45) Date of Patent: Sep. 5, 2023

(54) DATA RECEIVING METHOD, DATA SENDING METHOD, AND COMMUNICATIONS APPARATUS

(71) Applicant: HUAWEI TECHNOLOGIES CO., LTD., Guangdong (CN)

(72) Inventors: Ye Wu, Shanghai (CN); Xiaoyan Bi, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 375 days.

(21) Appl. No.: 17/147,837

(22) Filed: Jan. 13, 2021

(65) Prior Publication Data

US 2021/0135789 A1 May 6, 2021

Related U.S. Application Data

(63) Continuation of application No. PCT/CN2019/097928, filed on Jul. 26, 2019.

(30) Foreign Application Priority Data

Jul. 27, 2018 (CN) .......................... 201810844997.7

(51) Int. Cl.
*H04L 1/06* (2006.01)
*H04L 5/00* (2006.01)
(Continued)

(52) U.S. Cl.
CPC .......... *H04L 1/0668* (2013.01); *H04L 5/0048* (2013.01); *H04L 27/2613* (2013.01);
(Continued)

(58) Field of Classification Search
CPC . H04L 1/0668; H04L 5/0048; H04L 27/2613; H04L 1/0606; H04L 5/0023;
(Continued)

(56) References Cited

U.S. PATENT DOCUMENTS

| 2011/0170631 | A1* | 7/2011 | Kim | ...................... H04L 5/0007 375/296 |
| 2013/0064215 | A1* | 3/2013 | Gao | ...................... H04W 72/04 370/329 |

(Continued)

FOREIGN PATENT DOCUMENTS

| CN | 101483629 A | 7/2009 |
| CN | 102812766 A | 12/2012 |

(Continued)

*Primary Examiner* — Dady Chery
(74) *Attorney, Agent, or Firm* — Womble Bond Dickinson (US) LLP

(57) ABSTRACT

A terminal device receives a DMRS and data from a network device. The DMRS and the data undergo Alamouti coding in space domain and frequency domain, or the DMRS and the data undergo Alamouti coding in space domain and time domain, and a DMRS obtained through the Alamouti coding is mapped to a first DMRS port and a second DMRS port. A modulation symbol of the first DMRS port is related to a modulation symbol of the second DMRS port. The terminal device demodulates the data based on the DMRS. Therefore, the DMRS corresponds to a transmission scheme of the data, to help the terminal device demodulate the data. This can reduce interference estimation complexity of the terminal device.

20 Claims, 16 Drawing Sheets

(51) Int. Cl.
 *H04L 27/26* (2006.01)
 *H04W 72/0446* (2023.01)
 *H04W 72/0453* (2023.01)
 *H04W 72/23* (2023.01)

(52) U.S. Cl.
 CPC ... *H04W 72/0446* (2013.01); *H04W 72/0453* (2013.01); *H04W 72/23* (2023.01)

(58) Field of Classification Search
 CPC . H04L 5/0051; H04L 27/261; H04L 27/2601; H04W 72/0446; H04W 72/0453; H04W 72/23; H04B 7/068; H04B 7/0452; H04B 7/0456; H04B 7/0626
 See application file for complete search history.

(56) References Cited

U.S. PATENT DOCUMENTS

| | | |
|---|---|---|
| 2017/0331577 A1 | 11/2017 | Parkvall et al. |
| 2018/0145854 A1 | 5/2018 | Akkarakaran et al. |
| 2020/0389255 A1* | 12/2020 | Harrison .................. H04L 1/08 |

FOREIGN PATENT DOCUMENTS

| | | | |
|---|---|---|---|
| CN | 103220029 | A | 7/2013 |
| CN | 104349491 | A | 2/2015 |
| CN | 107645329 | A | 1/2018 |
| WO | 2018126446 | A1 | 7/2018 |

\* cited by examiner

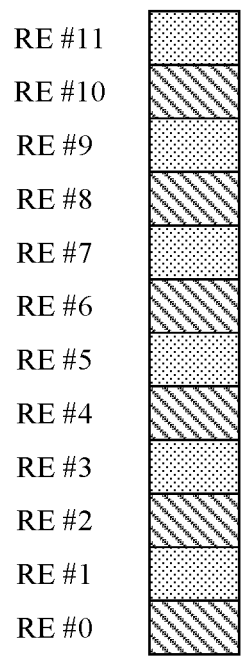
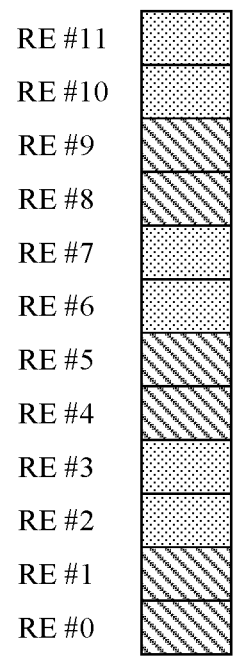
FIG. 2

| Subcarrier #11 | RE #11 | RE #23 |
| Subcarrier #10 | RE #10 | RE #22 |
| Subcarrier #9  | RE #9  | RE #21 |
| Subcarrier #8  | RE #8  | RE #20 |
| Subcarrier #7  | RE #7  | RE #19 |
| Subcarrier #6  | RE #6  | RE #18 |
| Subcarrier #5  | RE #5  | RE #17 |
| Subcarrier #4  | RE #4  | RE #16 |
| Subcarrier #3  | RE #3  | RE #15 |
| Subcarrier #2  | RE #2  | RE #14 |
| Subcarrier #1  | RE #1  | RE #13 |
| Subcarrier #0  | RE #0  | RE #12 |
|                | Symbol #0 | Symbol #1 |

(A) Type 1

| Subcarrier #11 | RE #11 | RE #23 |
| Subcarrier #10 | RE #10 | RE #22 |
| Subcarrier #9  | RE #9  | RE #21 |
| Subcarrier #8  | RE #8  | RE #20 |
| Subcarrier #7  | RE #7  | RE #19 |
| Subcarrier #6  | RE #6  | RE #18 |
| Subcarrier #5  | RE #5  | RE #17 |
| Subcarrier #4  | RE #4  | RE #16 |
| Subcarrier #3  | RE #3  | RE #15 |
| Subcarrier #2  | RE #2  | RE #14 |
| Subcarrier #1  | RE #1  | RE #13 |
| Subcarrier #0  | RE #0  | RE #12 |
|                | Symbol #0 | Symbol #1 |

(B) Type 2

FIG. 6

| Subcarrier #11 | RE #11 | RE #23 |
| Subcarrier #10 | RE #10 | RE #22 |
| Subcarrier #9 | RE #9 | RE #21 |
| Subcarrier #8 | RE #8 | RE #20 |
| Subcarrier #7 | RE #7 | RE #19 |
| Subcarrier #6 | RE #6 | RE #18 |
| Subcarrier #5 | RE #5 | RE #17 |
| Subcarrier #4 | RE #4 | RE #16 |
| Subcarrier #3 | RE #3 | RE #15 |
| Subcarrier #2 | RE #2 | RE #14 |
| Subcarrier #1 | RE #1 | RE #13 |
| Subcarrier #0 | RE #0 | RE #12 |
|  | Symbol #0 | Symbol #1 |

(A) Type 1

| Subcarrier #11 | RE #11 | RE #23 |
| Subcarrier #10 | RE #10 | RE #22 |
| Subcarrier #9 | RE #9 | RE #21 |
| Subcarrier #8 | RE #8 | RE #20 |
| Subcarrier #7 | RE #7 | RE #19 |
| Subcarrier #6 | RE #6 | RE #18 |
| Subcarrier #5 | RE #5 | RE #17 |
| Subcarrier #4 | RE #4 | RE #16 |
| Subcarrier #3 | RE #3 | RE #15 |
| Subcarrier #2 | RE #2 | RE #14 |
| Subcarrier #1 | RE #1 | RE #13 |
| Subcarrier #0 | RE #0 | RE #12 |
|  | Symbol #0 | Symbol #1 |

(B) Type 2

FIG. 7

DATA RECEIVING METHOD, DATA SENDING METHOD, AND COMMUNICATIONS APPARATUS

CROSS-REFERENCE TO RELATED APPLICATIONS

This application is a continuation of International Application No. PCT/CN2019/097928, filed on Jul. 26, 2019, which claims priority to Chinese Patent Application No. 201810844997.7, filed on Jul. 27, 2018. The disclosures of the aforementioned applications are hereby incorporated by reference in their entireties.

TECHNICAL FIELD

This application relates to the field of wireless communications, and more specifically, to a data receiving method, a data sending method, and a communications apparatus.

BACKGROUND

Currently, multi-user multiple-input multiple-output (MU-MIMO) can support transmission of different data between a network device and a plurality of terminal devices by using a same time-frequency resource. The terminal devices may perform channel estimation and data demodulation based on received demodulation reference signals (DMRS) to obtain data estimates.

However, with development of multiple-antenna technologies, a plurality of transmission schemes have been proposed to adapt to different channel environments. Therefore, a method is expected to help a terminal device demodulate data in different transmission schemes.

SUMMARY

This application provides a data receiving method, a sending method, and a communications apparatus to help a terminal device demodulate data.

According to a first aspect, a data receiving method is provided. The method includes: receiving a DMRS and data; and demodulating the data based on the DMRS to obtain an estimate of the data. The DMRS is mapped to a first DMRS port and a second DMRS port, and the DMRS occupies at least one first RE pair. In DMRS modulation symbols carried by each first RE pair, a modulation symbol mapped to the second DMRS port is obtained by performing Alamouti coding on a modulation symbol mapped to the first DMRS port. The data is mapped to a first data port and a second data port, and the data occupies at least one second RE pair. In data modulation symbols carried by each second RE pair, a modulation symbol mapped to the second data port is obtained by performing Alamouti coding on a modulation symbol mapped to the first data port. A plurality of REs in the first RE pair occupy different subcarriers, and a plurality of REs in the second RE pair occupy different subcarriers. Alternatively, a plurality of REs in the first RE pair occupy different symbols, and a plurality of REs in the second RE pair occupy different symbols.

The method provided in the first aspect may be performed by a terminal device, or may be performed by a chip configured in a terminal device, which is not limited in this application.

According to a second aspect, a data sending method is provided. The method includes: generating a DMRS and data; and sending the DMRS and the data. The DMRS is mapped to a first DMRS port and a second DMRS port, and the DMRS occupies at least one first RE pair. In DMRS modulation symbols carried by each first RE pair, a modulation symbol mapped to the second DMRS port is obtained by performing Alamouti coding on a modulation symbol mapped to the first DMRS port. The data is mapped to a first data port and a second data port, and the data occupies at least one second RE pair. In data modulation symbols carried by each second RE pair, a modulation symbol mapped to the second data port is obtained by performing Alamouti coding on a modulation symbol mapped to the first data port. A plurality of REs in the first RE pair occupy different subcarriers, and a plurality of REs in the second RE pair occupy different subcarriers. Alternatively, a plurality of REs in the first RE pair occupy different symbols, and a plurality of REs in the second RE pair occupy different symbols.

The method provided in the second aspect may be performed by a network device, or may be performed by a chip configured in a network device, which is not limited in this application.

Based on the foregoing technical solutions, when the network device processes the DMRS based on a data transmission scheme, such as SFTD or STTD, the DMRS and the data jointly undergo Alamouti coding in space domain and frequency domain, or Alamouti coding in space domain and time domain, so that a channel experienced by the DMRS is consistent with a channel experienced by the data. An equivalent channel matrix estimated by the terminal device based on the received DMRS is relatively accurate, thereby helping the terminal device demodulate the data.

In another aspect, when receiving the DMRS and the data (for example, which are respectively denoted as a first DMRS and first data), the terminal device may be interfered with by data transmission of another terminal device, for example, the terminal device may receive a DMRS and data (for example, which are respectively denoted as a second DMRS and second data) that are sent to another terminal device. When each communications device in a communications system transmits data, the DMRS and the data may undergo same processing in any transmission scheme regardless of what transmission scheme is used. Based on such a design, the terminal device may replace an equivalent channel matrix of the second data with an equivalent channel matrix estimated by using the second DMRS, and further estimate an interference and noise covariance matrix based on the received first DMRS and the received second DMRS, without considering a transmission scheme used by the another terminal device that causes the interference. Therefore, on a premise of ensuring demodulation performance, the interference and noise covariance matrix may be determined based on a transmission scheme used by the terminal device to transmit data, for further data demodulation, with no need to traverse various transmission schemes to blindly detect the transmission scheme used by the another terminal device that causes the interference, and no need to consider a transmission scheme used by another terminal device. This can greatly reduce interference estimation complexity of the terminal device, thereby further reducing demodulation complexity.

In an embodiment, the method further includes: receiving first indication information, where the first indication information is used to indicate a type of a pilot pattern.

In an embodiment, the method further includes: sending first indication information, where the first indication information is used to indicate a type of a pilot pattern.

In the embodiments of this application, the pilot pattern is a DMRS pattern. The terminal device may determine, based on the type of the pilot pattern indicated by the network device, REs occupied by the first DMRS, and may further receive the first DMRS on the corresponding REs.

In an embodiment, the method further includes: receiving second indication information, where the second indication information is used to indicate a data transmission scheme.

In an embodiment, the method further includes: sending second indication information, where the second indication information is used to indicate a data transmission scheme.

It may be understood that the data transmission scheme indicated by the second indication information is a transmission scheme of the first data. The terminal device may estimate a channel matrix based on the first DMRS and the transmission scheme of the first data indicated by the network device, so as to demodulate the data.

According to a third aspect, a data sending method is provided. The method includes: generating a DMRS and data; and sending the DMRS and the data. The DMRS is mapped to a third DMRS port and a fourth DMRS port, and the DMRS occupies at least one first RE pair. In DMRS modulation symbols carried by each first RE pair, a modulation symbol mapped to the fourth DMRS port is obtained by performing Alamouti coding on a modulation symbol mapped to the third DMRS port. The data is mapped to a third data port and a fourth data port, and the data occupies at least one second RE pair. In data modulation symbols carried by each second RE pair, a modulation symbol mapped to the fourth data port is obtained by performing Alamouti coding on a modulation symbol mapped to the third data port. A plurality of REs in the first RE pair occupy different subcarriers, and a plurality of REs in the second RE pair occupy different subcarriers. Alternatively, a plurality of REs in the first RE pair occupy different symbols, and a plurality of REs in the second RE pair occupy different symbols.

The method provided in the third aspect may be performed by a terminal device, or may be performed by a chip configured in a terminal device, which is not limited in this application.

According to a fourth aspect, a data receiving method is provided. The method includes: receiving a DMRS and data; and demodulating the data based on the DMRS to obtain an estimate of the data. The DMRS is mapped to a third DMRS port and a fourth DMRS port, and the DMRS occupies at least one first RE pair. In DMRS modulation symbols carried by each first RE pair, a modulation symbol mapped to the fourth DMRS port is obtained by performing Alamouti coding on a modulation symbol mapped to the third DMRS port. The data is mapped to a third data port and a fourth data port, and the data occupies at least one second RE pair. In data modulation symbols carried by each second RE pair, a modulation symbol mapped to the fourth data port is obtained by performing Alamouti coding on a modulation symbol mapped to the third data port. A plurality of REs in the first RE pair occupy different subcarriers, and a plurality of REs in the second RE pair occupy different subcarriers. Alternatively, a plurality of REs in the first RE pair occupy different symbols, and a plurality of REs in the second RE pair occupy different symbols.

The method provided in the fourth aspect may be performed by a network device, or may be performed by a chip configured in a network device, which is not limited in this application.

Based on the foregoing technical solutions, when the terminal device processes the DMRS based on a data transmission scheme, such as SFTD or STTD, the DMRS and the data jointly undergo Alamouti coding in space domain and frequency domain, or Alamouti coding in space domain and time domain, so that a channel experienced by the DMRS is consistent with a channel experienced by third data. An equivalent channel matrix estimated by the network device based on the received DMRS is relatively accurate, thereby helping the network device demodulate first data.

In another aspect, when receiving the DMRS and the data (for example, which are respectively denoted as a third DMRS and third data), the network device may be interfered with by data transmission from another terminal device to the network device or to still another terminal device, for example, the network device may receive a DMRS and data (for example, which are respectively denoted as a fourth DMRS and fourth data) that are sent by another terminal device. When each communications device in a communications system transmits data, the DMRS and the data may undergo same processing in any transmission scheme regardless of what transmission scheme is used. Based on such a design, the network device may replace an equivalent channel matrix of the fourth data with an equivalent channel matrix estimated by using the fourth DMRS, and further estimate an interference and noise covariance matrix based on the received third DMRS and the received fourth DMRS, without considering a transmission scheme used by the another terminal device that causes the interference. Therefore, on a premise of ensuring demodulation performance, the interference and noise covariance matrix may be determined based on a transmission scheme used by the network device to transmit data, for further data demodulation, with no need to traverse various transmission schemes to blindly detect the transmission scheme used by the another terminal device that causes the interference, and no need to consider a transmission scheme used by another terminal device. This can greatly reduce interference estimation complexity of the network device, thereby further reducing demodulation complexity.

In an embodiment, the method further includes: receiving third indication information, where the third indication information is used to indicate a data transmission scheme.

In an embodiment, the method further includes: sending third indication information, where the third indication information is used to indicate a data transmission scheme.

It may be understood that, the transmission scheme indicated by the third indication information is a transmission scheme of the third data. The terminal device may generate, based on the transmission scheme of the third data indicated by the network device, a modulation symbol of the third DMRS that is mapped to the third DMRS port and a modulation symbol of the third data that is mapped to the third data port.

In an embodiment, the method further includes: receiving fourth indication information, where the fourth indication information is used to indicate a type of a pilot pattern.

In an embodiment, the method further includes: sending fourth indication information, where the fourth indication information is used to indicate a type of a pilot pattern.

In the embodiments of this application, the pilot pattern is a DMRS pattern. The terminal device may determine, based on the type of the pilot pattern indicated by the network device, REs occupied by the third DMRS, and may generate, based on the type of the DMRS pattern, a modulation symbol of the third DMRS that is mapped to the fourth DMRS port, and further generate a modulation symbol of the third data that is mapped to the fourth data port.

In an embodiment, when the data transmission scheme is SFTD, the DMRS and the data may jointly undergo Alamouti coding in space domain and frequency domain.

In an embodiment, each first RE pair includes a first RE and a second RE. The first RE and the second RE in each first RE pair are consecutive in frequency domain; or the first RE and the second RE in each first RE pair are separated by at least one subcarrier in frequency domain.

A manner of arranging the first RE and the second RE in frequency domain may be determined by the DMRS pattern. The foregoing two manners of arranging the first RE and the second RE in frequency domain may correspond to types 1 and 2 of DMRS patterns defined in an NR protocol. However, it should be understood that the foregoing manners of arranging the first RE and the second RE in frequency domain are merely examples, and shall not constitute any limitation on this application. This application does not rule out a possibility of defining more DMRS patterns in a future protocol.

In an embodiment, each second RE pair includes a third RE and a fourth RE, and the third RE and the fourth RE in each second RE pair are consecutive in frequency domain; or the third RE and the fourth RE in each second RE pair are separated by at least one subcarrier in frequency domain.

A manner of arranging the third RE and the fourth RE in frequency domain may be determined by a data mapping manner. The manner of arranging the third RE and the fourth RE in frequency domain may be the same as or different from the manner of arranging the first RE and the second RE in frequency domain. This application sets no limitation thereto. The foregoing lists two possible manners of arranging the third RE and the fourth RE in frequency domain as examples, which however shall not constitute any limitation on this application. This application does not rule out a possibility of defining more data mapping manners in a future protocol.

In an embodiment, a quantity of subcarriers between the third RE and the fourth RE in each second RE pair is the same as a quantity of subcarriers between the first RE and the second RE in each first RE pair.

When a channel experienced by the second RE pair in frequency domain is consistent with that experienced by the first RE pair in frequency domain, the equivalent channel matrix estimated based on the received first DMRS is relatively accurate. Therefore, when the quantity of subcarriers between the third RE and the fourth RE in the second RE pair is the same as the quantity of subcarriers between the first RE and the second RE in the first RE pair, the equivalent channel matrix estimated by using the first DMRS is relatively accurate, and therefore receiving quality of the first data can be improved.

In an embodiment, when the data transmission scheme is SFTD, the DMRS and the data may jointly undergo Alamouti coding in space domain and frequency domain.

In an embodiment, each first RE pair includes a first RE and a second RE. The first RE and the second RE in each first RE pair are consecutive in time domain; or the first RE and the second RE in each first RE pair are separated by at least one symbol in time domain.

A manner of arranging the first RE and the second RE in time domain may be determined by the DMRS pattern. The foregoing lists two manners of arranging the first RE and the second RE in time domain, which shall not constitute any limitation on this application. This application does not rule out a possibility of defining more DMRS patterns in a future protocol.

In an embodiment, the second RE pair includes a third RE and a fourth RE. The third RE and the fourth RE in each second RE pair are consecutive in time domain; or the third RE and the fourth RE in each second RE pair are separated by at least one symbol in time domain.

A manner of arranging the third RE and the fourth RE in time domain may be determined by a data mapping manner. The manner of arranging the third RE and the fourth RE in time domain may be the same as or different from the manner of arranging the first RE and the second RE in time domain. This application sets no limitation thereto. The foregoing lists two possible manners of arranging the third RE and the fourth RE in time domain as examples, which shall not constitute any limitation on this application. This application does not rule out a possibility of defining more data mapping manners in a future protocol.

In an embodiment, a quantity of symbols between the third RE and the fourth RE in each second RE pair is the same as a quantity of symbols between the first RE and the second RE in each first RE pair.

When a channel experienced by the second RE pair in time domain is consistent with that experienced by the first RE pair in time domain, the equivalent channel matrix estimated based on the received first DMRS is relatively accurate. Therefore, when the quantity of orthogonal frequency-division multiplexing (OFDM) symbols between the third RE and the fourth RE in the second RE pair is the same as the quantity of OFDM symbols between the first RE and the second RE in the first RE pair, the equivalent channel matrix estimated by using the first DMRS is relatively accurate, and therefore receiving quality of the data can be improved.

According to a fifth aspect, a communications apparatus is provided, including modules or units configured to perform the method in the first aspect or the third aspect or any possible implementation of the first aspect or the third aspect.

According to a sixth aspect, a communications apparatus is provided, including a processor. The processor is coupled to a memory, and may be configured to execute an instruction in the memory, so as to implement the method in the first aspect or the third aspect or any possible implementation of the first aspect or the third aspect. In an embodiment, the communications apparatus further includes a memory. In an embodiment, the communications apparatus further includes a communications interface, and the processor is coupled to the communications interface.

In an embodiment, the communications apparatus is a terminal device. When the communications apparatus is a terminal device, the communications interface may be a transceiver or an input/output interface.

In another embodiment, the communications apparatus is a chip configured in a terminal device. When the communications apparatus is a chip configured in a terminal device, the communications interface may be an input/output interface.

In an embodiment, the transceiver may be a transceiver circuit. In an embodiment, the input/output interface may be an input/output circuit.

According to a seventh aspect, a communications apparatus is provided, including modules or units configured to perform the method in the second aspect or the fourth aspect or any possible implementation of the second aspect or the fourth aspect.

According to an eighth aspect, a communications apparatus is provided, including a processor. The processor is coupled to a memory, and may be configured to execute an instruction in the memory, so as to implement the method in the second aspect or the fourth aspect or any possible implementation of the second aspect or the fourth aspect. In an embodiment, the communications apparatus further includes a memory. In an embodiment, the communications apparatus further includes a communications interface, and the processor is coupled to the communications interface.

In an embodiment, the communications apparatus is a network device. When the communications apparatus is a network device, the communications interface may be a transceiver or an input/output interface.

In another embodiment, the communications apparatus is a chip configured in a network device. When the communications apparatus is a chip configured in a network device, the communications interface may be an input/output interface.

In an embodiment, the transceiver may be a transceiver circuit. In an embodiment, the input/output interface may be an input/output circuit.

According to a ninth aspect, a processor is provided, including an input circuit, an output circuit, and a processing circuit. The processing circuit is configured to receive a signal by using the input circuit, and transmit a signal by using the output circuit, so that the processor performs the method in any one of the first aspect to the fourth aspect and the possible implementations of the first aspect to the fourth aspect.

In an embodiment, the processor may be a chip, the input circuit may be an input pin, the output circuit may be an output pin, and the processing circuit may be a transistor, a gate circuit, a trigger, various logic circuits, and the like. An input signal received by the input circuit may be received and then input by, for example, but not limited to, a receiver. A signal output by the output circuit may be output to and then transmitted by, for example, but not limited to, a transmitter. The input circuit and the output circuit may be a same circuit. The circuit is separately used as the input circuit and the output circuit at different moments. This application sets no limitation on specific implementations of the processor and various circuits.

According to a tenth aspect, a processing apparatus is provided, including a processor and a memory. The processor is configured to read an instruction stored in the memory, and may receive a signal by using a receiver and transmit a signal by using a transmitter, so as to perform the method in any one of the first aspect to the fourth aspect and the possible implementations of the first aspect to the fourth aspect.

In an embodiment, there are one or more such processors, and one or more such memories.

In an embodiment, the memory may be integrated with the processor, or the memory may be disposed separately from the processor.

In an embodiment, the memory may be a non-transitory memory, for example, a read-only memory (ROM). The memory and the processor may be integrated on a same chip, or may be separately disposed on different chips. The embodiments of this application set no limitation on a type of the memory or a manner of disposing the memory and the processor.

It should be understood that, a related data interaction process such as indication information sending may be a process of outputting indication information from the processor, and a related data interaction process such as capability information receiving may be a process of receiving input capability information by the processor. Specifically, data output by the processor may be output to the transmitter, and input data received by the processor may come from the receiver. The transmitter and the receiver may be collectively referred to as a transceiver.

The processing apparatus in the tenth aspect may be a chip. The processor may be implemented by hardware or software. When implemented by hardware, the processor may be a logic circuit, an integrated circuit, or the like. When implemented by software, the processor may be a general-purpose processor, and is implemented by reading software code stored in the memory. The memory may be integrated into the processor, or may be located outside the processor and exist independently.

According to an eleventh aspect, a computer program product is provided. The computer program product includes a computer program (also referred to as code or an instruction). When the computer program runs, a computer is enabled to perform the method in any one of the first aspect to the fourth aspect and the possible implementations of the first aspect to the fourth aspect.

According to a twelfth aspect, a computer-readable medium is provided. The computer-readable medium stores a computer program (also referred to as code or an instruction). When the computer program runs on a computer, the computer is enabled to perform the method in any one of the first aspect to the fourth aspect and the possible implementations of the first aspect to the fourth aspect.

According to a thirteenth aspect, a communications system is provided, including the foregoing network device and terminal device.

It should be understood that Alamouti coding in this application may be understood as a common Alamouti coding manner, or may be understood as a name for ease of description. A coding calculation manner or a result or both of Alamouti coding in this application conform to characteristics of an Alamouti coding manner. For example, Alamouti coding in this application may be a specific coding manner or its reasonable variant that meets a description process of the foregoing embodiments, or may be a reasonable variant of the Alamouti coding manner or another coding manner that has a same result.

In the embodiments of this application, Alamouti coding is used as an example to describe in detail a specific process of generating a DMRS sequence and data. However, this does not necessarily mean that characteristics of the DMRS sequence and the data described in the foregoing embodiments can be obtained only through Alamouti coding.

BRIEF DESCRIPTION OF DRAWINGS

FIG. 2 is a schematic diagram of two types of demodulation reference signal (demodulation reference signal, DMRS) patterns defined in an NR protocol;

FIG. 6 to FIG. 9 are schematic diagrams of mapping a first DMRS and first data to a time-frequency resource according to an embodiment of this application;

DESCRIPTION OF EMBODIMENTS

The following describes technical solutions of this application with reference to accompanying drawings.

The technical solutions of the embodiments of this application may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a future 5th generation (5G) system or a New Radio (NR) system.

Figure 1:
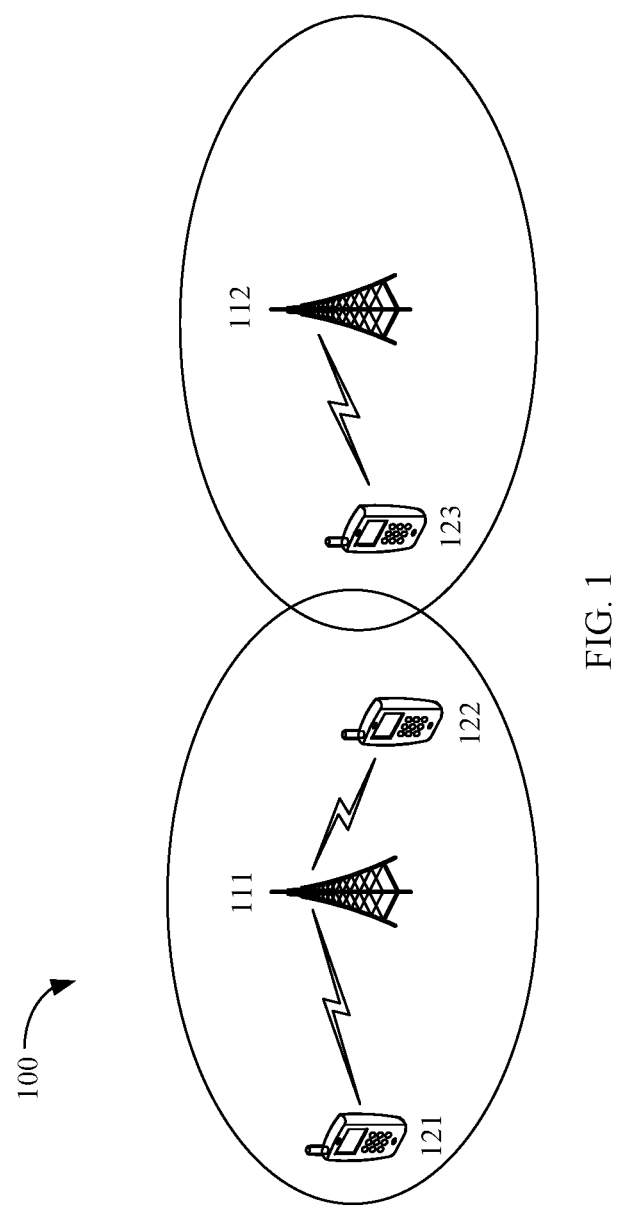
FIG. 1 is a schematic diagram of a wireless communications system applicable to an embodiment of this application.

For ease of understanding the embodiments of this application, a communications system shown in FIG. 1 is first used as an example to describe in detail the communications systems applicable to the embodiments of this application. FIG. 1 is a schematic diagram of a wireless communications system 100 applicable to an embodiment of this application. As shown in the figure, the wireless communications system 100 may include at least one network device, such as network devices 111 and 112 shown in FIG. 1. The wireless communications system 100 may further include at least one terminal device, such as terminal devices 121 to 123 shown in FIG. 1. A plurality of antennas may be configured for each of the network devices and the terminal devices, and the network devices and the terminal devices may communicate with each other by using a multi-antenna technology.

In an embodiment, the network device 111 may be a network device in cell #1, or the network device 111 may serve a terminal device (for example, the terminal device 121) in cell #1. The network device 112 may be a network device in cell #2, or the network device 112 may serve a terminal device (for example, the terminal device 122) in cell #2.

It should be noted that, a cell may be understood as a serving cell of a network device, that is, an area within coverage of a wireless network of the network device. In this application, the network device 111 in cell #1 and the network device 112 in cell #2 may be different network devices, for example, base stations. In other words, cell #1 and cell #2 may be managed by different base stations. Alternatively, the network device 111 in cell #1 and the network device 112 in cell #2 may be different radio frequency processing units of a same base station, for example, radio remote units (radio remote unit, RRU). In other words, cell #1 and cell #2 may be managed by a same base station, and have a same baseband processing unit and a same intermediate frequency processing unit but different radio frequency processing units. This application sets no specific limitation thereto.

It should be understood that the network device in the wireless communications system may be any device that has a wireless transceiver function. The network device includes but is not limited to: an evolved NodeB (eNB), a radio network controller (RNC), a NodeB (Node B, NB), a base station controller (BSC), a base transceiver station (BTS), a home base station (for example, a home evolved NodeB or a home Node B, HNB), a baseband unit (BBU), an access point (AP), a wireless relay node, a wireless backhaul node, a transmission point (TP), or a transmission and reception point (TRP) in a Wireless Fidelity (Wi-Fi) system, a gNB or a transmission point (a TRP or a TP) in a 5G system, for example, an NR system, one or a group of antenna panels (including a plurality of antenna panels) of a base station in a 5G system, or a network node, for example, a baseband unit (BBU) or a distributed unit (DU) or the like that constitutes a gNB or a transmission point.

In some deployments, a gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a Packet Data Convergence Protocol (PDCP) layer, and the DU implements functions of a radio link control (RLC) layer, a Media Access Control (MAC) layer, and a physical (PHY) layer. Information at the RRC layer eventually becomes information at the PHY layer, or may be converted from information at the PHY layer. Therefore, in this architecture, it may be considered that higher layer signaling such as RRC layer signaling is sent by the DU or by both the DU and the CU. It may be understood that the network device may be a CU node, a DU node, or a device including a CU node and a DU node. In addition, the CU may be classified into a network device in a radio access network (RAN), or may be classified into a network device in a core network (CN). This is not limited in this application.

It should further be understood that, the terminal device in the wireless communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer with a wireless transceiver function, a virtual reality (VR) terminal device, an augmented reality (augmented reality, AR) terminal device, a wireless terminal in industrial control (industrial control), a wireless terminal in self driving, a wireless terminal in remote medical (remote medical), a wireless terminal in a smart grid, a wireless terminal in transportation safety (transportation safety), a wireless terminal in a smart city, a wireless terminal in a smart home, or the like. An application scenario is not limited in the embodiments of this application.

In an example of downlink transmission, a network device may communicate with a plurality of terminal devices by using a same time-frequency resource in a same cell. For example, in cell #1, the network device 111 may communicate with the terminal device 121 and the terminal device 122 by using a same time-frequency resource. A network device may also communicate with a plurality of terminal devices by using a same time-frequency resource in two adjacent cells. For example, in cell #1, a time-frequency resource used by the network device 111 to communicate with the terminal device 122 is the same as a time-frequency resource used by the network device 112 to communicate with the terminal device 123.

Therefore, when receiving data sent by a network device, a terminal device needs to perform interference estimation, so as to accurately demodulate the data sent to the terminal device.

With development of MIMO technologies, a plurality of transmission schemes have been proposed at present, for example, closed loop spatial multiplexing (CLSM), transmit diversity (TD), and the like. The transmit diversity may include but is not limited to space-frequency transmit diversity (SFTD, also referred to as space frequency block coding (SFBC)), space time transmit diversity (STTD, also referred to as space time block coding (STBC)), and RE-level precoding cycling.

During interference estimation, if a terminal device cannot know in advance a transmission scheme used by another terminal device, the terminal device may need to traverse various transmission schemes in a blind detection manner to perform interference estimation and demodulation. This greatly increases interference estimation complexity and demodulation complexity of the terminal device.

In view of this, this application provides a data sending method and a receiving method, which can reduce interference estimation complexity and demodulation complexity of a terminal device.

Before the embodiments of this application are described, several terms related in this application are first briefly introduced:

1. Resource element (RE): One RE may occupy one symbol in time domain and one subcarrier in frequency domain.

2. Resource block (RB): One RB occupies $N_{SC}^{RB}$ consecutive subcarriers in frequency domain and $N_{symbol}^{RB}$ consecutive symbols in time domain. $N_{SC}^{RB}$ and $N_{symbol}^{RB}$ both are positive integers. For example, $N_{SC}^{RB}$ may be equal to 12, and $N_{symbol}^{RB}$ may be equal to 7 in an LTE protocol; and $N_{SC}^{RB}$ may be equal to 12, and $N_{symbol}^{RB}$ may be equal to 14 in an NR protocol. An RB may be an example of a resource unit in the embodiments of this application.

3. Symbol: a minimum time-domain resource unit. A time length of one symbol is not limited in the embodiments of this application. The length of one symbol may vary with a subcarrier spacing. Symbols may include an uplink symbol and a downlink symbol. As an example instead of a limitation, the uplink symbol may be referred to as a single carrier frequency division multiple access (SC-FDMA) symbol or an orthogonal frequency division multiplexing (OFDM) symbol; and the downlink symbol may be referred to as an OFDM symbol.

4. Resource unit: A resource unit may be used as a unit for measuring resources occupied in time and frequency domains. In the embodiments of this application, resource units may include, for example, an RB, a resource block group (RBG) including one or more RBs, one or more RB pairs, a half RB, a ¼ RB, and an RE group including one or more REs. In an NR protocol, one RB may include 12 consecutive subcarriers in frequency domain and 14 consecutive symbols in time domain. It should be understood that, the foregoing examples are merely example descriptions, and shall not constitute any limitation on this application.

5. Slot: A slot is a minimum scheduling unit of time in NR. In one slot format, 14 OFDM symbols are included, and a CP of each OFDM symbol is a normal CP. In another slot format, 12 OFDM symbols are included, and a CP of each OFDM symbol is an extended CP. In still another slot format, 7 OFDM symbols are included, and a CP of each OFDM symbol is a normal CP. OFDM symbols in one slot may all be used for uplink transmission or may all be used for downlink transmission, or some of the OFDM symbols in one slot may be used for downlink transmission, some may be used for uplink transmission, and some may be reserved and not used for transmission. It should be understood that, the foregoing examples are merely example descriptions, and shall not constitute any limitation on this application. For consideration of system forward compatibility, a slot format is not limited to the foregoing examples.

6. Transmission scheme: also referred to as a transmission manner. A transmission scheme may be used to represent a technical solution used for data transmission. It should be understood that, "transmission scheme" is only a name used to represent a technical solution used for data transmission in an LTE protocol and an NR protocol. This application does not rule out a possibility of replacing "transmission scheme" with another name in a future protocol.

7. Spatial multiplexing: When wireless channel quality is good and a rank of a channel matrix is greater than 1, a MIMO system may send a plurality of channels of data in parallel by using a plurality of transmit antennas and a plurality of receive antennas, and the plurality of channels of data sent in parallel are different, thereby increasing a data transmission throughput.

8. Closed loop spatial multiplexing: also referred to as transmission scheme 1 (TS1) in an NR protocol. To transmit a plurality of data streams in parallel, a transmit end may determine a corresponding precoding matrix based on CSI of a downlink channel, in particular, a PMI and an RI, and then precode the plurality of to-be-transmitted data streams separately before transmitting them. It should be noted that, closed-loop spatial multiplexing further includes transmitting one data stream by using only one antenna port.

The CSI of the downlink channel may be fed back by a receive end based on a reference signal. Alternatively, the transmit end may obtain the CSI of the downlink channel by measuring an uplink channel based on reciprocity between the uplink channel and the downlink channel. Alternatively, the CSI of the downlink channel may be obtained by combining feedback from a receive end with reciprocity between an uplink channel and the downlink channel. This application sets no limitation thereto.

9. Transmit diversity: When wireless channel quality is poor or there is only one receive antenna at a receive end, a MIMO system may send a plurality of channels of same data in parallel by using a plurality of transmit antennas, thereby improving data transmission reliability. Diversity means dividing one channel of signal into a plurality of channels of signals, and sending the signals at different moments, at different frequencies, or in different spaces, so that a receive end combines the plurality of channels of signals in a centralized manner. When deep fading occurs on some signals, fading of some other signals may be relatively shallow, and a probability that deep fading occurs simultaneously on all channels of signals is relatively low. Therefore, a probability that deep fading occurs on a combined signal is greatly reduced. In other words, transmit diversity may be understood as using a plurality of signals with independent fading to reduce the probability that deep fading occurs on a combined signal, thereby facilitating acquisition of a diversity gain.

Sending a plurality of channels of signals at different moments may be referred to as time diversity. Sending a plurality of channels of signals at different frequencies may be referred to as frequency diversity. Sending a plurality of channels of signals in different spaces may be referred to as space diversity.

10. Space frequency block coding: It is a space-frequency transmit diversity scheme proposed by combining space diversity and frequency diversity. At least two symbol streams may be obtained after modulated symbol streams undergo layer mapping and Alamouti coding. Then, the at least two symbol streams are precoded and transmitted.

Specifically, it is assumed that the modulated symbol streams are $s_2$ and $s_1$. After layer mapping, the modulated symbol streams may be mapped to at least two layers, and the layer-mapped symbol streams may be represented as, for example, $$\begin{bmatrix} s_1 \\ s_2 \end{bmatrix}.$$

In this case, two symbol streams obtained by performing Alamouti coding on the two layer-mapped symbol streams in space domain and frequency domain may be represented as $$\begin{bmatrix} s_1 & -s_2^* \\ s_2 & s_1^* \end{bmatrix}.$$

That is, on a first subcarrier, a first antenna and a second antenna respectively send $s_1$ and $s_2$; and on a second subcarrier, the first antenna and the second antenna respectively send $-s_2^*$ and $s_1^*$. Correspondingly, it may be assumed that a receive end receives a signal $r_1$ on the first subcarrier, and receives a signal $r_2$ on the second subcarrier. The receive end may determine $s_1$ and $s_2$ based on the received signals $r_1$ and $r_2$.

In an embodiment, the two symbol streams obtained after the transmit diversity operation may alternatively be represented as $$\begin{bmatrix} s_1 & s_2 \\ -s_2^* & s_1^* \end{bmatrix}.$$

That is, on a first subcarrier, a first antenna and a second antenna respectively send $s_1$ and $-s_2^*$; and on a second subcarrier, the first antenna and the second antenna respectively send $s_2$ and $s_1^*$.

11. Space-time block coding: It is a space-time transmit diversity scheme proposed by combining space diversity and time diversity. Similar to space frequency block coding, at least two symbol streams may be obtained after modulated symbol streams undergo layer mapping and Alamouti coding. Then, the at least two symbol streams are precoded and transmitted.

Specifically, it is assumed that the symbol streams obtained after layer mapping and Alamouti coding are $$\begin{bmatrix} s_1 & -s_2^* \\ s_2 & s_1^* \end{bmatrix}.$$

In this case, a transmit end may send $s_1$ and $s_2$ respectively by using a first antenna and a second antenna on a first OFDM symbol, and send $-s_2^*$ and $s_1^*$ respectively by using the first antenna and the second antenna on a second OFDM symbol. Correspondingly, it may be assumed that a receive end receives a signal $r_1$ on the first OFDM symbol, and receives a signal $r_2$ on the second OFDM symbol. The receive end may determine $s_1$ and $s_2$ based on the received signals $r_1$ and $r_2$.

In an embodiment, the two symbol streams obtained after the transmit diversity $$\begin{bmatrix} s_1 & s_2 \\ -s_2^* & s_1^* \end{bmatrix}.$$

operation may alternatively be represented as That is, a first antenna and a second antenna respectively send $s_1$ and $-s_2^*$ on a first OFDM symbol; and the first antenna and the second antenna respectively send $s_2$ and $s_1^*$ on a second OFDM symbol.

12. Port: also referred to as "antenna port". A port may be understood as a transmit antenna identified by a receive end, or a transmit antenna that can be spatially distinguished. One antenna port may be configured for each virtual antenna, and each virtual antenna may be a weighted combination of a plurality of physical antennas. Antenna ports may be classified into a reference signal port and a data port based on different carried signals. For example, the reference signal port includes but is not limited to a DMRS port and a CSI-RS port.

In the embodiments of this application, a channel on a data port may be obtained by performing channel estimation based on DMRSs that have a same port number. In other words, a DMRS and data that are transmitted on a same physical channel use a same port number, and the physical channel may be, for example, a PUSCH, a PUCCH, a PDSCH, or a PDCCH.

13. Demodulation reference signal: It is a reference signal that may be used to demodulate data or signaling. Demodulation reference signals may be classified into an uplink demodulation reference signal and a downlink demodulation reference signal based on different transmission directions. A demodulation reference signal may be a DMRS in an LTE protocol or an NR protocol, or may be another reference signal defined in a future protocol for implementing a same or similar function. In the LTE or NR protocol, the DMRS may be carried on a physical shared channel and sent together with a data signal, so that the DMRS is used to demodulate the data signal carried on the physical shared channel. For example, the DMRS may be sent on a physical downlink shared channel (PDSCH) together with downlink data, or sent on a physical uplink shared channel (PUSCH) together with uplink data. The DMRS may alternatively be carried on a physical control channel and sent together with control signaling, so that the DMRS is used to demodulate the control signaling carried on the physical control channel. For example, the DMRS may be sent on a physical downlink control channel (PDCCH) together with downlink control signaling, or sent on a physical uplink control channel (PUCCH) together with uplink control signaling. In the embodiments of this application, the demodulation reference signal may include a downlink demodulation reference signal sent over a PDCCH or a PDSCH, and may also include an uplink demodulation reference signal sent over a PUCCH or a PUSCH. In addition, for ease of description, the demodulation reference signal is referred to as the DMRS for short below.

In the LTE and NR protocols, the DMRS may be a pseudo-noise (PN) sequence. Therefore, the DMRS may also be referred to as a DMRS sequence. In the embodiments of this application, "DMRS" and "DMRS sequence" may be used alternately. When a difference between "DMRS" and "DMRS sequence" is not emphasized, meanings expressed by them are the same.

A DMRS sequence may include a plurality of modulation symbols. For example, the modulation symbols may be quadrature phase shift keying (QPSK) symbols. A modulation symbol r(n) carried on the nth subcarrier may be obtained by using the following formula 1:

$$r(n) = \frac{1}{\sqrt{2}}(1 - 2 \cdot c(2n)) + j\frac{1}{\sqrt{2}}(1 - 2 \cdot c(2n+1)) \qquad \text{formula 1}$$

A form presented by r(n) is a complex number form, of a PN sequence, that is obtained through modulation, that is, a modulation symbol, which is referred to as a symbol below. n represents the nth subcarrier in subcarriers occupied by a DMRS in a component carrier (component carrier, CC), where n=0, 1, 2, ..., and $d \cdot N_{RB}^{CC} - 1$, d represents a DMRS density in one RB on one OFDM symbol, and $N_{RB}^{CC}$ may represent a quantity of RBs included in one CC. c(i) represents a PN sequence defined by an initial value $c_{init}$.

The initial value $c_{init}$ may be further obtained by using the following formula 2:

$$c_{init} = (2^{17}(N_{symb}^{slot} n_{s,f}^{\mu} + l + 1)(2N_{ID}^{nSCID} + 1) + 2_{ID}^{nSCID} + n_{SCID}) \bmod 2^{31} \qquad \text{formula 2}$$

l represents the lth OFDM symbol in one slot, $n_{s,f}^{\mu}$ represents a quantity of slots in one frame, and $N_{symb}^{slot}$ represents a quantity of OFDM symbols in one slot. A sequence identifier $N_{ID}^{nSCID}$ may be used to generate the initial value $c_{init}$ of the DMRS sequence. A scrambling code identifier $n_{SCID}$ may be used to indicate information for generating a DMRS sequence scrambling code.

In NR, $n_{SCID}$ may be indicated by downlink control information (downlink control information, DCI), and $N_{ID}^{nSCID}$ may be indicated by a higher-layer parameter. For example, when a terminal device receives DCI in a format (format) 1_1, the DCI may include an indication field used to indicate a value of $n_{SCID}$. In NR, the value of $n_{SCID}$ may be 0 or 1, and $n_{SCID}$ may be used for downlink transmission. High-layer parameters in a DMRS downlink configuration (DMRS-DownlinkConfig) information element (information element, IE), that is, a scrambling code identifier 0 (scramblingID0) and a scrambling code identifier 1 (scramblingID1), each may be set to a value of $N_{ID}^{nSCID}$ existing when the value of $n_{SCID}$ is 0 or 1. In NR, $N_{ID}^{0}$, $N_{ID}^{1} \in \{0, 1, \ldots, 65535\}$.

For another example, when a terminal device receives DCI in a format 1_0, the DCI may implicitly indicate that a value of $N_{ID}^{nSCID}$ is 0, and $n_{SCID}$ may be used for downlink transmission. A higher-layer parameter in a DMRS-DownlinkConfig IE, that is, scramblingID0, may be set to a value of $n_{ID}^{nSCID}$ existing when the value of $n_{SCID}$ is 0. In NR, $N_{ID}^{0} \in \{0, 1, \ldots, 65535\}$.

For still another example, when a terminal device receives DCI in a format 0_1, it may be determined that a value of $n_{SCID}$ used for uplink transmission is 0 or 1. Higher-layer parameters each may be set to a value of $n_{ID}^{nSCID}$ existing when the value of $n_{SCID}$ is 0 or 1. In NR, $N_{ID}^{0}$, $N_{ID}^{1} \in \{0, 1, \ldots, 65535\}$.

For yet another example, when a terminal device receives DCI in a format 0_0, it may be determined that a value of $n_{SCID}$ used for uplink transmission is 0 or 1. Higher-layer parameter may be set to a value of $n_{ID}^{nSCID}$ existing when the value of $n_{SCID}$ is 0. In NR, $N_{ID}^{0}$, $N_{ID}^{1}\{0, 1, \ldots, 65535\}$.

When a terminal device receives no DCI listed above, the terminal device may consider by default that a value of $N_{ID}^{nSCID}$ is a cell identifier $N_{ID}^{nSCID}$.

It may be learned that, $n_{SCID}$ and $N_{ID}^{nSCID}$ are UE-specific (UE specific) in most cases, and values of $n_{SCID}$ and $N_{ID}^{nSCID}$ used in DMRSs sent to different terminal devices may be the same or different.

14. DMRS pattern (pattern): used to indicate a time-frequency resource (such as an RE) used to carry a DMRS in a resource unit (such as an RB), or indicate a time-frequency resource mapped to a DMRS in a resource unit.

FIG. 2 shows two types of DMRS patterns in an NR protocol.

Type 1: In one RB, adjacent REs used to carry DMRSs of a same port are separated by one subcarrier in frequency domain. A in FIG. 2 shows a DMRS pattern of type 1. As shown in the figure, a same time-frequency resource is code division multiplexed (code division multiplexing, CDM) between a DMRS on port 0 and a DMRS on port 1, and a same time-frequency resource is code division multiplexed between a DMRS on port 2 and a DMRS on port 3. A same time-frequency resource is frequency division multiplexed (frequency division multiplexing, FDM) between the DMRSs on port 0 and port 1 and the DMRSs on port 2 and port 3. Specifically, the DMRSs on port 0 and port 1 may be mapped to RE #0, RE #2, RE #4, RE #6, RE #8, and RE #10, and the DMRSs on port 2 and port 3 may be mapped to RE #1, RE #3, RE #5, RE #7, RE #9, and RE #11.

Further, DMRS sequences of two ports carried on a same RE may be mutually independent. For example, a DMRS sequence corresponding to port 0 and a DMRS sequence corresponding to port 1 may be carried on RE #0. The DMRS sequences of port 0 and port 1 each may be obtained based on a respective DMRS sequence generation formula. Because port 0 and port 1 may be allocated to different terminal devices, $n_{SCID}$ and $N_{ID}^{nSCID}$ in the DMRS sequences may be different. In this case, initial values may also be different, and therefore generated DMRS sequences are different. In other words, the DMRS sequences corresponding to port 0 and port 1 are mutually independent, or DMRS sequences corresponding to different ports on a same RE are mutually independent, and each DMRS sequence may be obtained based on the foregoing DMRS sequence generation formula.

Type 2: In one RB, every two adjacent REs used to carry DMRSs of a same port may be consecutive in frequency domain. B in FIG. 2 shows a DMRS pattern of type 2. As shown in the figure, a same time-frequency resource is code-division-multiplexed between a DMRS on port 0 and a DMRS on port 1, and a same time-frequency resource is code-division-multiplexed between a DMRS on port 2 and a DMRS on port 3. A same time-frequency resource is frequency-division-multiplexed between the DMRSs on port 0 and port 1 and the DMRSs on port 2 and port 3. Specifically, the DMRSs on port 0 and port 1 may be mapped to RE #0, RE #1, RE #4, RE #5, RE #8, and RE #9, and the DMRSs on port 2 and port 3 may be mapped to RE #2, RE #3, RE #6, RE #7, RE #10, and RE #11.

It should be noted that, the figure is merely a schematic diagram, and a plurality of REs used to carry DMRSs are mapped to a same symbol as an example. However, this shall not constitute any limitation on this application. For example, when the DMRSs include a front loaded (front loaded) DMRS and an additional (additional) DMRS, the DMRSs may be mapped to a plurality of symbols.

In addition, for ease of understanding the embodiments of this application, the following several items are described.

First, in the embodiments of this application, for ease of description, one resource unit includes OFDM symbols consecutively numbered starting from #0 in time domain, and includes subcarriers consecutively numbered starting from #0 in frequency domain. That one resource unit is one RB is used as an example. In this case, for example, the RB may include OFDM symbols #0 to #13 in time domain, and may include subcarriers #0 to #11 in frequency domain. In addition, for ease of understanding, the ith (i≥0, and i is an integer) OFDM symbol (or subcarrier) in the following description corresponds to an index (index) of the OFDM symbol (or subcarrier). For example, the 0th OFDM symbol corresponds to an OFDM symbol numbered 0, that is, OFDM symbol #0.

It should be understood that, all the foregoing descriptions are provided for ease of describing the technical solutions provided in the embodiments of this application, but are not intended to limit the scope of this application. Specific implementation is not limited thereto. For example, one resource unit may include OFDM symbols #1 to #14 in time domain, and may include subcarriers #1 to #12 in frequency domain. For another example, OFDM symbols in a plurality of resource units consecutive in time domain may be consecutively numbered, and subcarriers in a plurality of resource units consecutive in frequency domain may also be consecutively numbered. This application sets no limitation thereto.

In addition, for ease of distinguishing between a time-domain symbol and a modulation symbol, in the embodiments illustrated below, a time-domain symbol is represented by an "OFDM symbol", and a modulation symbol is represented by a "symbol". However, it should be understood that a time-domain symbol is not limited to an OFDM symbol. This application sets no limitation thereto. In the following, "symbols" each may represent a modulation symbol unless otherwise specified.

It should be noted that, for ease of distinguishing between different time-domain resources in the accompanying drawings, schematic descriptions such as "symbol #0" and "symbol #1" are used to distinguish between different OFDM symbols in a plurality of accompanying drawings (for example, FIG. 6 to FIG. 12). "Symbols" schematically described in these accompanying drawings may be used to indicate OFDM symbols.

Second, the embodiments of this application relate to a plurality of matrix transformations. For ease of understanding, several matrix transformations related in this application are collectively described herein. A superscript H represents a conjugate transpose. For example, $A^H$ represents a conjugate transpose of a matrix (or a vector) A. A superscript * represents a conjugate. For example, $B^*$ represents a conjugate of a matrix (or a vector) B. A sign "~" represents an estimate. For example, $\tilde{C}$ represents an estimate of a matrix (or a vector) C. For brevity, a description of a same or similar situation is omitted below.

Third, in the embodiments below, "first", "second", and "third" are merely used to help distinguish between different objects, and shall not constitute any limitation on this application, for example, distinguish between different terminal devices, different indication information, and the like.

Fourth, in the embodiments below, "pre-acquisition" may include indication over signaling of a network device, or pre-definition such as a protocol definition. "Pre-definition" may be implemented by pre-storing corresponding code or a corresponding table in a device (including, for example, a terminal device and a network device) or by using another manner that may be used to indicate related information. This application sets no limitation on a specific implementation thereof.

Fifth, "save" in the embodiments of this application may be storage in one or more memories. The one or more memories may be separately disposed, or may be integrated into an encoder, a decoder, a processor, or a communications apparatus. Alternatively, some of the one or more memories may be separately disposed, and some of them may be integrated into an encoder, a decoder, a processor, or a communications apparatus. A type of the memory may be any form of storage medium. This application sets no limitation thereto.

Sixth, a "protocol" in the embodiments of this application may refer to a standard protocol in the communications field. For example, the "protocol" may include an LTE protocol, an NR protocol, and a related protocol applied to a future communications system. This application sets no limitation thereto.

Seventh, the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least one of A and B", similar to "A and/or B", describes an association relationship for describing associated objects and represents that three relationships may exist. For example, at least one of A and B may represent the following three cases: Only A exists, both A and B exist, and only B exists.

The following describes the embodiments of this application with reference to the accompanying drawings.

It should be understood that, the technical solutions of this application may be applied to a wireless communications system, and the wireless communications system may include at least one network device and at least two terminal devices. For example, the wireless communications system may be the communications system 100 shown in FIG. 1. When the network device 111 separately sends downlink data to the terminal device 121 and the terminal device 122 by using a same time-frequency resource, the terminal device 121 and the terminal device 122 may interfere with each other. For another example, when a time-frequency resource used by the network device 111 to send downlink data to the terminal device 121 is the same as that used by the network device 112 to send downlink data to the terminal device 123, the terminal device 121 and the terminal device 123 may interfere with each other.

Without loss of generality, the following uses data transmission between a first terminal device and a network device as an example to describe in detail a data receiving and sending method in the embodiments of this application.

Figure 3:
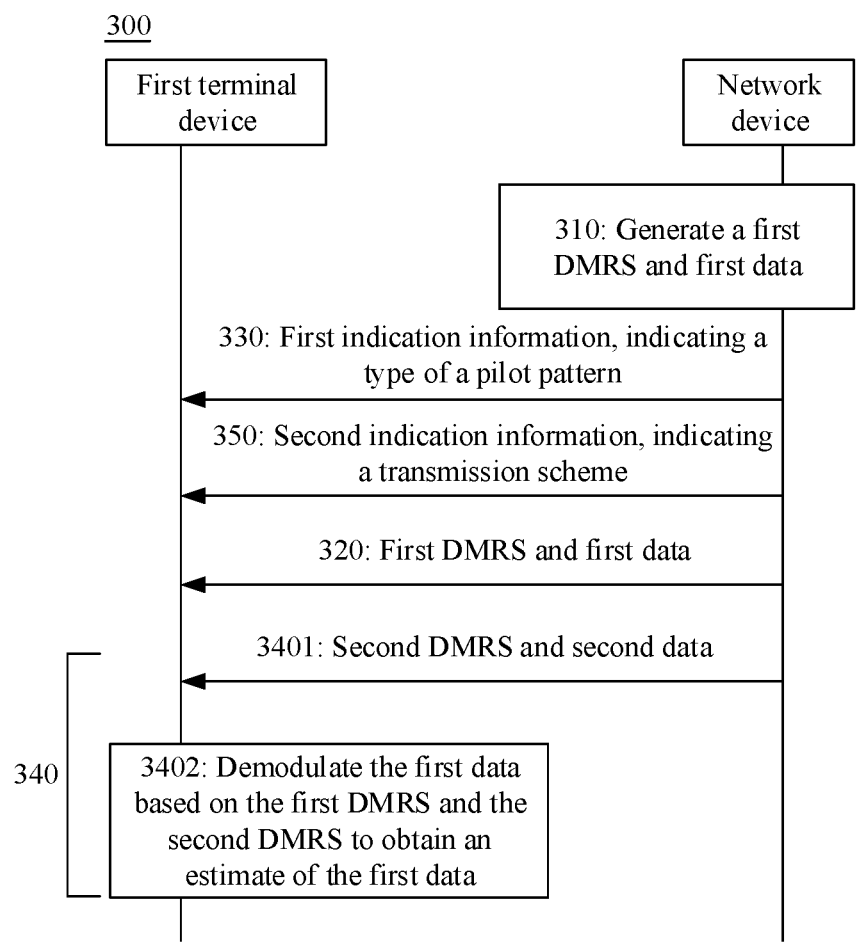
FIG. 3 is a schematic flowchart of a data receiving and sending method according to an embodiment of this application.

FIG. 3 is a schematic flowchart of a data receiving and sending method 300 illustrated from a perspective of device interaction according to an embodiment of this application. As shown in the figure, the method 300 includes operations 310 to 350. The following describes the operations in the method 300 in detail.

In operation 310, a network device generates a first DMRS and first data.

In an embodiment of this application, to facilitate distinguishing and description, data sent by the network device to a first terminal device is denoted as the first data, and a DMRS sent by the network device to the first terminal device is denoted as the first DMRS. The first DMRS may be used to demodulate the first data.

The first DMRS and the first data undergo same Alamouti coding. Specifically, the network device may determine, based on a transmission scheme of the first data, how to process the first DMRS and the first data. For example, when the transmission scheme is SFTD, the network device may determine to perform Alamouti coding on the first DMRS and the first data in space domain and frequency domain. For ease of description, such Alamouti coding may be referred to as Alamouti space-frequency coding for short. When the transmission scheme is STTD, the network device may determine to perform Alamouti coding on the first DMRS and the first data in space domain and time domain. For ease of description, such Alamouti coding may be referred to as Alamouti space-time coding for short.

Undergoing same Alamouti coding herein may be understood as undergoing Alamouti coding of a same dimension, such as the Alamouti space-frequency coding or Alamouti space-time coding listed above. In other words, the first DMRS and the first data jointly undergo Alamouti coding in space domain and frequency domain, or the first DMRS and the first data jointly undergo Alamouti coding in space domain and time domain.

It should be understood that, the foregoing listed Alamouti space-frequency coding and Alamouti space-time coding are merely examples, and shall not constitute any limitation on this application. For example, Alamouti coding may further include Alamouti space-time-frequency coding. This application sets no limitation thereto.

First, the network device may determine, based on a type of a pilot pattern, REs used to carry the first DMRS sequence, including a quantity and locations of the REs used to carry the first DMRS.

In an embodiment, the pilot pattern is a DMRS pattern, and may be used to determine a resource mapping manner of the first DMRS sequence. A type of the DMRS pattern may include, for example, type 1 and type 2 listed above. The network device may determine, based on the type of the DMRS pattern, the REs used to carry the first DMRS, so as to learn specific OFDM symbols and subcarriers to which the first DMRS is mapped.

As described above, a DMRS sequence on each OFDM symbol may be determined based on a sequence number l of the OFDM symbol in one slot. When the first DMRS is mapped to a plurality of OFDM symbols, a plurality of PN sequences may be generated based on different OFDM symbols.

Because the first DMRS and the first data undergo the same Alamouti coding, the first DMRS after the Alamouti coding may be mapped to a first DMRS port and a second DMRS port. When a symbol mapped to the first DMRS port is fixed, a symbol mapped to the second DMRS port is related to the transmission scheme. The network device may determine, based on the transmission scheme and the symbol mapped to the first DMRS port, the symbol that may be mapped to the second DMRS port.

In an embodiment, when the transmission scheme is SFTD, the network device may separately perform Alamouti coding on a symbol, on each OFDM symbol, that may be mapped to the first DMRS port, to obtain a symbol that may be mapped to the second DMRS port. In an assumption, it is determined, based on the DMRS pattern, that the first DMRS sequence occupies one OFDM symbol, and a quantity of REs used to carry the first DMRS sequence is 6. In this case, the network device may generate symbols in the first DMRS sequence, for example, $\{a_0, a_1, a_2, a_3, a_4, a_5\}$. The network device may further perform Alamouti coding on every two symbols in $\{a_0, a_1, a_2, a_3, a_4, a_5\}$ as one pair, and therefore obtain $\{-a^*_1, a^*_0; -a^*_3, a^*_2; -a^*_5, a^*_4\}$. $\{a_0, a_1, a_2, a_3, a_4, a_5\}$ may be symbols mapped to the first DMRS port, and $\{-a^*_1, a^*_0; -a^*_3, a^*_2; -a^*_5, a^*_4\}$ may be symbols mapped to the second DMRS port.

The DMRS symbols mapped to the first DMRS port are associated with those mapped to the second DMRS port. $\{-a^*_1, a^*_0\}$ may be obtained by performing Alamouti coding on $\{a_0, a_1\}$. $\{-a^*_3, a^*_2\}$ may be obtained by performing Alamouti coding on $\{a_2, a_3\}$. $\{-a^*_5, a^*_4\}$ may be obtained by performing Alamouti coding on $\{a_4, a_5\}$.

In an assumption, it is determined, based on the DMRS pattern, that the first DMRS sequence is mapped to two OFDM symbols, and a quantity of REs on each OFDM symbol that are used to carry the first DMRS sequence is 6. In this case, the network device may generate symbols mapped to the first DMRS port, for example, $\{a_0, a_1, a_2, a_3, a_4, a_5\}$ and $\{b_0, b_1, b_2, b_3, b_4, b_5\}$, and symbols mapped to the second DMRS port, that is, $\{-a^*_1, a^*_0; -a^*_3, a^*_2; -a^*_5, a^*_4\}$ and $\{-b^*_1, b^*_0; -b^*_3, b^*_2; -b^*_5, b^*_4\}$.

The DMRS symbols mapped to the first DMRS port are associated with those mapped to the second DMRS port. $\{-a^*_1, a^*_0\}$ may be obtained by performing Alamouti coding on $\{a_0, a_1\}$. $\{-a^*_3, a^*_2\}$ may be obtained by performing Alamouti coding on $\{a_2, a_3\}$. $\{-a^*_5, a^*_4\}$ may be obtained by performing Alamouti coding on $\{a_4, a_5\}$. $\{-b^*_1, b^*_0\}$ may be obtained by performing Alamouti coding on $\{b_0, b_1\}$. $\{-b^*_3, b^*_2\}$ may be obtained by performing Alamouti coding on $\{b_2, b_3\}$. $\{-b^*_5, b^*_4\}$ may be obtained by performing Alamouti coding on $\{b_4, b_5\}$.

When the transmission scheme is STTD, the first DMRS sequence occupies at least two OFDM symbols. In an assumption, it is determined, based on the DMRS pattern, that the first DMRS sequence occupies two OFDM symbols (for example, denoted as OFDM symbols #0 and #1), and a quantity of REs on each OFDM symbol that are used to carry the first DMRS sequence is 3. In this case, the network device may generate symbols mapped to the first DMRS port, for example, $\{a_0, a_1, a_2\}$ (for example, occupying OFDM symbol #0) and $\{b_0, b_1, b_2\}$ (for example, occupying OFDM symbol #1), and symbols mapped to the second DMRS port, that is, $\{-b^*_0, -b^*_1, -b^*_2\}$ (for example, occupying OFDM symbol #0) and $\{a^*_0, a^*_1, a^*_2\}$ (for example, occupying OFDM symbol #1).

The DMRS symbols mapped to the first DMRS port are associated with those mapped to the second DMRS port. $\{-b^*_0, a^*_0\}$ may be obtained by performing Alamouti coding on $\{a_0, b_0\}$. $\{-b^*_1, a^*_1\}$ may be obtained by performing Alamouti coding on $\{a_1, b_1\}$. $\{-b^*_2; a^*_2\}$ may be obtained by performing Alamouti coding on $\{a_2, b_2\}$.

It should be understood that the foregoing describes in detail, based on the DMRS pattern and different transmission schemes, a specific process in which the network device generates the first DMRS sequence. The quantity of REs used to carry the first DMRS sequence is merely an example for ease of understanding, and shall not constitute any limitation on this application. The network device may generate the first DMRS sequence based on the type of the DMRS pattern and the transmission scheme.

The network device may determine, by using a method in the prior art, REs used to carry the first data, determine, based on a quantity of the REs used to carry the first data and a modulation and coding scheme (modulation and coding scheme, MCS), data bits that may be sent, perform modulation and then layer mapping on the data bits to obtain two modulation symbols that may be mapped to a transport layer, and obtain, through Alamouti coding, symbols to be mapped to two data ports.

Similar to the first DMRS sequence, the first data obtained after Alamouti coding may be mapped to a first data port and a second data port. When a symbol mapped to the first data port is fixed, a symbol mapped to the second data port is related to the transmission scheme and a resource mapping manner. When the symbol mapped to the first data port is fixed, the network device may generate, based on the transmission scheme and the resource mapping manner, the symbol that may be mapped to the second data port.

The resource mapping manner of the first data may be the same as the resource mapping manner of the first DMRS, or may be pre-defined, for example, defined in a protocol.

In an embodiment, when the transmission scheme is SFTD, the network device may separately perform Alamouti coding on a symbol, on each OFDM symbol, that may be mapped to the first data port, to obtain a symbol that may be mapped to the second data port. Assuming that the data is continuously carried on 12 subcarriers of a same OFDM symbol, the network device may generate symbols of the first data that are to be mapped to the first data port, for example, $\{d_0, d_1, d_2, d_3, d_4, d_5, d_6, d_7, d_8, d_9, d_{10}, d_{11}\}$.

If the resource mapping manner used by the network device for the first data is the same as the resource mapping manner of the first DMRS, resource mapping may be performed by using a pattern of type 1 or type 2. When the resource mapping manner of the DMRS is type 1, it may be learned that symbols of the first data mapped to the second data port are $\{-d^*_2, -d^*_3, d^*_0, d^*_1, -d^*_6, -d^*_7, d^*_4, d^*_5, -d^*_{10}, -d^*_{11}, d^*_8, d^*_9\}$. $\{-d^*_2, d^*_0\}$ may be obtained by performing Alamouti coding on $\{d_0, d_2\}$. $\{-d^*_3, d^*_1\}$ may be obtained by performing Alamouti coding on $\{d_1, d_3\}$. $\{-d^*_6, d^*_4\}$ may be obtained by performing Alamouti coding on $\{d_4, d_6\}$. $\{-d^*_7, d^*_5\}$ may be obtained by performing Alamouti coding on $\{d_5, d_7\}$. $\{-d^*_{10}, d^*_8\}$ may be obtained by performing Alamouti coding on $\{d_8, d_{10}\}$. $\{-d^*_{11}, d^*_9\}$ may be obtained by performing Alamouti coding on $\{d_9, d_{11}\}$.

When the resource mapping manner of the DMRS is type 2, it may be learned that symbols of the first data mapped to the second data port are $\{-d^*_1, d^*_0, -d^*_3, d^*_2, -d^*_5, d^*_4, -d^*_7, d^*_6, -d^*_9, d^*_8, -d^*_{11}, d^*_{10}\}$. $\{-d^*_1, d^*_0\}$ may be obtained by performing Alamouti coding on $\{d_0, d_1\}$. $\{-d^*_3, d^*_2\}$ may be obtained by performing Alamouti coding on $\{d_2, d_3\}$. $\{-d^*_5, d^*_4\}$ may be obtained by performing Alamouti coding on $\{d_4, d_{51}\}$. $\{-d^*_7, d^*_6\}$ may be obtained by performing Alamouti coding on $\{d_6, d_7\}$. $\{-d^*_9, d^*_8\}$ may be obtained by performing Alamouti coding on $\{d_8, d_9\}$. $\{-d^*_{11}, d^*_{10}\}$ may be obtained by performing Alamouti coding on $\{d_{10}, d_{11}\}$.

In an embodiment, for ease of description, type 1 and type 2 may also be defined for the resource mapping manner of the first data. Type 1 corresponds to type 1 of the DMRS pattern, that is, there is at least one RE between REs on which two symbols used for Alamouti coding are located. Type 2 corresponds to type 2 of the DMRS pattern, that is, there is no RE between REs on which two symbols used for Alamouti coding are located, namely, the two REs are consecutive.

The resource mapping manner of the first data may be the same as the resource mapping manner of the first DMRS, as described in the foregoing example. However, it should be understood that, this is only a possible implementation, and the resource mapping manner of the first data may alternatively be different from the resource mapping manner of the first DMRS. For example, the resource mapping manner of the first data may be pre-defined, for example, defined in a protocol. It is assumed that the resource mapping manner of the first data that is defined in a protocol is type 2. If symbols mapped to the first data port are $\{d_0, d_1, d_2, d_3, d_4, d_5, d_6, d_7, d_8, d_9, d_{10}, d_{11}\}$, symbols mapped to the second data port may be $\{-d^*_1, d^*_0, -d^*_3, d^*_2, -d^*_5, d^*_4, -d^*_7, d^*_6, -d^*_9, d^*_8, -d^*_{11}, d^*_{10}\}$, regardless of whether the resource mapping manner of the first DMRS is type 1 or type 2. It is assumed that the resource mapping manner of the first data that is defined in a protocol is type 1. Symbols mapped to the second data port may be $\{-d^*_2, -d^*_3, d^*_0, d^*_1, -d^*_6, -d^*_7, d^*_4, d^*_5, -d^*_{10}, -d^*_{11}, d^*_8, d^*_9\}$, regardless of whether the resource mapping manner of the first DMRS is type 1 or type 2. This application sets no limitation thereto. The network device may generate the first data based on the resource mapping manner and the transmission scheme of the first data.

Afterwards, the network device may map the first DMRS and the first data that are generated in operation 310 to a time-frequency resource, and send the time-frequency resource to the terminal device. In other words, in operation 320, the network device sends the first DMRS and the first data.

In an embodiment, for example, the first DMRS and the first data may be carried on a PDSCH. The network device may map the first DMRS and the first data that are generated in operation 310 to the PDSCH, and send the first DMRS and the first data to the first terminal device.

Correspondingly, in operation 320, the first terminal device receives the first DMRS and the first data.

As described in operation 310, the network device may pre-determine REs used to carry the first DMRS and the first data. In this embodiment, REs on which two symbols available for Alamouti coding are located may be used as one RE pair. For ease of distinguishing and description, an RE pair used to carry the first DMRS may be referred to as a first RE pair, and an RE pair used to carry the first data may be referred to as a second RE pair.

The network device may determine, based on the resource mapping manner of the first DMRS, that is, the DMRS pattern, one or more first RE pairs used to carry the first DMRS. The network device may further determine, based on the resource mapping manner of the first data, one or more second RE pairs used to carry the first data.

In an embodiment, the first RE pair may include a first RE and a second RE. The network device may determine relative positions of the first RE and the second RE based on the type of the DMRS pattern, for example, determine how many REs exist between the first RE and the second RE. When a DMRS density is greater than 1, the network device may further determine a spacing between a plurality of first RE pairs based on the type of the DMRS pattern.

The second RE pair may include a third RE and a fourth RE. The network device may determine relative positions of the third RE and the fourth RE based on the resource mapping manner of the first data, for example, determine how many REs exist between the third RE and the fourth RE. When the first data is carried on a plurality of second RE pairs, the network device may further determine a spacing between the plurality of second RE pairs based on the resource mapping manner.

Afterwards, the network device may separately map, based on the transmission scheme, the first DMRS and the first data that are generated in operation 310 to a corresponding time-frequency resource.

Corresponding to the network device, the first terminal device may also determine, based on the DMRS pattern and the transmission scheme, one or more first RE pairs used to carry the first DMRS. The first terminal device may further determine, based on the resource mapping manner and the transmission scheme of the first data, one or more second RE pairs used to carry the first data.

In an embodiment, before operation 320, the method 300 further includes operation 330: The network device sends first indication information, where the first indication information is used to indicate a type of a pilot pattern. Correspondingly, in operation 330, the terminal device receives the first indication information, where the first indication information is used to indicate the type of the pilot pattern.

If the resource mapping manner of the first data is the same as the resource mapping manner of the first DMRS, the first terminal device may determine the resource mapping manner of the first data and the resource mapping manner of the first DMRS based on the first indication information. If the resource mapping manner of the first data is different from the resource mapping manner of the first DMRS, for example, the resource mapping manner of the first data is pre-defined, the first terminal device may determine the resource mapping manner of the first DMRS based on the first indication information.

Based on the resource mapping manner of the first DMRS and the resource mapping manner of the first data, the first terminal device may separately determine one or more first RE pairs used to carry the first DMRS and one or more second RE pairs used to carry the first data. In this way, the first terminal device may receive the first DMRS on the one or more first RE pairs, and receive the first data on the one or more second RE pairs.

It should be understood that, the types of the DMRS pattern listed above may also be pre-defined, for example, defined in a protocol. In addition, the two possible types of the DMRS pattern listed above are merely examples, and shall not constitute any limitation on this application. This application does not rule out a possibility that another type of the DMRS pattern exists.

Because the first DMRS and the first data separately undergo Alamouti coding, on each first RE, a symbol mapped to the second DMRS port is obtained by performing Alamouti coding on a symbol mapped to the first DMRS port; and on each second RE, a symbol mapped to the second data port is obtained by performing Alamouti coding on a symbol mapped to the first data port.

In addition, because the first DMRS and the first data jointly undergo Alamouti space-frequency coding or Alamouti space-time coding, the two REs in the first RE pair occupy different subcarriers, and the two REs in the second RE pair occupy different subcarriers. Alternatively, the two REs in the first RE pair occupy different OFDM symbols, and the two REs in the second RE pair occupy different OFDM symbols.

It should be noted that, the first DMRS and the first data may be mapped to a same transmission unit, such as an RB. Alternatively, they may be mapped to different transmission units. For example, when channel transformation is relatively slow, the first DMRS may be mapped to a specific time unit in two or more consecutive time units (for example, slots). Alternatively, the first DMRS may be mapped to a specific frequency-domain unit in two or more consecutive frequency-domain units (for example, subcarriers).

In addition, the first DMRS and the first data may be mapped to different time-frequency resources. For example, the first DMRS may be mapped to only the 0th OFDM symbol in an RB, that is, may correspond to a case in which a DMRS does not include an additional DMRS, and the first data may be mapped to any one or more OFDM symbols in the 1st to 13th OFDM symbols in the RB. Alternatively, the first DMRS may be mapped to only the 0th OFDM symbol and the 1st OFDM symbol in an RB, that is, may correspond to a case in which a DMRS does not include an additional DMRS, and the first data may be mapped to any one or more OFDM symbols in the 2nd to 13th OFDM symbols in the RB. Alternatively, the first DMRS may be mapped to the 0th OFDM symbol and the 12th and 13th OFDM symbols in an RB, that is, may correspond to a case in which the first DMRS includes a front loaded DMRS and an additional DMRS, and the first data may be mapped to any one or more OFDM symbols in the 1st to the 11th OFDM symbols in the RB.

In the following embodiments, for ease of description, it is assumed that the first DMRS is mapped to the 0th OFDM symbol, or is mapped to the 0th OFDM symbol and the 1st OFDM symbol, that is, the first DMRS does not include an additional DMRS. It may be understood that, when the first DMRS includes an additional DMRS, the additional DMRS may undergo same Alamouti coding as a front loaded DMRS. In other words, the front loaded DMRS, the additional DMRS, and the data may undergo the same Alamouti coding.

Specific implementations of SFTD and STTD are similar and their difference lies only in a dimension of Alamouti coding. For ease of understanding, the following describes in detail, with reference to the accompanying drawings by using SFTD and STTD as examples, a first DMRS and first data that are obtained after Alamouti space-frequency coding and a first DMRS and first data that are obtained after Alamouti space-time coding.

1. The first DMRS and the first data undergo space-frequency coding, that is, the transmission scheme of the first data is SFTD.

When the first DMRS undergoes Alamouti space-frequency coding, the first RE and the second RE in each first RE pair may be consecutive in frequency domain, or the first RE and the second RE in each first RE pair may be separated by at least one subcarrier in frequency domain.

A case in which the first RE and the second RE are consecutive in frequency domain may correspond to the DMRS pattern of type 1 described above. A case in which the first RE and the second RE are separated by one subcarrier in frequency domain may correspond to the DMRS pattern of type 2 described above.

Relative positions of the first RE and the second RE in the first RE pair and a quantity of REs used as a spacing may be determined by the DMRS pattern.

It should be noted that, the first DMRS obtained after Alamouti coding may be mapped to two DMRS ports, that is, the first DMRS port and the second DMRS port. In other words, the first DMRS includes a DMRS symbol mapped to the first DMRS port and a DMRS symbol mapped to the second DMRS port. The DMRS symbol mapped to the first DMRS port and the DMRS symbol mapped to the second DMRS port may be associated with each other. As described above, in DMRS symbols carried by each first RE pair, the symbol mapped to the second DMRS port may be obtained by performing Alamouti coding based on the symbol mapped to the first DMRS port. Therefore, in the SFTD transmission scheme, the DMRS symbol mapped to the first DMRS port and the DMRS symbol mapped to the second DMRS port may be obtained based on a same PN sequence.

Figure 4:
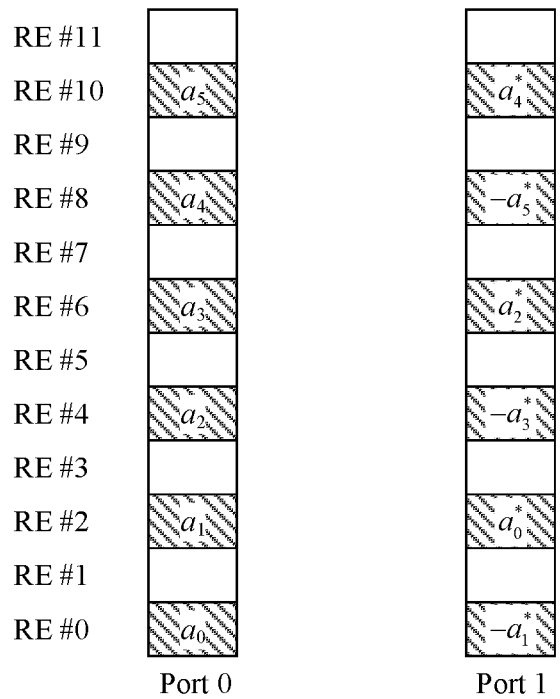
FIG. 4 and FIG. 5 are schematic diagrams of mapping a first DMRS to a time-frequency resource according to an embodiment of this application.
Figure 5:
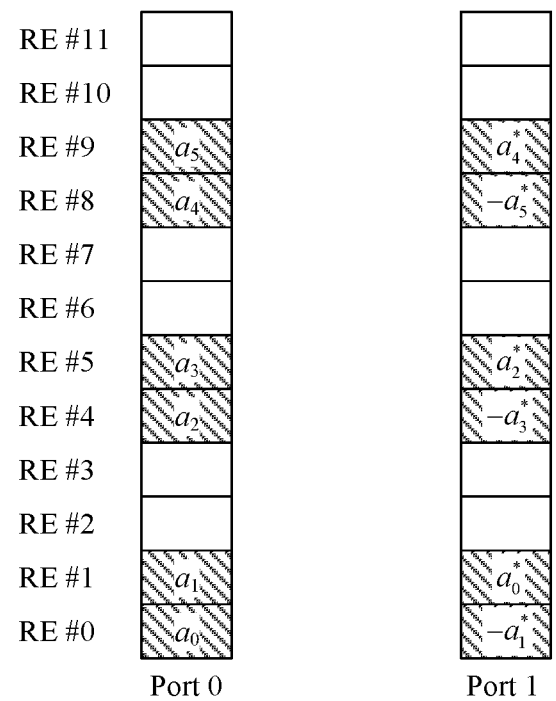

For example, FIG. 4 and FIG. 5 are schematic diagrams of mapping a first DMRS to a time-frequency resource according to an embodiment of this application. It should be noted that, for ease of distinguishing between DMRSs of different ports, port 0 (namely, an example of the first DMRS port) and port 1 (namely, an example of the second DMRS port) are separately illustrated in the figures. However, it should be understood that, this shall not constitute any limitation on this application. As shown in the figure, port 0 and port 1 occupy a same time-frequency resource in one RB, that is, time-frequency resources used by port 0 and port 1 shown in the figures overlap. Assuming that a DMRS corresponding to port 0 and port 1 is the first DMRS sent to the first terminal device, in addition to REs in which the DMRS corresponding to port 0 and port 1 is located, remaining REs in the RB may also be used to carry a DMRS, for example, a DMRS sent to another terminal device, or may be used to carry data, for example, the first data sent to the first terminal device or data sent to another terminal device, or may not be used to carry a signal. This application sets no limitation thereto. In addition, when the REs are used to carry a DMRS sent to another terminal device, the REs may carry DMRSs corresponding to other ports (for example, port 2 and port 3). The DMRSs corresponding to port 2 and port 3 may be DMRSs sent to different terminal devices, or may be DMRSs sent to a same terminal device. This application sets no limitation thereto.

FIG. 4 is a schematic diagram of mapping a first DMRS to a time-frequency resource according to an embodiment of this application. The first DMRS shown in FIG. 4 may be obtained by mapping the DMRS pattern of type 1 described above. Specifically, port 0 and port 1 multiplex a same time-frequency resource. In the first DMRS corresponding to port 0 and port 1, symbols of the first DMRS that are mapped to port 0 may be denoted as $\{a_0, a_1, a_2, a_3, a_4, a_5\}$, and DMRS symbols $\{-a^*_1, a^*_0, -a^*_3, a^*_2, -a^*_5, a^*_4\}$ that are mapped to port 1 may be obtained after Alamouti coding. Therefore, the symbols $\{a_0, -a^{*1}\}$ may be mapped to RE #0, where $a_0$ may correspond to port 0 and $-a^*_1$ may correspond to port 1; the symbols $\{a_1, a^*_0\}$ may be mapped to RE #2, where $a_1$ may correspond to port 0 and $a^*_0$ may correspond to port 1; the symbols $\{a_2, -a^*_3\}$ may be mapped to RE #4, where $a_2$ may correspond to port 0 and $-a^*_3$ may correspond to port 1; the symbols $\{a_3, a^*_2\}$ may be mapped to RE #6, where $a_3$ may correspond to port 0 and $a^*_2$ may correspond to port 1; the symbols $\{a_4, -a^*_5\}$ may be mapped to RE #8, where $a_4$ may correspond to port 0 and $-a^*_5$ may correspond to port 1; and the symbols $\{a_5, a^*_4\}$ may be mapped to RE #10, where as may correspond to port 0 and $a^*_4$ may correspond to port 1.

It may be learned that, the REs occupied by the first DMRS that correspond to port 0 and port 1 are classified into groups, where one group includes two REs associated with each other. For example, in the symbols carried on RE #0 and RE #2, the symbols corresponding to port 1 are obtained by performing Alamouti coding on the symbols corresponding to port 0; in the symbols carried on RE #4 and RE #6, the symbols corresponding to port 1 are obtained by performing Alamouti coding on the symbols corresponding to port 0; in the symbols carried on RE #8 and RE #10, the symbols corresponding to port 1 are obtained by performing Alamouti coding on the symbols corresponding to port 0.

Based on the association relationships between the symbols corresponding to the foregoing two ports, it may be learned that, RE #0 and RE #2 form an RE pair, RE #4 and RE #6 form an RE pair, and RE #8 and RE #10 form an RE pair.

FIG. 5 is another schematic diagram of mapping a first DMRS to a time-frequency resource according to an embodiment of this application. The first DMRS shown in FIG. 5 may be obtained by mapping the DMRS pattern of type 2 described above. Specifically, in the first DMRS corresponding to port 0 and port 1, symbols of the first DMRS that are mapped to port 0 may be denoted as $\{a_0, a_1, a_2, a_3, a_4, a_5\}$, and symbols $\{-a^*_1, a^*_0, -a^*_3, a^*_2, -a^*_5, a^*_4\}$ of the first DMRS that are mapped to port 1 may be obtained after Alamouti coding. Therefore, the symbols $\{a_0, -a^*_1\}$ may be mapped to RE #0, where $a_0$ may correspond to port 0 and $-a^*_1$ may correspond to port 1; the symbols $\{a_1, a^*_0\}$ may be mapped to RE #1, where $a_1$ may correspond to port 0 and $a^*_0$ may correspond to port 1; the symbols $\{a_2, -a^*_1\}$ may be mapped to RE #4, where $a_2$ may correspond to port 0 and $-a^*_3$ may correspond to port 1; the symbols $\{a_3, a^*_2\}$ may be mapped to RE #5, where $a_3$ may correspond to port 0 and $a^*_2$ may correspond to port 1; the symbols $\{a_4, -a^*_5\}$ may be mapped to RE #8, where $a_4$ may correspond to port 0 and $-a^*_5$ may correspond to port 1; and the symbols $\{a_5, a^*_4\}$ may be mapped to RE #9, where $a_5$ may correspond to port 0 and $a^*_4$ may correspond to port 1.

It may be learned that, the REs occupied by the first DMRS that correspond to port 0 and port 1 are classified into groups, where one group includes two REs associated with each other. For example, in the symbols carried on RE #0 and RE #1, the symbols corresponding to port 1 are obtained by performing Alamouti coding on the symbols corresponding to port 0; in the symbols carried on RE #4 and RE #5, the symbols corresponding to port 1 are obtained by performing Alamouti coding on the symbols corresponding to port 0; in the symbols carried on RE #8 and RE #9, the symbols corresponding to port 1 are obtained by performing Alamouti coding on the symbols corresponding to port 0.

Based on the association relationships between the symbols corresponding to the foregoing two ports, it may be learned that, RE #0 and RE #1 form an RE pair, RE #4 and RE #5 form an RE pair, and RE #8 and RE #9 form an RE pair.

It should be understood that, FIG. 4 and FIG. 5 show two schematic diagrams in which the first DMRS is carried on a same OFDM symbol as examples for ease of understanding only. However, this shall not constitute any limitation on this application. In SFTD, the first DMRS may alternatively be carried on more OFDM symbols.

It should further be understood that, FIG. 4 and FIG. 5 respectively show DMRS resource mapping diagrams corresponding to DMRS patterns of type 1 and type 2 for ease of understanding only. However, this shall not constitute any limitation on this application. The first terminal device may determine a location and a density of the first DMRS in a time-frequency resource based on a pre-learned type of a pilot pattern.

Corresponding to the first DMRS, when the first data undergoes Alamouti space-frequency coding, the third RE and the fourth RE in each second RE pair may be consecutive in frequency domain, or the third RE and the fourth RE in each second RE pair may be separated by at least one subcarrier in frequency domain.

That is, after undergoing Alamouti space-frequency coding, the first data may be mapped to an RB in the manner shown in FIG. 4, or may be mapped to an RB in the manner shown in FIG. 5.

FIG. 6 and FIG. 7 are respectively schematic diagrams of mapping a first DMRS and first data to a time-frequency resource. It should be noted that, FIG. 6 and FIG. 7 are merely schematic diagrams, and show one OFDM symbol (that is, symbol #0 shown in the figure) used to carry a DMRS and one OFDM symbol (that is, symbol #1 shown in the figure) used to carry data in one RB. However, this shall not constitute any limitation on this application. As described above, data may be carried on one or more OFDM symbols, and a DMRS may also be carried on one or more OFDM symbols. This application sets no limitation thereto.

FIG. 6 is a schematic diagram of mapping a first DMRS and first data to a time-frequency resource according to an embodiment of this application. In FIG. 6, a mapping manner of the first DMRS is the same as a mapping manner of the first data. In other words, a quantity of subcarriers between the third RE and the fourth RE in the second RE pair is the same as the quantity of subcarriers between the first RE and the second RE in the first RE pair.

(A) and (B) in FIG. 6 are respectively schematic diagrams of mapping the first DMRS and the first data to a time-frequency resource corresponding to different types of DMRS patterns. It may be seen that, in a DMRS pattern of type 1 shown in (A), the first RE and the second RE that are used to carry the first DMRS are separated by one subcarrier in frequency domain. Corresponding to the DMRS mapping manner, the third RE and the fourth RE that are used to carry the first data may also be separated by one subcarrier in frequency domain.

A DMRS density shown in FIG. 6 is 3. In other words, a frequency-domain resource corresponding to one RB includes three first RE pairs used to carry the first DMRS. It may be seen that, a spacing between adjacent first RE pairs in frequency domain may be the same. As shown in the figure, a first RE pair formed by RE #0 and RE #2 and a first RE pair formed by RE #4 and RE #6 may be separated by one subcarrier in frequency domain, and the first RE pair formed by RE #4 and RE #6 and a first RE pair formed by RE #8 and RE #10 may also be separated by one subcarrier in frequency domain.

In FIG. 6, a frequency-domain resource corresponding to one RB includes six second RE pairs used to carry the first data. It may be seen that, the six second RE pairs may be arranged in a staggered manner in frequency domain. As shown in the figure, a second RE pair formed by RE #12 and RE #14 and a second RE pair formed by RE #13 and RE #15 are arranged in the staggered manner; a second RE pair formed by RE #16 and RE #18 and a second RE pair formed by RE #17 and RE #19 are arranged in the staggered manner; and a second RE pair formed by RE #20 and RE #22 and a second RE pair formed by RE #21 and RE #23 are arranged in the staggered manner. In addition, the third RE and the fourth RE in each second RE pair have a same spacing. As shown in the figure, the third RE and the fourth RE in each second RE pair are separated by one subcarrier in frequency domain.

In addition, that the DMRS density is 3 in FIG. 6 is merely an example, and shall not constitute any limitation on this application. The DMRS density may be determined by the DMRS pattern. This application sets no limitation on the DMRS density. For example, the DMRS density may alternatively be 1. In this case, the first DMRS may be carried only in the first RE pair formed by RE #0 and RE #2, or may be carried only in the first RE pair formed by RE #4 and RE #6, or may be carried only in the first RE pair formed by RE #8 and RE #10. It should be understood that, a specific location of the first RE pair may be determined by the DMRS pattern.

The frequency-domain arrangement of the plurality of second RE pairs used to carry the first data in FIG. 6 is merely an example, and shall not constitute any limitation on this application. This application sets no limitation on an arrangement of a second RE pair in frequency domain. For example, a second RE pair may overlap a first RE pair in frequency domain. For example, the plurality of second RE pairs used to carry the first data may include RE #12, RE #14, RE #16, RE #18, RE #20, and RE #22. For another example, a second RE pair may alternatively be staggered with a first RE pair in frequency domain. For example, the plurality of second RE pairs used to carry the first data may include RE #13, RE #15, RE #17, RE #19, RE #21, and RE #23.

In a DMRS pattern of type 2 shown in (B), the first RE and the second RE are consecutive in frequency domain, or a quantity of subcarriers between the REs is zero. Corresponding to the mapping manner of the first DMRS, the third RE and the fourth RE that are used to carry the first data may also be consecutive in frequency domain.

As described above, the DMRS density shown in FIG. 6 is 3. In other words, a frequency-domain resource corresponding to one RB includes three first RE pairs used to carry the DMRS. It may be seen that, a spacing between adjacent first RE pairs in frequency domain may be the same. As shown in the figure, a first RE pair formed by RE #0 and RE #1 and a first RE pair formed by RE #4 and RE #5 may be separated by two subcarriers in frequency domain, and the first RE pair formed by RE #4 and RE #5 and a first RE pair formed by RE #8 and RE #9 may also be separated by two subcarriers in frequency domain.

In FIG. 6, a frequency-domain resource corresponding to one RB includes six second RE pairs used to carry the first data. It may be seen that, the six second RE pairs are consecutively arranged in frequency domain. As shown in the figure, a second RE pair formed by RE #12 and RE #13 and a second RE pair formed by RE #14 and RE #15 are consecutively arranged; a second RE pair formed by RE #16 and RE #17 and a second RE pair formed by RE #18 and RE #19 are consecutively arranged; and a second RE pair formed by RE #20 and RE #21 and a second RE pair formed by RE #22 and RE #23 are consecutively arranged. In addition, the third RE and the fourth RE in each second RE pair have a same spacing. As shown in the figure, the third RE and the fourth RE in each second RE pair are consecutive in frequency domain, that is, are separated by zero subcarriers. Two adjacent RE pairs have a same spacing in frequency domain. As shown in the figure, adjacent second RE pairs are consecutive in frequency domain, that is, are separated by zero subcarriers.

In addition, that the DMRS density is 3 in FIG. 6 is merely an example, and shall not constitute any limitation on this application. The DMRS density may be determined by the DMRS pattern. This application sets no limitation on the DMRS density. For example, the DMRS density may alternatively be 1. In this case, the first DMRS may be carried only in the first RE pair formed by RE #0 and RE #1, or may be carried only in the first RE pair formed by RE #4 and RE #5, or may be carried only in the first RE pair formed by RE #8 and RE #9. It should be understood that, a specific location of the first RE pair may be determined by the DMRS pattern.

The frequency-domain arrangement of the plurality of second RE pairs used to carry the first data in FIG. 6 is merely an example, and shall not constitute any limitation on this application. This application sets no limitation on an arrangement of a second RE pair in frequency domain. For example, a second RE pair may overlap a first RE pair in frequency domain. For example, the plurality of second RE pairs used to carry the first data may include RE #12, RE #13, RE #16, RE #17, RE #20, and RE #21. For another example, a second RE pair may alternatively be staggered with a first RE pair in frequency domain. For example, the plurality of second RE pairs used to carry the first data may include RE #14, RE #15, RE #18, RE #19, RE #22, and RE #23.

It should be understood that, in the schematic diagram of mapping a first DMRS and first data to a time-frequency resource shown in FIG. 6, the first data overlaps the first DMRS in frequency domain, and the first data is carried on each subcarrier on which the first DMRS is located. However, this shall not constitute any limitation on this application. For example, when the first DMRS occupies subcarriers #0, #2, #4, #6, #8, and #10 as shown in (A) in FIG. 6, the first data may occupy only subcarriers #1, #3, #5, #7, #9, and #11. For another example, when the first DMRS occupies subcarriers #0, #1, #4, #5, #8, and #9 as shown in (B) in FIG. 6, the first data may occupy only subcarriers #2, #3, #6, #7, #10, and #11. For still another example, when the first DMRS occupies subcarrier #0 (that is, RE #0 shown in the figure), RE #12 on the same subcarrier as RE #0 may not be used to carry the first data to the first terminal device, for example, may be used to carry another reference signal, such as a channel state information reference signal (CSI-RS), or may be used to carry data to another terminal device, or may not be used to carry a signal, or may be used to carry data to the first terminal device. However, because there is only one RE, the SFTD transmission scheme cannot be used, and another method requiring only one port may be used, for example, TS1.

FIG. 7 is another schematic diagram of mapping a first DMRS and first data to a time-frequency resource according to an embodiment of this application. In FIG. 7, a mapping manner of the first DMRS is different from a mapping manner of the first data. In other words, a quantity of subcarriers between the third RE and the fourth RE in the second RE pair is different from the quantity of subcarriers between the first RE and the second RE in the first RE pair.

(A) and (B) in FIG. 7 are respectively schematic diagrams of mapping the first DMRS and the first data to a time-frequency resource corresponding to different types of DMRS patterns. It may be seen that, in a DMRS pattern of type 1 shown in (A), the first RE and the second RE that are used to carry the first DMRS are separated by one subcarrier in frequency domain. Different from the mapping manner of the first DMRS, the third RE and the fourth RE that are used to carry the first data may be consecutive in frequency domain.

A DMRS density shown in FIG. 7 is 1. In other words, a frequency-domain resource corresponding to one RB includes one first RE pair used to carry the first DMRS. REs used to carry the first DMRS in the figure are RE #0 and RE #2, but this is merely an example and shall not constitute any limitation on this application. Specific locations of the REs used to carry the first DMRS may be determined by the DMRS pattern.

In FIG. 7, a frequency-domain resource corresponding to one RB includes six second RE pairs used to carry the first data. It may be seen that, the six second RE pairs may be consecutively arranged in frequency domain. As shown in the figure, a second RE pair formed by RE #12 and RE #13 and a second RE pair formed by RE #14 and RE #15 are consecutively arranged; a second RE pair formed by RE #16 and RE #17 and a second RE pair formed by RE #18 and RE #19 are consecutively arranged; and a second RE pair formed by RE #20 and RE #21 and a second RE pair formed by RE #22 and RE #23 are consecutively arranged. In addition, the third RE and the fourth RE in each second RE pair have a same spacing. As shown in the figure, the third RE and the fourth RE in each second RE pair are consecutive in frequency domain, that is, are separated by zero subcarriers. Two adjacent RE pairs have a same spacing in frequency domain. As shown in the figure, adjacent second RE pairs are consecutive in frequency domain, that is, are separated by zero subcarriers.

In a DMRS pattern of type 2 shown in (B), the first RE and the second RE are consecutive in frequency domain. Different from the mapping manner of the first DMRS, the third RE and the fourth RE that are used to carry the first data may be separated by one subcarrier in frequency domain.

A DMRS density shown in FIG. 7 is 1. In other words, a frequency-domain resource corresponding to one RB includes one first RE pair used to carry the first DMRS. REs used to carry the first DMRS in the figure are RE #0 and RE #1, but this is merely an example and shall not constitute any limitation on this application. Specific locations of the REs used to carry the first DMRS may be determined by the DMRS pattern.

In FIG. 7, a frequency-domain resource corresponding to one RB includes six second RE pairs used to carry the first data. As shown in the figure, a second RE pair formed by RE #12 and RE #14 and a second RE pair formed by RE #13 and RE #15 are arranged in the staggered manner; a second RE pair formed by RE #16 and RE #18 and a second RE pair formed by RE #17 and RE #19 are arranged in the staggered manner; and a second RE pair formed by RE #20 and RE #22 and a second RE pair formed by RE #21 and RE #23 are arranged in the staggered manner. In addition, the third RE and the fourth RE in each second RE pair have a same spacing. As shown in the figure, the third RE and the fourth RE in each second RE pair are separated by one subcarrier in frequency domain.

It should be understood that, FIG. 6 and FIG. 7 show several possible cases in which the first DMRS and the first data are mapped to a time-frequency resource. However, this shall not constitute any limitation on this application. As described above, the first RE and the second RE in the first RE pair may be separated by at least one RE. Although not shown in the figure, the first RE and the second RE may be separated by two or more REs. The third RE and the fourth RE in the second RE pair may be separated by at least one RE. Although not shown in the figure, the third RE and the fourth RE may be separated by two or more REs. In addition, the mapping manner of the first DMRS may be the same as or different from the mapping manner of the first data. In a same RB, the first RE and the second RE in the first RE pair may be consecutive or may be separated by one subcarrier in frequency domain, and the third RE and the fourth RE in the second RE pair may be separated by two or more subcarriers in frequency domain. In a same RB, the first RE and the second RE in the first RE pair may be separated by two or more subcarriers in frequency domain, and the third RE and the fourth RE in the second RE pair may be consecutive or may be separated by one subcarrier in frequency domain. For brevity, examples are not illustrated herein one by one.

It should further be understood that, in the schematic diagrams of mapping a first DMRS and first data to a time-frequency resource shown in FIG. 6 and FIG. 7, the first data and the first DMRS may use a same frequency-domain resource, and the first data is carried on each subcarrier on which the first DMRS is located. However, this shall not constitute any limitation on this application. For example, when the first DMRS occupies subcarriers #0, #2, #4, #6, #8, and #10 as shown in (A) in FIG. 6, the first data may occupy only subcarriers #1, #3, #5, #7, #9, and #11. For another example, when the first DMRS occupies subcarriers #0, #1, #4, #5, #8, and #9 as shown in (B) in FIG. 6, the first data may occupy only subcarriers #2, #3, #6, #7, #10, and #11. For still another example, when the first DMRS occupies subcarrier #0 (that is, RE #0 shown in the figure), RE #12 on the same subcarrier as RE #0 may not be used to carry the first data to the first terminal device, for example, may be used to carry another reference signal, such as a channel state information reference signal (channel state information reference signal, CSI-RS), or may be used to carry data to another terminal device, or may not be used to carry a signal, or may be used to carry data to the first terminal device. However, because there is only one RE, the SFTD transmission scheme cannot be used, and another method requiring only one port may be used, for example, TS1.

Because the first DMRS and the first data undergo same Alamouti coding, a data symbol mapped to the first data port and a data symbol mapped to the second data port may be associated with each other. As described above, in data symbols carried by each first RE pair, the symbol mapped to the second data port may be obtained by performing Alamouti coding based on the data symbol mapped to the first data port.

Figure 8:
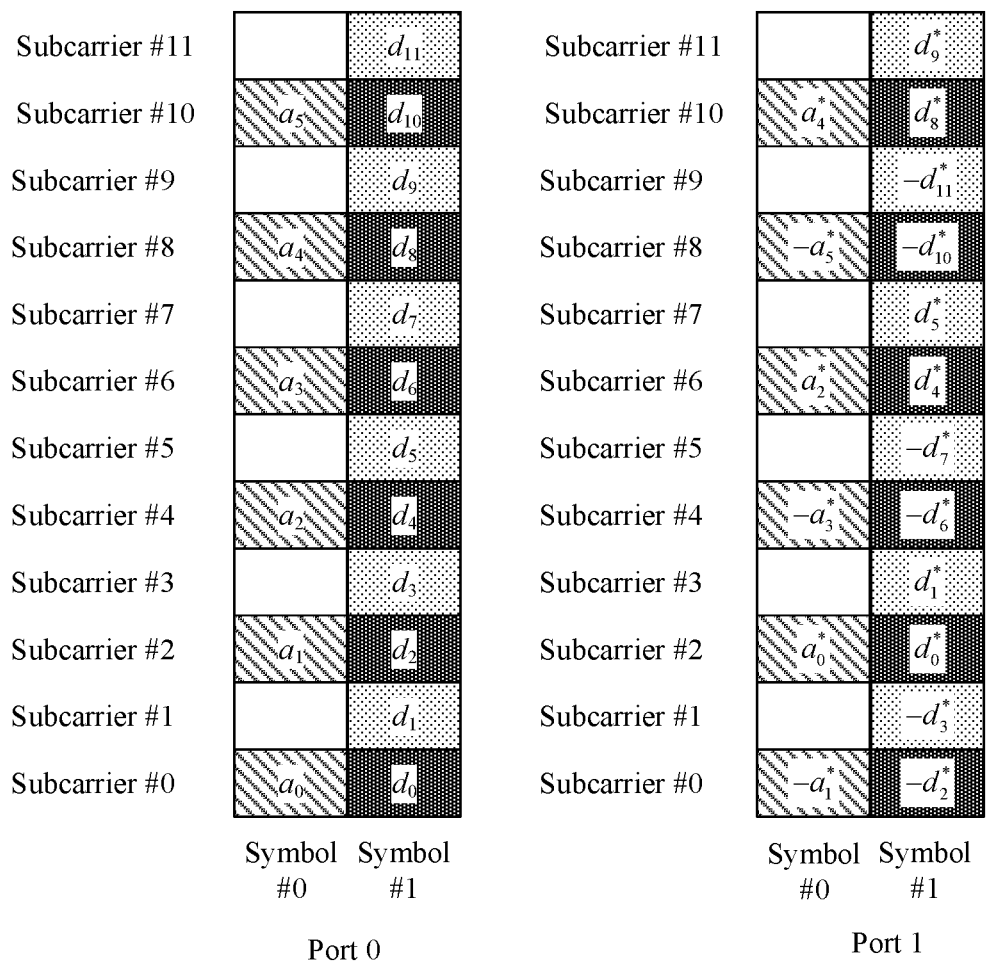
Figure 9:
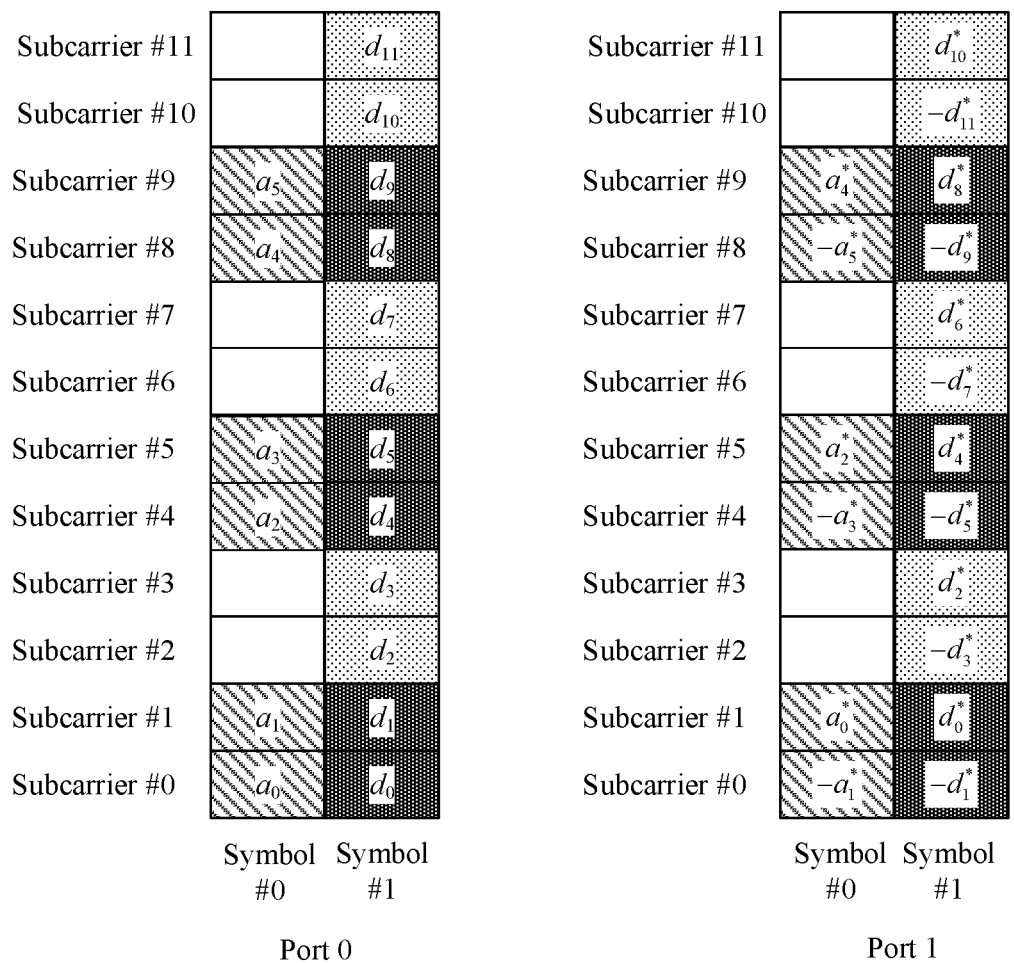

With reference to FIG. 8 and FIG. 9, the following uses the schematic diagram of mapping a first DMRS and first data to a time-frequency resource in FIG. 6 as an example to describe in detail symbols of the first DMRS and symbols of the first data that are mapped to port 0 and port 1. It should be noted that, for ease of distinguishing between data symbols corresponding to different data ports in the figures, port 0 and port 1 are illustrated separately. However, it should be understood that, this shall not constitute any limitation on this application. Port 0 and port 1 occupy a same time-frequency resource in one RB, that is, time-frequency resources used by port 0 and port 1 shown in the figures overlap.

It should be further noted that, FIG. 8 and FIG. 9 show the symbols on port 0 and port 1 merely for ease of understanding. For the first DMRS, port 0 and port 1 may be considered as examples of the first DMRS port and the second DMRS port. For the first data, port 0 and port 1 may be considered as examples of the first data port and the second data port. It may be understood that, port 0 and port 1 multiplex a same time-frequency resource, regardless of whether the ports are DMRS ports or data ports.

Because the quantity of subcarriers in frequency domain between the third RE and the fourth RE in the second RE pair used to carry data is the same as the quantity of subcarriers in frequency domain between the first RE and the second RE in the first RE pair, data symbols on port 0 and data symbols on port 1 that are mapped to a same second RE pair are associated with each other.

FIG. 8 is a schematic diagram of mapping a first DMRS and data to a time-frequency resource when a DMRS pattern is of type 1.

As shown in the figure, for example, the data symbols mapped to port 0 may be denoted as $\{d_0, d_1, d_2, d_3, d_4, d_5, d_6, d_7, d_8, d_9, d_{10}, d_{11}\}$, and the data symbols $\{-d^*_2, -d^*_3, d^*_0, d^*_1, -d^*_6, -d^*_7, d^*_4, d^*_5, -d^*_{10}, -d^*_{11}, d^*_8, d^*_9\}$ mapped to port 1 may be obtained by performing Alamouti coding.

In each second RE pair, the data symbols mapped to port 1 may be obtained by performing Alamouti coding on the data symbols mapped to port 0. As shown in the figure: REs on OFDM symbol #1 that correspond to subcarrier #0 and subcarrier #2 form a second RE pair. In the second RE pair, symbols mapped to port 0 are $\{d_0, d_2\}$, and symbols $\{-d^*_2, d^*_0\}$ mapped to port 1 may be obtained by performing Alamouti coding. REs on OFDM symbol #1 that correspond to subcarrier #1 and subcarrier #3 form a second RE pair. In the second RE pair, symbols mapped to port 0 are $\{d_1, d_3\}$, and symbols $\{-d^*_3, d^*_1\}$ mapped to port 1 may be obtained by performing Alamouti coding. REs on OFDM symbol #1 that correspond to subcarrier #4 and subcarrier #6 form a second RE pair. In the second RE pair, symbols mapped to port 0 are $\{d_4, d_6\}$, and symbols $\{-d^*_6, d^*_4\}$ mapped to port 1 may be obtained by performing Alamouti coding. REs on OFDM symbol #1 that correspond to subcarrier #5 and subcarrier #7 form a second RE pair. In the second RE pair, symbols mapped to port 0 are $\{d_5, d_7\}$, and symbols $\{-d^*_7, d^*_5\}$ mapped to port 1 may be obtained by performing Alamouti coding. REs on OFDM symbol #1 that correspond to subcarrier #8 and subcarrier #10 form a second RE pair. In the second RE pair, symbols mapped to port 0 are $\{d_8, d_{10}\}$, and symbols $\{-d^*_{10}, d^*_8\}$ mapped to port 1 may be obtained by performing Alamouti coding. REs on OFDM symbol #1 that correspond to subcarrier #9 and subcarrier #11 form a second RE pair. In the second RE pair, symbols mapped to port 0 are $\{d_9, d_{11}\}$, and symbols $\{-d^*_{11}, d^*_9\}$ mapped to port 1 may be obtained by performing Alamouti coding.

FIG. 9 is a schematic diagram of mapping a first DMRS and first data to a time-frequency resource when a DMRS pattern is of type 2. As shown in the figure, for example, the data symbols mapped to port 0 may be denoted as $\{d_0, d_1, d_2, d_3, d_4, d_5, d_6, d_7, d_8, d_9, d_{10}, d_{11}\}$, and the data symbols $\{-d^*_1, d^*_0, -d^*_3, d^*_2, -d^*_5, d^*_4, -d^*_7, d^*_6, -d^*_9, d^*_8, -d^*_{11}, d^*_{10}\}$ mapped to port 1 may be obtained by performing Alamouti coding.

In each second RE pair, the data symbols mapped to port 1 may be obtained by performing Alamouti coding on the data symbols mapped to port 0. As shown in the figure: REs on OFDM symbol #1 that correspond to subcarrier #0 and subcarrier #1 form a second RE pair. In the second RE pair, symbols mapped to port 0 are $\{d_0, d_1\}$, and symbols $\{-d^*_1, d^*_0\}$ mapped to port 1 may be obtained by performing Alamouti coding. REs on OFDM symbol #1 that correspond to subcarrier #2 and subcarrier #3 form a second RE pair. In the second RE pair, symbols mapped to port 0 are $\{d_2, d_3\}$, and symbols $\{-d^*_3, d^*_2\}$ mapped to port 1 may be obtained by performing Alamouti coding. REs on OFDM symbol #1 that correspond to subcarrier #4 and subcarrier #5 form a second RE pair. In the second RE pair, symbols mapped to port 0 are $\{d_4, d_5\}$, and symbols $\{-d^*_5, d^*_4\}$ mapped to port 1 may be obtained by performing Alamouti coding. REs on OFDM symbol #1 that correspond to subcarrier #6 and subcarrier #7 form a second RE pair. In the second RE pair, symbols mapped to port 0 are $\{d_6, d_7\}$, and symbols $\{-d^*_7, d^*_6\}$ mapped to port 1 may be obtained by performing Alamouti coding. REs on OFDM symbol #1 that correspond to subcarrier #8 and subcarrier #9 form a second RE pair. In the second RE pair, symbols mapped to port 0 are $\{d_8, d_9\}$, and symbols $\{-d^*_9, d^*_8\}$ mapped to port 1 may be obtained by performing Alamouti coding. REs on OFDM symbol #1 that correspond to subcarrier #10 and subcarrier #11 form a second RE pair. In the second RE pair, symbols mapped to port 0 are $\{d_{10}, d_{11}\}$, and symbols $\{-d^*_{11}, d^*_{10}\}$ mapped to port 1 may be obtained by performing Alamouti coding.

2. The first DMRS and the first data undergo space-time coding, that is, the transmission scheme of the first data is STTD.

When the first DMRS undergoes Alamouti space-time coding, the first RE and the second RE in each first RE pair may be consecutive in time domain, or the first RE and the second RE in each first RE pair may be separated by at least one OFDM symbol in time domain.

Relative positions of the first RE and the second RE and a quantity of REs used as a spacing may be determined by the DMRS pattern described above.

In DMRS symbols carried by each first RE pair, a symbol mapped to the second DMRS port may be obtained by performing Alamouti coding based on a symbol mapped to the first DMRS port. Therefore, in the STTD transmission scheme, the DMRS symbol mapped to the first DMRS port and the DMRS symbol mapped to the second DMRS port may be obtained based on two identical PN sequences.

Figure 10:
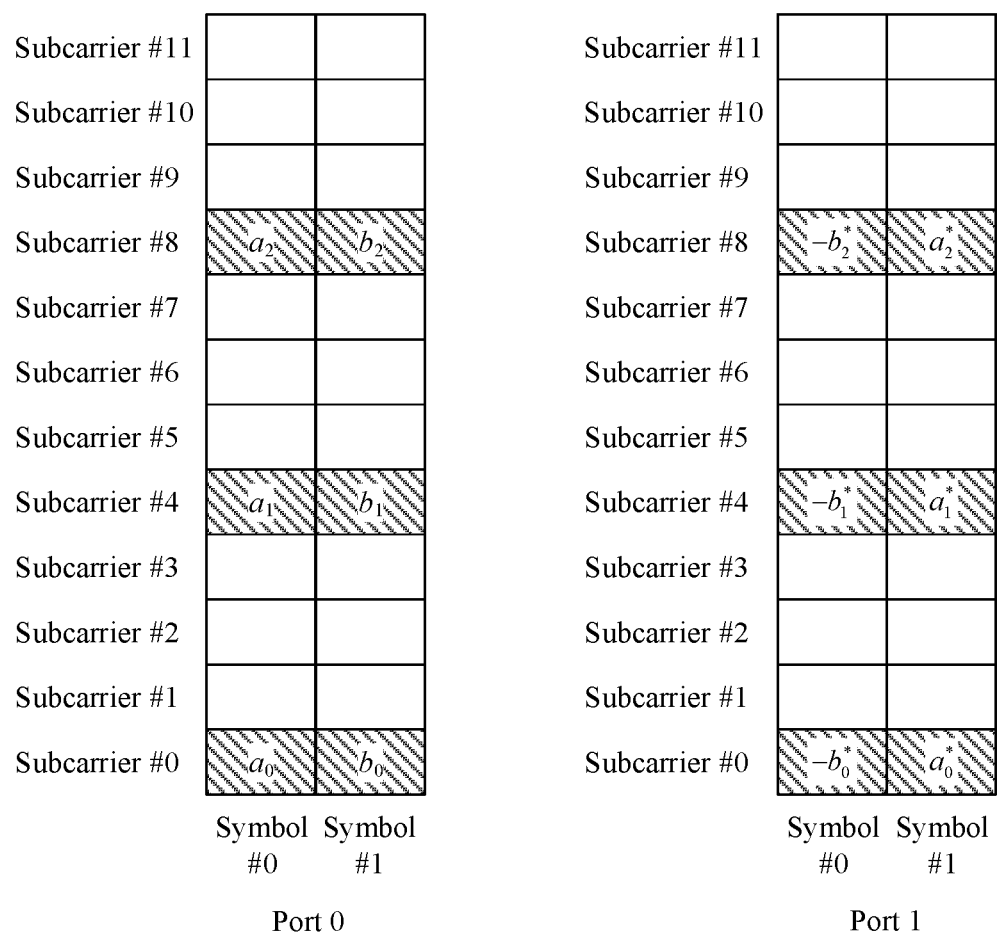
FIG. 10 is a schematic diagram of mapping a first DMRS to a time-frequency resource according to an embodiment of this application.

FIG. 10 is still another schematic diagram of mapping a first DMRS to a time-frequency resource according to an embodiment of this application. It should be noted that, for ease of distinguishing between DMRSs of different DMRS ports, port 0 (namely, an example of the first DMRS port) and port 1 (namely, an example of the second DMRS port) are separately illustrated in the figure. However, it should be understood that, this shall not constitute any limitation on this application. As shown in the figure, port 0 and port 1 occupy a same time-frequency resource in one RB, that is, time-frequency resources used by port 0 and port 1 shown in the figure overlap. Assuming that a DMRS corresponding to port 0 and port 1 is the first DMRS sent to the first terminal device, in addition to REs on which the DMRS corresponding to port 0 and port 1 is located, remaining REs in the RB may also be used to carry a DMRS, for example, a DMRS sent to another terminal device, or may be used to carry data, for example, the first data sent to the first terminal device or data sent to another terminal device, or may not be used to carry a signal. This application sets no limitation thereto. In addition, when the REs are used to carry a DMRS sent to another terminal device, the REs may carry DMRSs corresponding to other ports (for example, port 2 and port 3). The DMRSs corresponding to port 2 and port 3 may be DMRSs sent to different terminal devices, or may be DMRSs sent to a same terminal device. This application sets no limitation thereto.

Specifically, the first DMRS shown in FIG. 10 may be carried on two consecutive OFDM symbols (symbols #0 and #1 shown in the figure). The first RE pair used to carry the first DMRS may be distributed on the two OFDM symbols. As shown in the figure, the first RE and the second RE in a same first RE pair are consecutive in time domain, and are located on a same subcarrier.

FIG. 10 shows a case with three first RE pairs. The three first RE pairs may be distributed on OFDM symbols #0 and #1, and are discretely distributed in frequency domain. However, it should be understood that, this shall not constitute any limitation on this application. A specific quantity of first RE pairs, that is, a DMRS density, and locations of the first RE pairs in frequency domain may be determined by a DMRS pattern. In addition, a plurality of first RE pairs may be consecutively distributed or discretely distributed in frequency domain. This application sets no limitation thereto.

As shown in the figure, port 0 and port 1 multiplex a same time-frequency resource. For example, in a DMRS corresponding to port 0, DMRS symbols mapped to OFDM symbol #0 may be denoted as $\{a_0, a_1, a_2\}$, and DMRS symbols mapped to OFDM symbol #1 may be denoted as $\{b_0, b_1, b_2\}$. That is, the DMRS symbols mapped to symbol #0 and those mapped to symbol #1 are two different sequences, and correspond to different initial values $c_{init}$, which may be obtained by using formula 2 described above. Alamouti coding is separately performed on the symbols $\{a_0, b_0\}$, $\{a_1, b_1\}$, and $\{a_2, b_2\}$ of the first RE pair that are on port 0, and symbols $\{-b^*_0, a^*_0\}$, $\{-b^*_1, a^*_1\}$, and $\{-b^*_2, a^*_2\}$ on port 1 may be obtained. The symbols $\{a_0, -n^*_0\}$ may be mapped to an RE corresponding to OFDM symbol #0 and subcarrier #0, and the symbols $\{b_0, a^*_0\}$ may be mapped to an RE corresponding to OFDM symbol #1 and subcarrier #0, and the two REs form a first RE pair. The symbols $\{a_1, -b^*_1\}$ may be mapped to an RE corresponding to OFDM symbol #0 and subcarrier #4, and the symbols $\{b_1, a^*_1\}$ may be mapped to an RE corresponding to OFDM symbol #1 and subcarrier #4, and the two REs form another first RE pair. The symbols $\{a_2, -b^*_2\}$ may be mapped to an RE corresponding to OFDM symbol #0 and subcarrier #8, and the symbols $\{b_2, a^*_2\}$ may be mapped to an RE corresponding to OFDM symbol #1 and subcarrier #8, and the two REs form still another first RE pair.

It may be learned that, the REs occupied by the first DMRS that correspond to port 0 and port 1 are classified into groups, where one group includes two REs consecutive in time domain and associated with each other. For example, on each subcarrier, for symbols carried on OFDM symbols #0 and #1, a symbol on port 1 is obtained by performing Alamouti coding on a symbol on port 0.

It should be understood that, FIG. 10 is merely a schematic diagram for ease of understanding, and shall not constitute any limitation on this application. The first RE and the second RE in a same first RE pair may alternatively be separated by at least one OFDM symbol in time domain. In this case, a relationship between symbols on two ports in a same first RE pair is similar to the relationship describe above. In one first RE pair, a symbol on the second DMRS port may be obtained by performing Alamouti coding on a symbol on the first DMRS port. For brevity, details are not described herein with reference to the accompanying drawings.

Similar to the first DMRS, the first data may also be carried in at least one second RE pair. The first RE pair and the second RE pair do not overlap in at least one dimension of time domain or frequency domain. When the first data undergoes Alamouti space-time coding, the third RE and the fourth RE in each second RE pair may be consecutive in time domain, or the third RE and the fourth RE in each second RE pair may be separated by at least one OFDM symbol in time domain.

Figure 11:
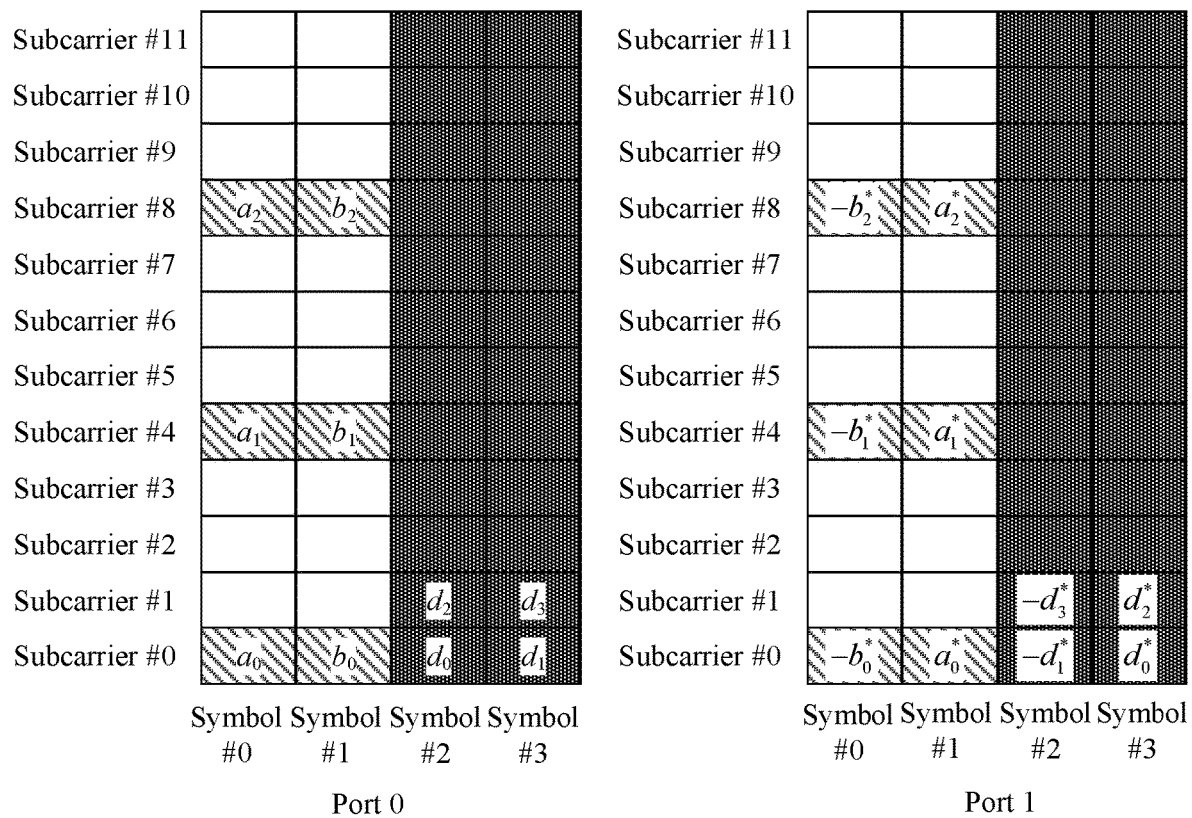
FIG. 11 and FIG. 12 are schematic diagrams of mapping a first DMRS and first data to a time-frequency resource according to an embodiment of this application.
Figure 12:
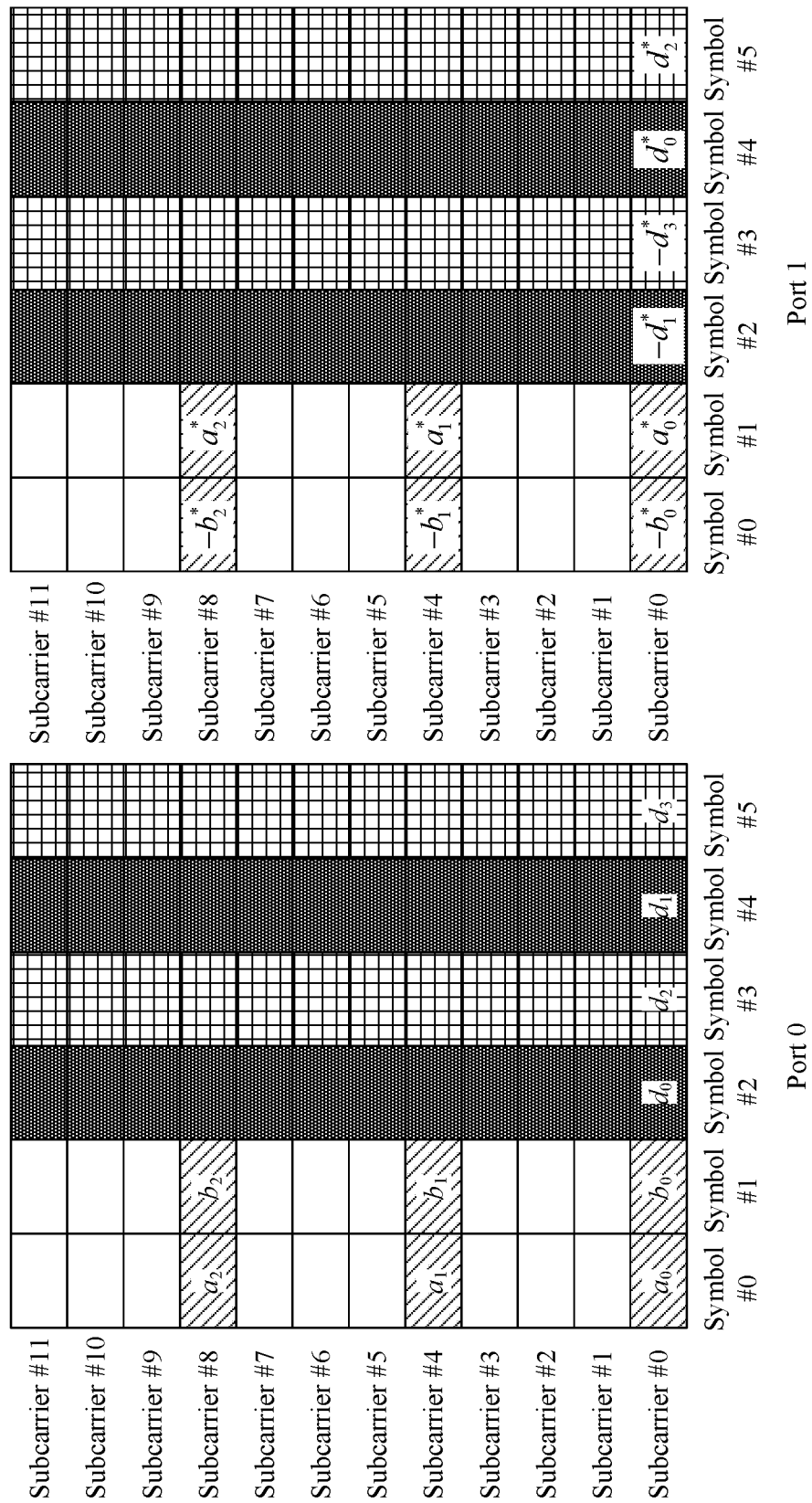

FIG. 11 and FIG. 12 are other schematic diagrams of mapping a first DMRS and first data to a time-frequency resource. It should be noted that, for ease of distinguishing between data symbols corresponding to different ports in the figures, port 0 and port 1 are illustrated separately. However, it should be understood that, this shall not constitute any limitation on this application. Port 0 and port 1 occupy a same time-frequency resource in one RB, that is, time-frequency resources used by port 0 and port 1 shown in the figures overlap.

It should be noted that, FIG. 11 and FIG. 12 show the symbols on port 0 and port 1 merely for ease of understanding. For the first DMRS, port 0 and port 1 may be considered as examples of the first DMRS port and the second DMRS port. For the first data, port 0 and port 1 may be considered as examples of the first data port and the second data port. It may be understood that, port 0 and port 1 multiplex a same time-frequency resource, regardless of whether the ports are DMRS ports or data ports.

In FIG. 11, the second RE pair used to carry the first data may be two REs consecutive in time domain, and a symbol mapped to port 1 may be obtained by performing Alamouti coding on a symbol mapped to port 0. For example, as shown in the figure: REs corresponding to OFDM symbols #2 and #3 on subcarrier #0 form a second RE pair. In the second RE pair, symbols $\{-d^*_1, d^*_0\}$ mapped to port 1 may be obtained by performing Alamouti coding on symbols $\{d_0, d_1\}$ mapped to port 0. REs corresponding to OFDM symbols #2 and #3 on subcarrier #1 form a second RE pair. In the second RE pair, symbols $\{-d^*_3, d^*_2\}$ mapped to port 1 may be obtained by performing Alamouti coding on symbols $\{d_2, d_3\}$ mapped to port 0. By analogy, data symbols carried on OFDM symbols #2 and #3 on another subcarrier may be obtained. For brevity, details are not listed one by one herein.

In FIG. 12, the second RE pair used to carry the first data may be two REs that are separated by one RE in time domain, and a symbol mapped to port 1 may be obtained by performing Alamouti coding on a symbol mapped to port 0. For example, as shown in the figure: On REs corresponding to OFDM symbols #2 and #4 on subcarrier #0, symbols $\{-d^*_1, d^*_0\}$ mapped to port 1 may be obtained by performing Alamouti coding on symbols $\{d_0, d_1\}$ mapped to port 0. On REs corresponding to OFDM symbols #3 and #5 on subcarrier #0, symbols $\{-d^*_3, d^*_2\}$ mapped to port 1 may be obtained by performing Alamouti coding on symbols $\{d_2, d_3\}$ mapped to port 0. By analogy, data symbols carried on OFDM symbols #2 to #5 on another subcarrier may be obtained. For brevity, details are not listed one by one herein.

It should be understood that, FIG. 11 and FIG. 12 are merely schematic diagrams, and show two OFDM symbols (symbols #0 and #1 shown in the figures) used to carry the first DMRS and two OFDM symbols (for example, symbols #2 and #3 shown in FIG. 10) or four OFDM symbols (for example, symbols #2 to #5 shown in FIG. 11) used to carry the first data in one RB. However, this shall not constitute any limitation on this application. In STTD, the first DMRS may be mapped to two or more OFDM symbols, and the first data may be mapped to two or more OFDM symbols or may be mapped to OFDM symbols that are the same as those of the first DMRS, that is, occupy a time-domain resource same as but a frequency-domain resource different from that of the first DMRS.

It should further be understood that, in the schematic diagrams of mapping a first DMRS and first data to a time-frequency resource shown in FIG. 11 and FIG. 12, the first data and the first DMRS may use a same frequency-domain resource, and the first data is carried on each subcarrier on which the first DMRS is located. However, this shall not constitute any limitation on this application. For example, when the first DMRS occupies subcarriers #0, #4, and #8 as shown in FIG. 11, the first data may occupy only subcarriers #1 to #3, #5 to #7, and #9 to #11.

The foregoing describes in detail, with reference to FIG. 4 to FIG. 12, a specific process of performing Alamouti coding and resource mapping on the first DMRS and the first data in the SFTD and STTD transmission schemes. Based on the foregoing processing, the network device may send the first DMRS and the first data in operation 320.

It should be noted that, with the SFTD transmission scheme used, when a channel experienced by the second RE pair in frequency domain is consistent with that experienced by the first RE pair in frequency domain, an equivalent channel matrix estimated based on the received first DMRS is relatively accurate. Therefore, when the quantity of subcarriers between the third RE and the fourth RE in the second RE pair is the same as the quantity of subcarriers between the first RE and the second RE in the first RE pair, the equivalent channel matrix estimated by using the first DMRS is relatively accurate, and therefore receiving quality of the first data can be improved. Similarly, with the STTD transmission scheme used, when a channel experienced by the second RE pair in time domain is consistent with that experienced by the first RE pair in time domain, an equivalent channel matrix estimated based on the received first DMRS is relatively accurate. Therefore, when a quantity of OFDM symbols between the third RE and the fourth RE in the second RE pair is the same as a quantity of OFDM symbols between the first RE and the second RE in the first RE pair, the equivalent channel matrix estimated by using the first DMRS is relatively accurate, and therefore receiving quality of the data can be improved. In the following operation 340, a detailed process of demodulating the first data by the first terminal device is described with reference to the accompanying drawings. Details of the specific process are omitted herein.

In operation 340, the first terminal device demodulates the first data based on the first DMRS to obtain an estimate of the first data.

In an embodiment, the first terminal device may estimate the equivalent channel matrix based on the received first DMRS and a first DMRS generated by the first terminal device, and demodulate the first data based on the estimated equivalent channel matrix to obtain the estimate of the first data.

In an embodiment of this application, because the first DMRS is related to a transmission scheme, the first terminal device needs to generate a first DMRS based on the transmission solution. In an embodiment, before operation 340, the method 300 further includes operation 350: The network device sends second indication information, where the second indication information is used to indicate a transmission scheme used to transmit the first data.

Correspondingly, in operation 350, the first terminal device receives second indication information, where the second indication information is used to indicate a transmission scheme used to transmit the first data.

In an embodiment, the second indication information may be carried in an RRC message or a MAC control element (control element, CE), or may be carried in DCI. This application sets no limitation thereto. It may be understood that, the second indication information may be notified to the first terminal device before the first DMRS and the first data are transmitted, regardless of whether the second indication information is carried in the RRC message, the MAC CE, or the DCI, so that the first terminal device demodulates the first data based on the transmission scheme.

After determining, based on the second indication information, the transmission scheme used by the network device to transmit the first data, the first terminal device may generate the first DMRS based on the transmission scheme, so that the first DMRS and the first data undergo same processing, for example, the foregoing Alamouti coding. In this way, the first terminal device may estimate the equivalent channel matrix based on the generated first DMRS and the received first DMRS.

A person skilled in the art may understand that, the first DMRS sent by the network device may be denoted as a vector y, and the first DMRS generated by the first terminal device may be denoted as a vector x. Therefore, the first DMRS sent by the network device and the first DMRS generated by the first terminal device may meet the following relationship:

$$y=Hx+n$$

H represents an equivalent channel matrix, and n represents receiver noise. It is easy to see that, the receiver noise n affects a received signal. Because there are already a plurality of prior-art solutions for eliminating the foregoing noise, in this embodiment of this application, for ease of description, it is assumed that the receiver noise is zero, that is, the signal is transmitted without noise.

According to the foregoing relationship, the first terminal device may estimate the equivalent channel matrix based on the received first DMRS and the first DMRS generated by the first terminal device, so as to further demodulate the first data.

In another aspect, as described above, when receiving the first data, the first terminal device may be interfered with by another terminal device. Therefore, the first terminal device may further perform interference estimation based on the received DMRS, so as to demodulate the data more accurately.

For ease of distinguishing and description, another terminal device that interferes with the first terminal device is denoted as a second terminal device, a DMRS sent by the network device to the second terminal device may be denoted as a second DMRS, and data sent by the network device to the second terminal device may be denoted as second data. It may be understood that, there may be one or more second terminal devices. This application sets no limitation thereto.

In an embodiment, operation 340 includes the following operations:

Operation 3401: The first terminal device receives a second DMRS and second data. Correspondingly, the network device sends a second DMRS and second data.

Operation 3402: The first terminal device demodulates the first data based on the first DMRS and the second DMRS.

The second DMRS and the first DMRS may be DMRSs sent by a same network device, or may be DMRSs sent by different network devices. Correspondingly, the second data and the first data may be data sent by a same network device, or may be data sent by different network devices. This application sets no limitation thereto. In this embodiment, the second DMRS and the first DMRS may occupy a same time-frequency resource, and the first data and the second data may also occupy a same time-frequency resource. Therefore, when receiving the first DMRS and the first data, the first terminal device receives the second DMRS and the second data from the network device. The second DMRS and the second data are signals that interfere with the first terminal device.

Operation 3402 may further include the following:

the first terminal device determines an interference and noise covariance matrix based on the first DMRS and the second DMRS; and the first terminal device demodulates the data based on the interference and noise covariance matrix, to obtain the estimate of the first data.

In the prior art, a transmission scheme supported by a protocol includes TS1 listed above. When the transmission scheme is TS1, the DMRS and the data undergo same processing. Specifically, the network device may perform resource mapping on a DMRS based on an existing DMRS pilot pattern, and DMRS sequences between ports may be mutually independent. The network device may also perform resource mapping on data based on different DMRS mapping types, and data symbols between ports may be mutually independent. The network device may send respective DMRSs to different terminal devices over different DMRS ports, and send respective data to the different terminal devices over different data ports.

However, in a future protocol, a transmission scheme may not be limited to TS1, for example, may further include SFTD, STTD, and the like. On the basis of further extension on the transmission scheme, this application further proposes the following: When the transmission scheme is SFTD or STTD, same Alamouti coding processing is performed on a DMRS and data, so that the DMRS and the data undergo the same Alamouti coding.

In other words, the DMRS and the data may undergo the same processing in any transmission scheme regardless of what transmission scheme is used. For the first terminal device, the first DMRS and the first data that are sent to the first terminal device undergo the same processing, and the second DMRS and the second data that are sent to the second terminal device and that interfere with the first terminal device also undergo the same processing. Therefore, the first terminal device may estimate, based on the second DMRS, the equivalent channel matrix used to transmit the second data, so as to determine the interference and noise covariance matrix.

Specifically, the first terminal device may determine an interference and noise covariance matrix on a data signal of another terminal device based on the following formula:

$$\overline{R}=E(G_{data}G_{data}^H)+N_0I$$

$G_{data}$ represents an equivalent channel matrix used for the second data, $N_0$ represents energy of noise, and I is a unit matrix.

Because the interfering DMRS (that is, the second DMRS) and the interfering data (that is, the second data) also undergo the same processing, an equivalent channel matrix experienced by the second data may be replaced by an equivalent channel matrix $G_{DMRS}$ experienced by the second DMRS.

Therefore, the foregoing formula may be converted into $\overline{R}=E(G_{DMRS}G_{DMRS}^H)+N_0I$. In other words, an interference and noise covariance matrix of the second DMRS may be used as an interference and noise covariance matrix of the second data.

In another aspect, a signal received by the first terminal device on the REs (that is, the REs in the foregoing first RE pair) used to carry the first DMRS may be represented as $s=H_{DMRS}a+G_{DMRS}e+n_0$. $H_{DMRS}a$ represents a precoded first DMRS sent to the first terminal device. a represents the first DMRS to be sent to the first terminal device. $H_{DMRS}$ represents an equivalent channel matrix used to transmit the first data. $G_{DMRS}e$ represents a precoded second DMRS sent to the second terminal device but received by the first terminal device. e represents a second DMRS to be sent to the second terminal device. $n_0$ represents noise.

According to the foregoing relationship $G_{data}=G_{DMRS}$ and $s=H_{DMRS}a+G_{DMRS}e+n_0$, the following may be obtained: $G_{data}e+n_0=s-H_{DMRS}a$.

Therefore, it may be learned that the interference and noise covariance matrix on the plurality of REs is $\bar{R}=E[(s-H_{DMRS}a)^H(s-H_{DMRS}a)]$. The plurality of REs may be one or more first RE pairs in one RB, or may be a plurality of first RE pairs in a plurality of RBs. This application sets no limitation thereto.

After obtaining the equivalent channel matrix $H_{DMRS}$ and the interference and noise covariance matrix $\bar{R}$, the first terminal device may further obtain the estimate $\tilde{x}=H_{data}^H(H_{data}H_{data}^H+\bar{R})^{-1}y$ based on the formula $y=H_{data}x+N_0$. $H_{data}$ represents the equivalent channel matrix used for data transmission of the first terminal device. y represents the signal received by the first terminal device, $x$ represents a signal of the first data to be sent to the first terminal device. $\tilde{x}$ represents the estimate of the first data $x$.

As described in detail above, the first data and the first DMRS undergo the same Alamouti coding, and therefore the equivalent channel matrix $H_{data}$ of the first data may be the same as the equivalent channel matrix $H_{DMRS}$ experienced by the first DMRS. The first terminal device may obtain the equivalent channel matrix $H_{DMRS}$ based on the received first DMRS and the first DMRS generated by the first terminal device. A specific process of channel estimation may be the same as that in the prior art. For brevity, a detailed description of the specific process is omitted herein.

Afterwards, the first terminal device may restore data based on the interference and noise covariance matrix by using a receiving algorithm in the prior art. As an example instead of a limitation, the receiving algorithm may be the minimum mean square error (minimum mean square error, MMSE)-interference rejection combining (interference rejection combining, IRC) receiving algorithm. A receiving algorithm for processing a received signal and a specific data demodulation process may be the same as those in the prior art. For brevity, a detailed description of the specific process thereof is omitted herein.

Figure 13:
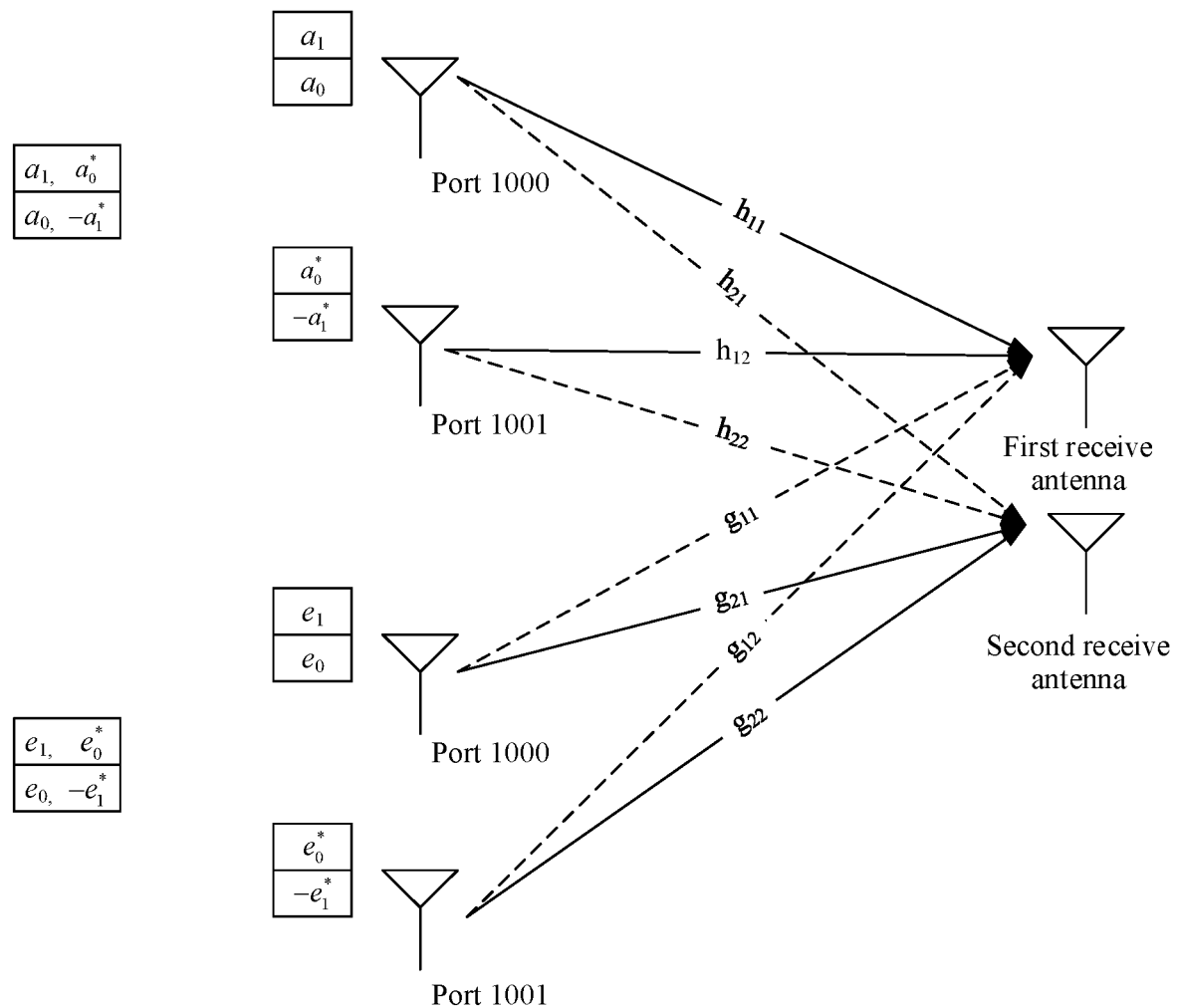
FIG. 13 to FIG. 15 are schematic diagrams of a scenario according to an embodiment of this application.
Figure 14:
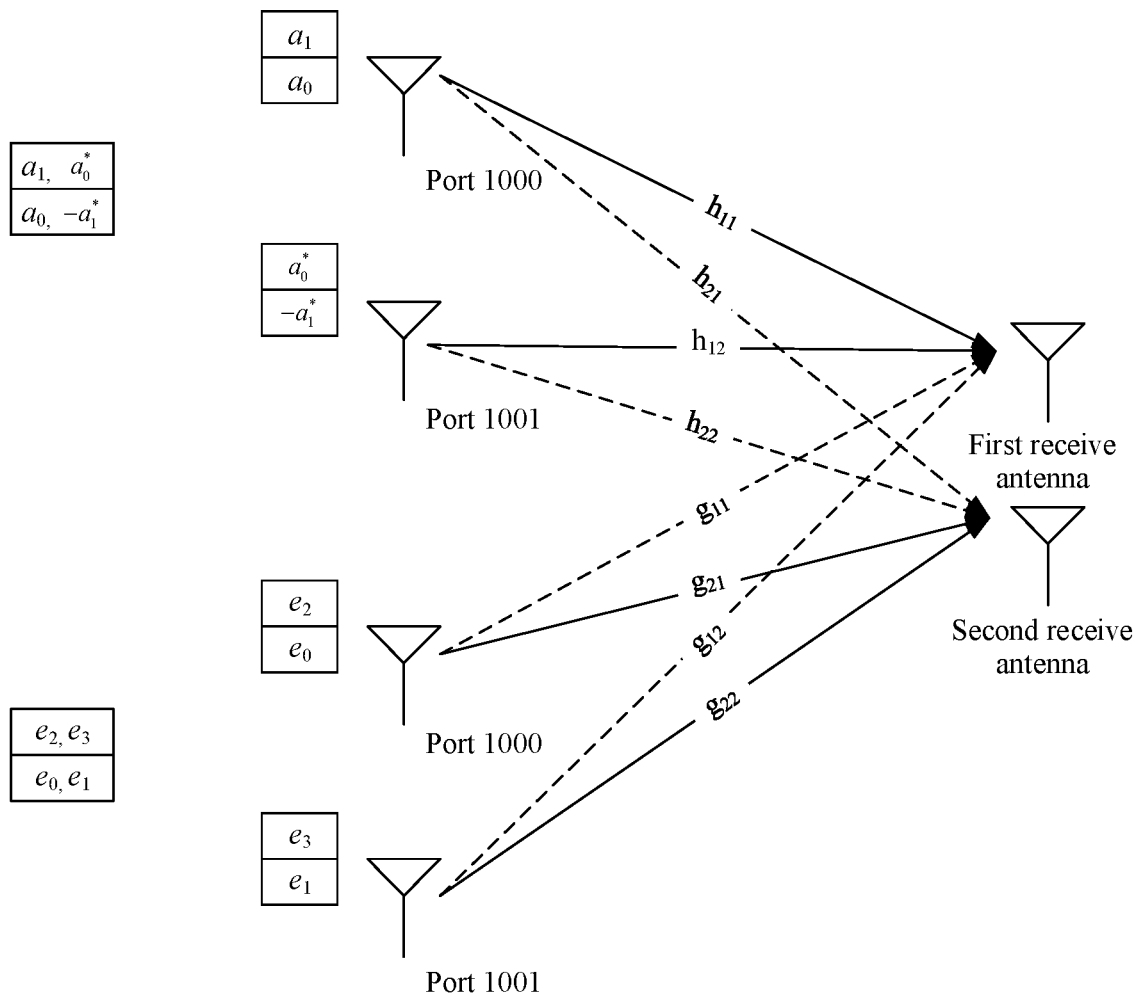
Figure 15:
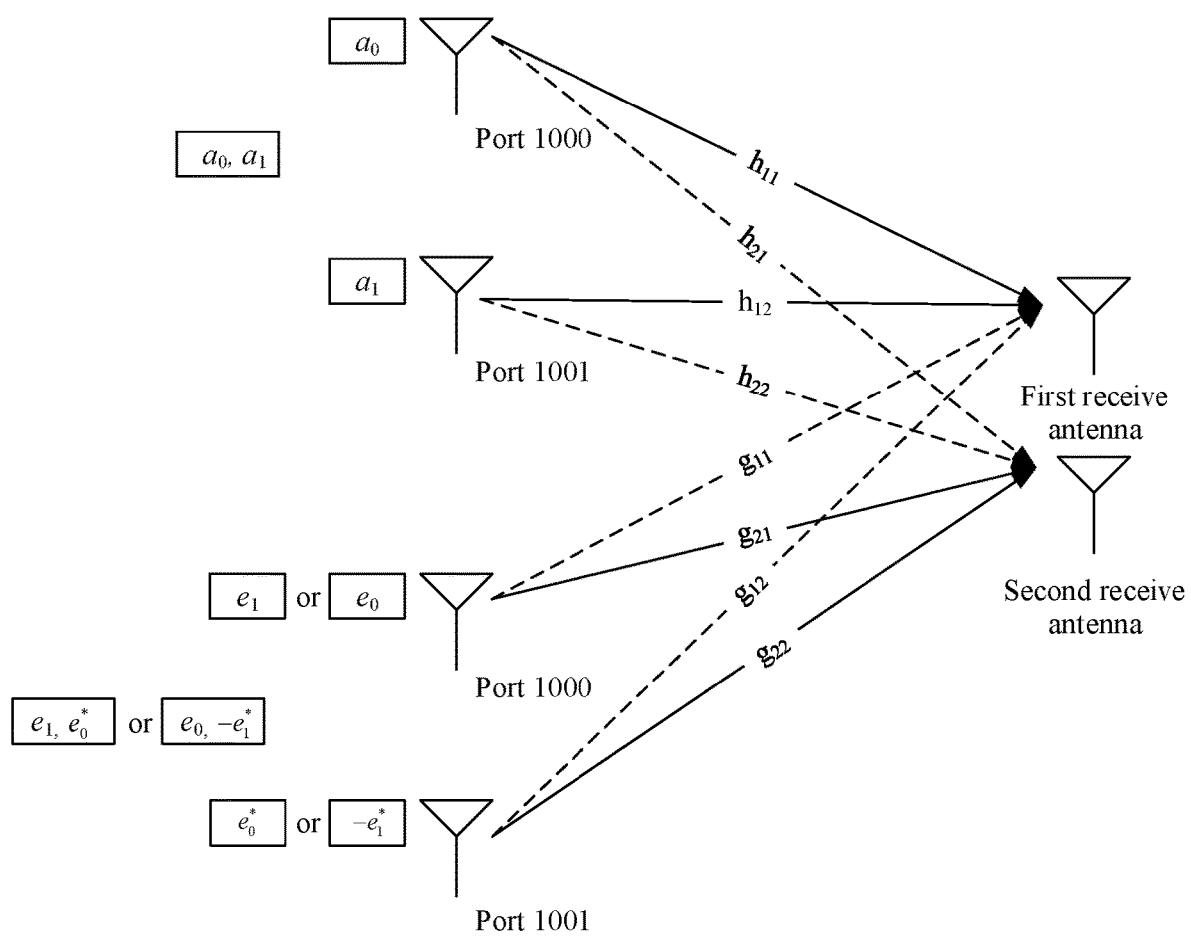

For ease of understanding, the following describes in detail a specific process in which a terminal device determines an interference and noise covariance matrix in different cases with reference to FIG. 13 to FIG. 15. In scenarios shown in FIG. 13 to FIG. 15, the network device may transmit the first data and the first DMRS to the first terminal device over ports 1000 and 1001, and the network device may transmit data and DMRSs to the first terminal device and the second terminal device by using a same time-frequency resource. In addition, the first terminal device may receive signals by using two receive antennas. The signals received by the first terminal device may include a signal sent by the network device to the first terminal device, and may further include a signal sent by the network device to the second terminal device and a noise signal, and the like.

Case 1:

FIG. 13 is a schematic diagram of a scenario according to an embodiment of this application. In case 1, a transmission scheme used by the network device to transmit data to the first terminal device is SFTD, and a transmission scheme used by the network device to transmit data to the second terminal device is also SFTD. The signals received by the first terminal device based on different receive antennas may be represented as follows:

A signal received by a first receive antenna on subcarrier #0 is $s_{10}=h_{11}a_0-h_{12}a^*_1+g_{11}e_0-g_{12}e^*_1+n_{10}$.

A signal received by a second receive antenna on subcarrier #0 is $s_{20}=h_{21}a_0-h_{22}a^*_1+g_{21}e_0-g_{22}e^*_1+n_{20}$.

A signal received by the first receive antenna on subcarrier #1 is $s_{11}=h_{12}a^*_0+h_{11}a_1+g_{12}e^*_0+g_{11}e_1+n_{11}$.

A signal received by the second receive antenna on subcarrier #1 is $s_{21}=h_{22}a^*_0+h_{21}a_1+h_{22}e^*_0+h_{21}e_1+n_{21}$.

Simple transformations are performed on the foregoing four equations. For example, conjugates of $s_{11}$ and $s_{21}$ are calculated to obtain the following equation 1:

$$\begin{bmatrix} s_{10} \\ s_{21} \\ s^*_{11} \\ s^*_{21} \end{bmatrix} = \begin{bmatrix} h_{11} & -h_{12} \\ h_{21} & -h_{22} \\ h^*_{12} & h^*_{11} \\ h^*_{22} & h^*_{21} \end{bmatrix} \begin{bmatrix} a_0 \\ a^*_1 \end{bmatrix} + \begin{bmatrix} g_{11} & -g_{12} \\ g_{21} & -g_{22} \\ g^*_{12} & g^*_{11} \\ g^*_{22} & g^*_{21} \end{bmatrix} \begin{bmatrix} e_0 \\ e^*_1 \end{bmatrix} + \begin{bmatrix} n_{10} \\ n_{20} \\ n^*_{11} \\ n^*_{21} \end{bmatrix} \quad \text{equation 1}$$

$$\begin{bmatrix} s_{10} \\ s_{21} \\ s^*_{11} \\ s^*_{21} \end{bmatrix}$$

is the signals received by the first terminal device.

$$\begin{bmatrix} h_{11} & -h_{12} \\ h_{21} & -h_{22} \\ h^*_{12} & h^*_{11} \\ h^*_{22} & h^*_{21} \end{bmatrix} \begin{bmatrix} a_0 \\ a^*_1 \end{bmatrix}$$

represents a precoded first DMRS sent by the network device to the first terminal device.

$$\begin{bmatrix} h_{11} & -h_{12} \\ h_{21} & -h_{22} \\ h^*_{12} & h^*_{11} \\ h^*_{22} & h^*_{21} \end{bmatrix}$$

represents an equivalent channel matrix.

$$\begin{bmatrix} a_0 \\ a^*_1 \end{bmatrix}$$

represents a first DMRS.

$$\begin{bmatrix} g_{11} & -g_{12} \\ g_{21} & -g_{22} \\ g^*_{12} & g^*_{11} \\ g^*_{22} & g^*_{21} \end{bmatrix} \begin{bmatrix} e_0 \\ e^*_1 \end{bmatrix}$$

represents a precoded second DMRS sent by the network device to the second terminal device.

$$\begin{bmatrix} g_{11} & -g_{12} \\ g_{21} & -g_{22} \\ g^*_{12} & g^*_{11} \\ g^*_{22} & g^*_{21} \end{bmatrix}$$

represents an equivalent channel matrix.

$$\begin{bmatrix} e_0 \\ e^*_1 \end{bmatrix}$$

represents a second DMRS.

$$\begin{bmatrix} n_{10} \\ n_{20} \\ n_{11}^* \\ n_{21}^* \end{bmatrix}$$

represents noise.

As described above, the following may be obtained by substituting $G_{data}e++n_0=s-H_{DMRS}a$ into the foregoing equation 1:

$$\begin{bmatrix} g_{11} & -g_{12} \\ g_{21} & -g_{22} \\ g_{12}^* & g_{11}^* \\ g_{22}^* & g_{21}^* \end{bmatrix}\begin{bmatrix} e_0 \\ e_1^* \end{bmatrix} - \begin{bmatrix} n_{10} \\ n_{20} \\ n_{11}^* \\ n_{21}^* \end{bmatrix} = \begin{bmatrix} s_{10} \\ s_{21} \\ s_{11}^* \\ s_{21}^* \end{bmatrix} - \begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}$$

Then, the following interference and noise covariance matrix may be obtained based on $\overline{R}=E[(s-H_{DMRS}a)^H(s-H_{DMRS}a)]$:

$$\overline{R}=E\left(\left(\begin{bmatrix} s_{10} \\ s_{21} \\ s_{11}^* \\ s_{21}^* \end{bmatrix}-\begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}\right)^H\left(\begin{bmatrix} s_{10} \\ s_{21} \\ s_{11}^* \\ s_{21}^* \end{bmatrix}-\begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}\right)\right)$$

Case 2:

FIG. 14 is a schematic diagram of another scenario according to an embodiment of this application. In case 2, a transmission scheme used by the network device to transmit data to the first terminal device is SFTD, and a transmission scheme used by the network device to transmit data to the second terminal device is TS1. The signals received by the first terminal device based on different receive antennas may be represented as follows:

A signal received by the first receive antenna on subcarrier #0 is $s_{10}=h_{11}a_0-h_{12}a^*_1+g_{11}e_0-g_{12}e^*_1+n_{10}$.

A signal received by a second receive antenna on subcarrier #0 is $s_{20}=h_{21}a_0-h_{22}a^*_1+g_{21}e_0-g_{22}e^*_1+n_{20}$.

A signal received by the first receive antenna on subcarrier #1 is $s_{11}=h_{12}a^*_0+h_{11}a_1+g_{12}e_2+g_{11}e_3+n_{11}$.

A signal received by the second receive antenna on subcarrier #1 is $s_{21}=h_{22}a^*_0+h_{21}a_1+h_{22}e_2+h_{21}e_2+n_{21}$.

Simple transformations are performed on the foregoing four equations. For example, conjugates of $s_{11}$ and $s_{21}$ are calculated to obtain the following equation 2:

$$\begin{bmatrix} s_{10} \\ s_{21} \\ s_{11}^* \\ s_{21}^* \end{bmatrix}=\begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}+\begin{bmatrix} g_{11} & g_{12} & 0 & 0 \\ g_{21} & g_{22} & 0 & 0 \\ 0 & 0 & g_{11}^* & g_{12}^* \\ 0 & 0 & g_{21}^* & g_{22}^* \end{bmatrix}\begin{bmatrix} e_0 \\ e_1 \\ e_2^* \\ e_3^* \end{bmatrix}+\begin{bmatrix} n_{10} \\ n_{20} \\ n_{11}^* \\ n_{21}^* \end{bmatrix} \quad \text{equation 2}$$

$$\begin{bmatrix} s_{10} \\ s_{21} \\ s_{11}^* \\ s_{21}^* \end{bmatrix}$$

is the signals received by the first terminal device.

$$\begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}$$

represents a precoded first DMRS sent by the network device to the first terminal device.

$$\begin{bmatrix} h_{11} & -h_{12} \\ h_{21} & -h_{22} \\ h_{12}^* & h_{11}^* \\ h_{22}^* & h_{21}^* \end{bmatrix}$$

represents an equivalent channel matrix.

$$\begin{bmatrix} a_0 \\ a_1^* \end{bmatrix}$$

represents a first DMRS.

$$\begin{bmatrix} g_{11} & g_{12} & 0 & 0 \\ g_{21} & g_{22} & 0 & 0 \\ 0 & 0 & g_{11}^* & g_{12}^* \\ 0 & 0 & g_{21}^* & g_{22}^* \end{bmatrix}\begin{bmatrix} e_0 \\ e_1 \\ e_2^* \\ e_3^* \end{bmatrix}$$

represents a precoded second DMRS sent by the network device to the second terminal device.

$$\begin{bmatrix} g_{11} & g_{12} & 0 & 0 \\ g_{21} & g_{22} & 0 & 0 \\ 0 & 0 & g_{11}^* & g_{12}^* \\ 0 & 0 & g_{21}^* & g_{22}^* \end{bmatrix}$$

represents an equivalent channel matrix.

$$\begin{bmatrix} e_0 \\ e_1 \\ e_2^* \\ e_3^* \end{bmatrix}$$

represents a second DMRS.

$$\begin{bmatrix} n_{10} \\ n_{20} \\ n_{11}^* \\ n_{21}^* \end{bmatrix}$$

represents noise.

As described above, the following may be obtained by substituting $G_{data}e+n_0=s-H_{DMRS}a$ into the foregoing equation 2:

$$\begin{bmatrix} g_{11} & g_{12} & 0 & 0 \\ g_{21} & g_{22} & 0 & 0 \\ 0 & 0 & g_{11}^* & g_{12}^* \\ 0 & 0 & g_{21}^* & g_{22}^* \end{bmatrix}\begin{bmatrix} e_0 \\ e_1 \\ e_2^* \\ e_3^* \end{bmatrix} - \begin{bmatrix} n_{10} \\ n_{20} \\ n_{11}^* \\ n_{21}^* \end{bmatrix} = \begin{bmatrix} s_{10} \\ s_{21} \\ s_{11}^* \\ s_{21}^* \end{bmatrix} - \begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}$$

Then, the following interference and noise covariance matrix may be obtained based on $\bar{R}=E[(s-H_{DMRS}a)^H(s-H_{DMRS}a)]$:

$$\bar{R} = E\left(\left(\begin{bmatrix} s_{10} \\ s_{21} \\ s_{11}^* \\ s_{21}^* \end{bmatrix} - \begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}\right)^H\left(\begin{bmatrix} s_{10} \\ s_{21} \\ s_{11}^* \\ s_{21}^* \end{bmatrix} - \begin{bmatrix} h_{11} & -h_{12} \\ h_{21} & -h_{22} \\ h_{12}^* & h_{11}^* \\ h_{22}^* & h_{21}^* \end{bmatrix}\begin{bmatrix} a_0 \\ a_1^* \end{bmatrix}\right)\right)$$

Case 3:

FIG. 15 is a schematic diagram of still another scenario according to an embodiment of this application. In case 3, a transmission scheme used by the network device to transmit data to the first terminal device is TS1, and a transmission scheme used by the network device to transmit data to the second terminal device is SFTD.

The signals received by the first terminal device based on different receive antennas may be represented as follows:

A signal received by the first receive antenna on subcarrier #0 is $s_{10}=h_{11}a_0+h_{12}a_1+g_{11}e_0-g_{12}e^*_1+n_{10}$.

A signal received by a second receive antenna on subcarrier #0 is $s_{20}=h_{21}a_0+h_{22}a_1+g_{21}e_0-g_{22}e^*_1+n_{20}$.

A signal received by the first receive antenna on subcarrier #1 is $s_{11}=h_{12}a_0+h_{11}a_1+g_{12}e^*_2+g_{11}e_3+n_{11}$.

A signal received by the second receive antenna on subcarrier #1 is $s_{21}=h_{22}a_0+h_{21}a_1+h_{22}e^*_2+h_{21}e_3+n_{21}$.

Simple transformations are performed on the foregoing four equations. For example, conjugates of $s_{11}$ and $s_{21}$ are calculated to obtain the following equation 3 and equation 4:

$$\begin{bmatrix} s_{10} \\ s_{20} \end{bmatrix} = \begin{bmatrix} h_{11} & h_{12} \\ h_{21} & h_{22} \end{bmatrix}\begin{bmatrix} a_0 \\ a_1 \end{bmatrix} + \begin{bmatrix} g_{11} & -g_{12} \\ g_{21} & -g_{22} \end{bmatrix}\begin{bmatrix} e_0 \\ e_1^* \end{bmatrix} + \begin{bmatrix} n_{10} \\ n_{20} \end{bmatrix} \quad \text{equation 3}$$

$$\begin{bmatrix} s_{11} \\ s_{21} \end{bmatrix} = \begin{bmatrix} h_{11} & h_{12} \\ h_{21} & h_{22} \end{bmatrix}\begin{bmatrix} a_0 \\ a_1 \end{bmatrix} + \begin{bmatrix} g_{11} & g_{12} \\ g_{21} & g_{22} \end{bmatrix}\begin{bmatrix} e_2^* \\ e_3 \end{bmatrix} + \begin{bmatrix} n_{11} \\ n_{21} \end{bmatrix} \quad \text{equation 4}$$

In equation 3, $$\begin{bmatrix} s_{10} \\ s_{20} \end{bmatrix}$$

is the signals received by the first terminal device on subcarrier #0.

$$\begin{bmatrix} h_{11} & h_{12} \\ h_{21} & h_{22} \end{bmatrix}\begin{bmatrix} a_0 \\ a_1 \end{bmatrix}$$

represents a precoded first DMRS sent by the network device to the first terminal device on subcarrier #0.

$$\begin{bmatrix} h_{11} & h_{12} \\ h_{21} & h_{22} \end{bmatrix}$$

represents an equivalent channel matrix.

$$\begin{bmatrix} a_0 \\ a_1 \end{bmatrix}$$

represents a first DMRS.

$$\begin{bmatrix} g_{11} & -g_{12} \\ g_{21} & -g_{22} \end{bmatrix}\begin{bmatrix} e_0 \\ e_1^* \end{bmatrix}$$

represents a precoded second DMRS sent by the network device to the second terminal device on subcarrier #0.

$$\begin{bmatrix} g_{11} & -g_{12} \\ g_{21} & -g_{22} \end{bmatrix}$$

represents an equivalent channel matrix.

$$\begin{bmatrix} e_0 \\ e_1^* \end{bmatrix}$$

represents a second DMRS.

$$\begin{bmatrix} n_{10} \\ n_{20} \end{bmatrix}$$

represents noise.

In equation 4, $$\begin{bmatrix} s_{11} \\ s_{21} \end{bmatrix}$$

is the signals received by the first terminal device on subcarrier #1.

$$\begin{bmatrix} h_{11} & h_{12} \\ h_{21} & h_{22} \end{bmatrix}\begin{bmatrix} a_0 \\ a_1 \end{bmatrix}$$

represents a precoded first DMRS sent by the network device to the first terminal device on subcarrier #1.

$$\begin{bmatrix} h_{11} & h_{12} \\ h_{21} & h_{22} \end{bmatrix}$$

represents an equivalent channel matrix.

$$\begin{bmatrix} a_0 \\ a_1 \end{bmatrix}$$

represents a first DMRS.

$$\begin{bmatrix} g_{11} & g_{12} \\ g_{21} & g_{22} \end{bmatrix} \begin{bmatrix} e_2^* \\ e_3 \end{bmatrix}$$

represents a precoded second DMRS sent by the network device to the second terminal device on subcarrier #1.

$$\begin{bmatrix} g_{11} & g_{12} \\ g_{21} & g_{22} \end{bmatrix}$$

represents an equivalent channel matrix.

$$\begin{bmatrix} e_2^* \\ e_3 \end{bmatrix}$$

represents a second DMRS.

$$\begin{bmatrix} n_{11} \\ n_{21} \end{bmatrix}$$

represents noise.

As described above, the following may be obtained by substituting $G_{data}e + n_0 = s - H_{DMRS}a$ into the foregoing equation 3 and equation 4:

On subcarrier #0, $$\begin{bmatrix} g_{11} & -g_{12} \\ g_{21} & -g_{22} \end{bmatrix} \begin{bmatrix} e_0 \\ e_1^* \end{bmatrix} + \begin{bmatrix} n_{10} \\ n_{20} \end{bmatrix} = \begin{bmatrix} s_{10} \\ s_{20} \end{bmatrix} - \begin{bmatrix} h_{11} & h_{12} \\ h_{21} & h_{22} \end{bmatrix} \begin{bmatrix} a_0 \\ a_1 \end{bmatrix}.$$

On subcarrier #1, $$\begin{bmatrix} g_{11} & g_{12} \\ g_{21} & g_{22} \end{bmatrix} \begin{bmatrix} e_2^* \\ e_3 \end{bmatrix} + \begin{bmatrix} n_{11} \\ n_{21} \end{bmatrix} = \begin{bmatrix} s_{11} \\ s_{21} \end{bmatrix} - \begin{bmatrix} h_{11} & h_{12} \\ h_{21} & h_{22} \end{bmatrix} \begin{bmatrix} a_0 \\ a_1 \end{bmatrix}.$$

Then, the following interference and noise covariance matrices on subcarrier #0 and subcarrier #1 may be obtained based on $\overline{R} = E[(s - H_{DMRS}a)^H (s - H_{DMRS}a)]$:

On subcarrier #0, $$\overline{R} = E\left( \left( \begin{bmatrix} s_{10} \\ s_{20} \end{bmatrix} - \begin{bmatrix} h_{11} & h_{12} \\ h_{21} & h_{22} \end{bmatrix} \begin{bmatrix} a_0 \\ a_1 \end{bmatrix} \right)^H \left( \begin{bmatrix} s_{10} \\ s_{20} \end{bmatrix} - \begin{bmatrix} h_{11} & h_{12} \\ h_{21} & h_{22} \end{bmatrix} \begin{bmatrix} a_0 \\ a_1 \end{bmatrix} \right) \right).$$

On subcarrier #1, $$\overline{R} = E\left( \left( \begin{bmatrix} s_{11} \\ s_{21} \end{bmatrix} - \begin{bmatrix} h_{11} & h_{12} \\ h_{21} & h_{22} \end{bmatrix} \begin{bmatrix} a_0 \\ a_1 \end{bmatrix} \right)^H \left( \begin{bmatrix} s_{11} \\ s_{21} \end{bmatrix} - \begin{bmatrix} h_{11} & h_{12} \\ h_{21} & h_{22} \end{bmatrix} \begin{bmatrix} a_0 \\ a_1 \end{bmatrix} \right) \right).$$

In case 3, because the transmission scheme used by the network device to transmit data to the first terminal device is TS1, and there is no correlation between two REs, interference estimation and data demodulation may be separately performed on each RE.

It may be learned from the foregoing three cases that, regardless of a transmission scheme used by the network device to transmit data to the second terminal device, interference estimation of the first terminal device is not affected. The first terminal device can demodulate data by only determining an equivalent channel matrix based on a transmission scheme used by the network device to transmit data to the first terminal device, and then further determining an interference-noise covariance matrix.

It should be understood that, for ease of understanding only, the foregoing describes a case in which the first DMRS sent to the first terminal device and the second DMRS sent to the second terminal device use a same time-domain resource. However, this shall not constitute any limitation on this application. When the second DMRS sent to the second terminal device and the first DMRS sent to the first terminal device use different time-frequency resources, the foregoing method may also be used to determine the interference and noise covariance matrix. In this case, a signal received by the first terminal device on an RE other than the first RE pair and the second RE pair may be a DMRS and noise that are sent to another terminal device. Assuming that a signal received by the first terminal device on some REs is denoted as t, $t = G_{DMRS}d + N_0$. Based on a similar principle, the first terminal device may obtain an interference and noise covariance matrix $\overline{R} = E(t^H t)$ on these REs. The foregoing describes in detail derivation of an interference and noise covariance matrix. For brevity, details are not described herein again.

Based on the foregoing technical solutions, the first terminal device may estimate the interference and noise covariance matrix based on the received first DMRS and the received second DMRS, without considering a transmission scheme used by another terminal device that causes interference. On a premise of ensuring demodulation performance, the interference and noise covariance matrix may be determined based on a transmission scheme used by the first terminal device to transmit data, for further data demodulation, with no need to traverse various transmission schemes to blindly detect the transmission scheme used by the another terminal device that causes the interference, and no need to consider a transmission scheme used by another terminal device. Therefore, this can greatly reduce interference estimation complexity of the first terminal device, thereby further reducing demodulation complexity.

It should be understood that, for ease of understanding only, the foregoing describes the method provided in this embodiment of this application in detail by using an example in which the network device sends the first data to the first terminal device. However, this shall not constitute any limitation on this application. When a terminal device sends data to the network device, the network device may also receive and demodulate the data by using the same method.

Figure 16:
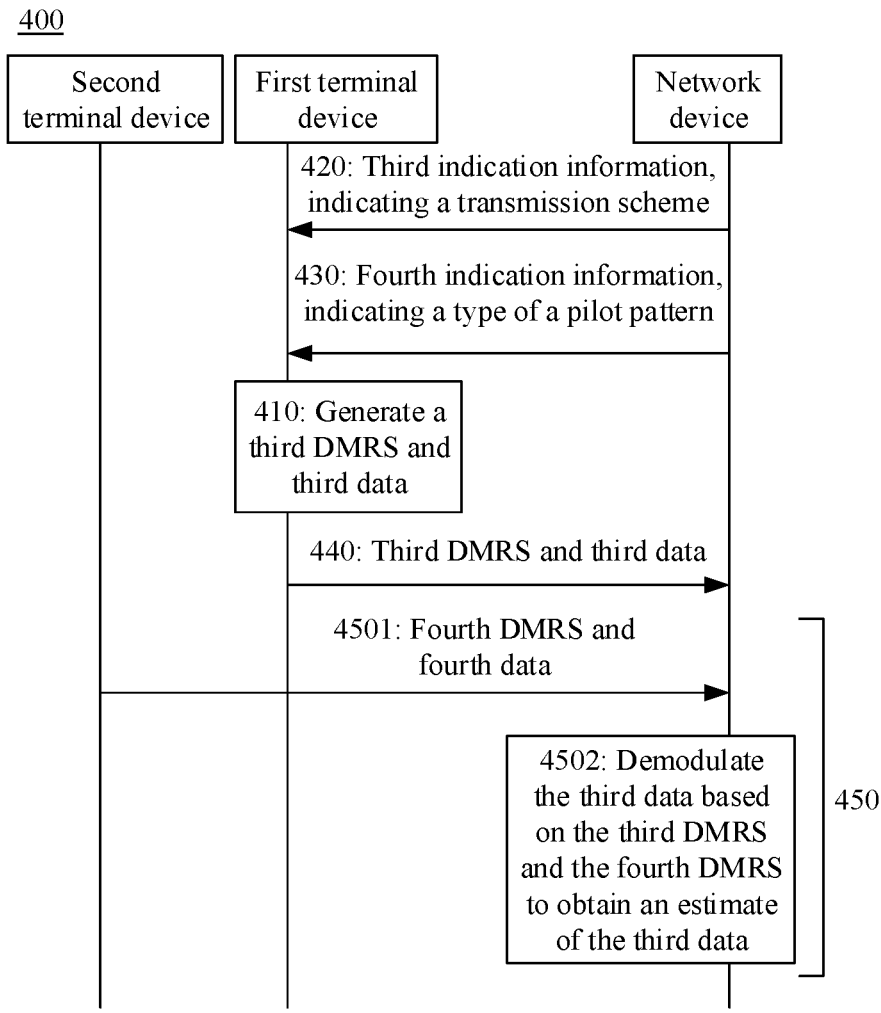
FIG. 16 is a schematic flowchart of a data receiving and sending method according to an embodiment of this application.

FIG. 16 is a schematic flowchart of a data receiving and sending method 400 illustrated from a perspective of device interaction according to another embodiment of this application. The method 400 shown in FIG. 16 may be applied to a scenario in which a plurality of terminal devices transmit data to at least one network device. When a network device (for example, denoted as a first network device) receives uplink data from a terminal device (for example, denoted as a first terminal device), the network device may be interfered with by data transmission of another network device (for example, denoted as a second network device), or may be interfered with by transmission of another terminal device (for example, denoted as a second terminal device). For example, terminal devices in a same cell, such as the first terminal device and the second terminal device, may send data to the first network device on a same time-frequency resource. For another example, terminal devices in different cells may send data to different network devices on a same time-frequency resource. For example, a time-frequency resource used by the first terminal device to send data to the first network device is the same as a time-frequency resource used by the second terminal device to send data to the second network device. Therefore, the network device may also perform interference estimation and data demodulation based on the method 400.

Without loss of generality, the following uses data transmission between the first network device and the first terminal device as an example to describe in detail the data receiving and sending method in this embodiment of this application.

FIG. 16 is the schematic flowchart of the data receiving and sending method 400 illustrated from the perspective of device interaction according to another embodiment of this application. As shown in the figure, the method 400 includes operations 410 to 450. The following describes the operations in the method 400 in detail.

In operation 410, the first terminal device generates a third DMRS and third data.

For ease of distinguishing from the DMRS and the data in the foregoing method 300, in this embodiment, a DMRS sent by the first terminal device to the first network device may be denoted as the third DMRS, and data sent by the first terminal device to the first network device may be denoted as the third data.

In an embodiment, the third DMRS and the third data may undergo same Alamouti coding. Specifically, the first terminal device may determine, based on a transmission scheme of the third data, how to process the third DMRS and the third data. For example, when the transmission scheme is SFTD, the first terminal device may determine to perform Alamouti coding on the third DMRS and the third data in space domain and frequency domain, that is, Alamouti space-frequency coding. When the transmission scheme is STTD, the first terminal device may determine to perform Alamouti coding on the third DMRS and the third data in space domain and time domain, that is, Alamouti space-time coding.

The first terminal device may generate the third DMRS sequence based on the foregoing DMRS sequence generation formula, and then use every two symbols in a plurality of symbols in the third DMRS sequence as one pair to perform Alamouti coding. The third DMRS obtained after Alamouti coding is mapped to a third DMRS port and a fourth DMRS port, and a symbol mapped to the third DMRS port may be associated with a symbol mapped to the fourth DMRS port. It should be understood that, the third DMRS port and the fourth DMRS port are defined for ease of distinguishing from the first DMRS port and the second DMRS port in the foregoing method 300, and this shall not constitute any limitation on this application.

Corresponding to the third DMRS, the first terminal device may perform Alamouti coding on symbols of the third data to obtain symbols respectively mapped to a third data port and a fourth data port, and a symbol mapped to the third data port may also be associated with a symbol mapped to the fourth data port. It should be understood that, the third data port and the fourth data port are defined for ease of distinguishing from the first data port and the second data port in the foregoing method 300, and this shall not constitute any limitation on this application.

If the transmission scheme of the third data is SFTD, the third DMRS and the third data undergo Alamouti space-frequency coding. In an embodiment, the third DMRS is carried in at least one first RE pair. Each first RE pair includes a first RE and a second RE. The first RE and the second RE in each first RE pair are consecutive in frequency domain; or the first RE and the second RE in each first RE pair are separated by at least one subcarrier in frequency domain.

Corresponding to the third DMRS, the third data is carried in at least one second RE pair. Each second RE pair includes a third RE and a fourth RE. The third RE and the fourth RE in each second RE pair are consecutive in frequency domain; or the third RE and the fourth RE in each second RE pair are separated by at least one subcarrier in frequency domain.

Further, in an embodiment, a quantity of subcarriers between the third RE and the fourth RE in each second RE pair is the same as a quantity of subcarriers between the first RE and the second RE in each first RE pair.

If the transmission scheme of the third data is STTD, the third DMRS and the third data undergo Alamouti space-time coding. In an embodiment, the third DMRS is carried in at least one first RE pair. Each first RE pair includes a first RE and a second RE. The first RE and the second RE in each first RE pair are consecutive in time domain; or the first RE and the second RE in each first RE pair are separated by at least one OFDM symbol in time domain.

Corresponding to the third DMRS, the third data is carried in at least one second RE pair. Each second RE pair includes a third RE and a fourth RE. The third RE and the fourth RE in each second RE pair are consecutive in time domain; or the third RE and the fourth RE in each second RE pair are separated by at least one OFDM symbol in time domain.

Further, in an embodiment, a quantity of OFDM symbols between the third RE and the fourth RE in each second RE pair is the same as a quantity of OFDM symbols between the first RE and the second RE in each first RE pair.

In DMRS symbols carried by each first RE pair, a symbol mapped to the fourth DMRS port may be obtained by performing Alamouti coding based on a symbol mapped to the third DMRS port. Corresponding to the third DMRS, in data symbols carried by each second RE pair, the symbol mapped to the fourth data port may be obtained by performing Alamouti coding based on the data symbol mapped to the third data port.

A specific process of mapping the first DMRS and the first data to a time-frequency resource in the two transmission schemes SFTD and STTD is described in detail in the foregoing method 300 with reference to FIG. 4 to FIG. 12. A specific process of operation 410 in this embodiment is similar to a specific process of operation 310 in the foregoing method 300. For brevity, details are not described herein again.

In an embodiment, before operation 410, the method 400 further includes operation 420: The first network device sends third indication information, where the third indication information is used to indicate a transmission scheme used to transmit the third data.

Correspondingly, in operation 420, the first terminal device receives the third indication information, where the third indication information is used to indicate the transmission scheme used to transmit the first data.

In an embodiment, before operation 410, the method 400 further includes operation 430: The first network device sends fourth indication information, where the fourth indication information is used to indicate a type of a pilot pattern.

Correspondingly, in operation 430, the first terminal device receives the fourth indication information, where the fourth indication information is used to indicate the type of the pilot pattern.

After receiving the third indication information, the first terminal device may determine how to process the third DMRS and the third data. For example, when the transmission scheme is SFTD, the first terminal device may determine to perform Alamouti space-frequency coding on the third DMRS and the third data. When the transmission scheme is STTD, the first terminal device may determine to perform Alamouti space-time coding on the third DMRS and the third data.

Further, after receiving the fourth indication information, the first terminal device may determine locations of REs used to carry the third DMRS. Therefore, the first terminal device may perform Alamouti coding on two elements in a same first RE pair that may be mapped to the third DMRS port, to obtain elements in the same first RE pair that are mapped to the fourth DMRS port.

In operation 440, the first terminal device sends the third DMRS and the third data.

Correspondingly, in operation 440, the first network device receives the third DMRS and the third data.

In this embodiment, for example, the third DMRS and the third data may be carried on a PUSCH.

In operation 450, the network device demodulates the third data based on the third DMRS to obtain an estimate of the third data.

In an embodiment, operation 450 includes the following operations:

Operation 4501: The first network device receives a fourth DMRS and fourth data, where the fourth DMRS and the fourth data come from another terminal device, such as the second terminal device.

Operation 4502: The first network device demodulates the third data based on the third DMRS and the fourth DMRS to obtain the estimate of the third data.

The third DMRS and the fourth DMRS may be DMRSs sent by different terminal devices. Correspondingly, the third data and the fourth data may be data sent by different terminal devices. This application sets no limitation thereto. In this embodiment, the third DMRS and the fourth DMRS may occupy a same time-frequency resource, and the third data and the fourth data may also occupy a same time-frequency resource. Therefore, when receiving the third DMRS and the third data, the first network device receives the fourth DMRS and the fourth data from another terminal device (for example, the second terminal device). The fourth DMRS and the fourth data are signals that interfere with the first network device.

Further, operation 4502 may include the following:

the first network device determines an interference and noise covariance matrix based on the third DMRS and the fourth DMRS; and the first network device demodulates the data based on the interference and noise covariance matrix, to obtain the estimate of the data.

In an embodiment, the network device may also determine, based on the foregoing transmission scheme and the type of the pilot pattern, locations and a quantity of REs on which a DMRS is mapped to a time-frequency resource, and may further receive the DMRS at the corresponding locations, so as to estimate an equivalent channel matrix.

A specific process of operation 450 is similar to a specific process of operation 340 in the foregoing method 300. For brevity, details are not described herein again.

Based on the foregoing technical solutions, the network device may estimate the interference and noise covariance matrix based on the received third DMRS and the received fourth DMRS, without considering a transmission scheme used by another network device or terminal device that causes interference. Therefore, on a premise of ensuring demodulation performance, the interference and noise covariance matrix may be determined based on a transmission scheme used by the network device to transmit data, for further data demodulation, with no need to traverse various transmission schemes to blindly detect the transmission scheme used by the another network device that causes the interference, and no need to consider a transmission scheme used by the another terminal device. Therefore, this can greatly reduce interference estimation complexity of the first network device, thereby further reducing demodulation complexity.

It should be noted that the foregoing describes in detail the method provided in this application by using only data transmission as an example. However, this shall not constitute any limitation on an application scenario of the method provided in this application. Based on the data receiving and sending method provided in this application, a person skilled in the art can easily figure out that a variation or replacement of the method may be applied to transmission of a control channel, for example, a PDCCH or a PUCCH. A DMRS and control signaling on a PDCCH undergo same Alamouti coding, or a DMRS and control signaling on a PUCCH undergo same Alamouti coding. Therefore, data transmission or channel control performed by using the method shall all fall within the protection scope of this application.

It should be further noted that, for ease of understanding and description only, the foregoing describes in detail the method provided in the embodiments of this application by using SFTD and STTD as examples. However, this shall not constitute any limitation on this application. The method provided in this application may also be applicable to another diversity transmission scheme, for example, spatial frequency time transmission diversity (spatial frequency time transmission diversity, SFTTD), and Alamouti coding may be performed on a signal in a three-dimensional direction, that is, in space domain, time domain, and frequency domain.

In addition, the Alamouti coding manner is only a possible coding manner used to implement transmit diversity, and shall not constitute any limitation on this application. Based on the method for receiving and sending data provided in this application, a person skilled in the art may easily figure out another possible implementation to replace Alamouti coding to implement transmit diversity. Therefore, the another possible implementation shall also fall within the protection scope of this application.

It should be understood that, sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

The foregoing describes in detail the data receiving and sending method provided in the embodiments of this application with reference to FIG. 3 to FIG. 16. The following describes in detail a communications apparatus provided in the embodiments of this application with reference to FIG. 17 to FIG. 19.

Figure 17:
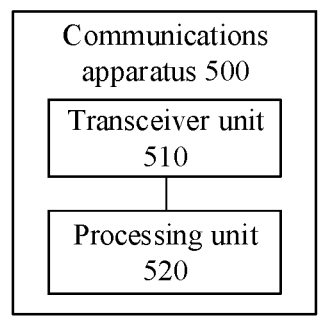
FIG. 17 is a schematic block diagram of a communications apparatus according to an embodiment of this application.

FIG. 17 is a schematic block diagram of a communications apparatus 500 according to an embodiment of this application. As shown in FIG. 17, the communications apparatus 500 may include a transceiver unit 510 and a processing unit 520.

In an embodiment, the communications apparatus 500 may correspond to a terminal device in the foregoing method embodiments, for example, may be a terminal device or a chip configured in a terminal device.

Specifically, the communications apparatus 500 may correspond to a terminal device in the method 300 or 400 according to the embodiments of this application, and the communications apparatus 500 may include units configured to perform the method performed by a terminal device in the method 300 in FIG. 3 or the method 400 in FIG. 16. In addition, the units in the communications apparatus 500 and the other operations and/or functions above are separately used to implement a corresponding procedure of the method 300 in FIG. 3 or the method 400 in FIG. 16.

When the communications apparatus 500 is configured to perform the method 300 in FIG. 3, the transceiver unit 510 may be configured to perform operation 320, operation 330, operation 3401, and operation 350 in the method 300, and the processing unit 520 may be configured to perform operation 3402 in the method 300.

When the communications apparatus 500 is configured to perform the method 400 in FIG. 16, the transceiver unit 510 may be configured to perform operation 420, operation 430, operation 440, and operation 4501 in the method 400, and the processing unit 520 may be configured to perform operation 410 in the method 400.

It should be understood that, a specific process of performing the foregoing corresponding operations by the units is described in detail in the foregoing method embodiments. For brevity, details are not described herein again.

Figure 18:
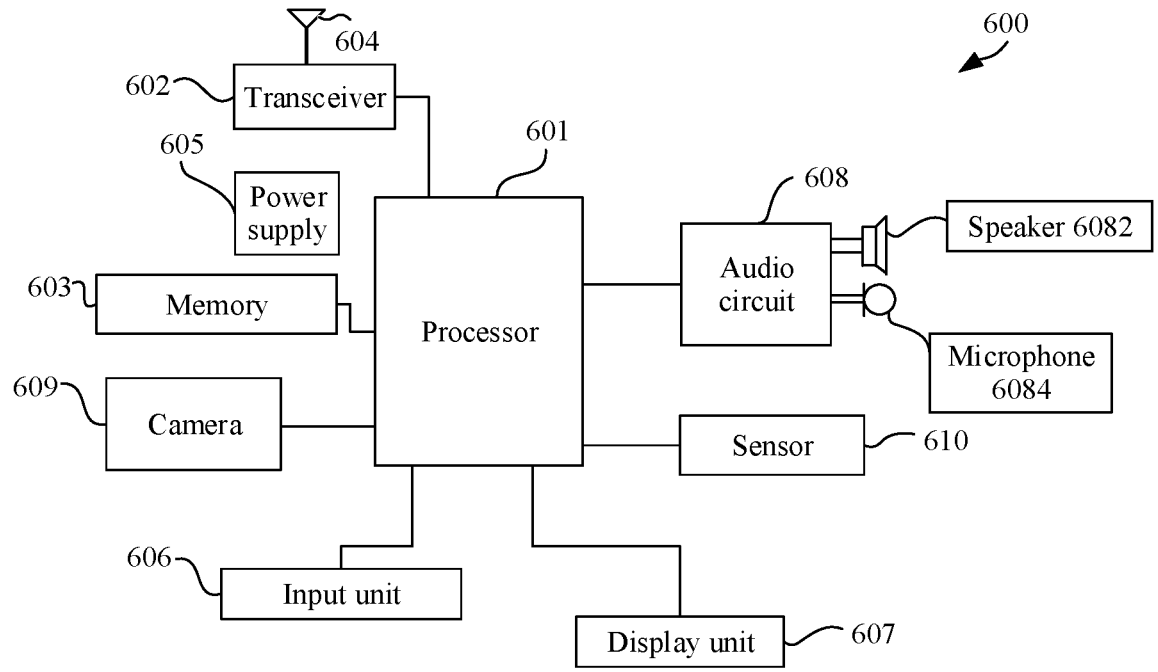
FIG. 18 is a schematic structural diagram of a terminal device according to an embodiment of this application.

It should be understood that, the transceiver unit in the communications apparatus 500 may correspond to a transceiver 602 in a terminal device 600 shown in FIG. 18, and the processing unit 520 in the communications apparatus 500 may correspond to a processor 601 in the terminal device 600 shown in FIG. 18.

In another embodiment, the communications apparatus 500 may correspond to a network device in the foregoing method embodiments, for example, may be a network device or a chip configured in a network device.

Specifically, the communications apparatus 500 may correspond to a network device in the method 300 or 400 according to the embodiments of this application, and the communications apparatus 500 may include units configured to perform the method performed by a network device in the method 300 in FIG. 3 or the method 400 in FIG. 16. In addition, the units in the communications apparatus 500 and the other operations and/or functions above are separately used to implement a corresponding procedure of the method 300 in FIG. 3 or the method 400 in FIG. 16.

When the communications apparatus 500 is configured to perform the method 300 in FIG. 3, the transceiver unit 510 may be configured to perform operation 320, operation 330, operation 3401, and operation 350 in the method 300, and the processing unit 520 may be configured to perform operation 310 in the method 300.

When the communications apparatus 500 is configured to perform the method 400 in FIG. 16, the transceiver unit 510 may be configured to perform operation 420, operation 430, operation 440, and operation 4501 in the method 400, and the processing unit 520 may be configured to perform operation 4502 in the method 400.

It should be understood that, a specific process of performing the foregoing corresponding operations by the units is described in detail in the foregoing method embodiments. For brevity, details are not described herein again.

Figure 19:
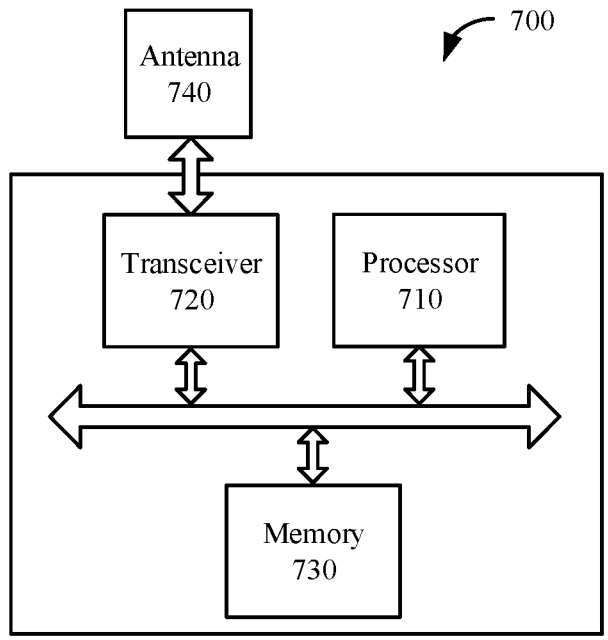
FIG. 19 is a schematic structural diagram of a network device according to an embodiment of this application.

It should further be understood that, the transceiver unit 510 in the communications apparatus 500 may correspond to a transceiver 720 in a network device 700 shown in FIG. 19, and the processing unit 520 in the communications apparatus 500 may correspond to a processor 710 in the network device 700 shown in FIG. 19.

FIG. 18 is a schematic structural diagram of a terminal device 600 according to an embodiment of this application. As shown in the figure, the terminal device 600 includes the processor 601 and the transceiver 602. In an embodiment, the terminal device 600 further includes a memory 603. The processor 601, the transceiver 602, and the memory 603 may communicate with each other by using an internal connection path, and transmit a control signal and/or a data signal. The memory 603 is configured to store a computer program. The processor 601 is configured to invoke and run the computer program from the memory 603, so as to control the transceiver 602 to receive and send a signal. In an embodiment, the terminal device 600 may further include an antenna 604, configured to send, by using a wireless signal, uplink data or uplink control signaling that is output by the transceiver 602.

The processor 601 and the memory 603 may be combined into a processing apparatus, and the processor 601 is configured to execute program code stored in the memory 603 to implement the foregoing functions. In specific implementation, the memory 603 may alternatively be integrated into the processor 601, or independent of the processor 601.

When a program instruction stored in the memory 603 is executed by the processor 601, the processor 601 is configured to control the transceiver 602 to receive a DMRS and data, and demodulate the data based on the DMRS, to obtain an estimate of the data. The DMRS is mapped to a first DMRS port and a second DMRS port, and the DMRS occupies at least one first RE pair. In DMRS modulation symbols carried by each first RE pair, a modulation symbol mapped to the second DMRS port is obtained by performing Alamouti coding on a modulation symbol mapped to the first DMRS port. The data is mapped to a first data port and a second data port, and the data occupies at least one second RE pair. In data modulation symbols carried by each second RE pair, a modulation symbol mapped to the second data port is obtained by performing Alamouti coding on a modulation symbol mapped to the first data port. A plurality of REs in the first RE pair occupy different subcarriers, and a plurality of REs in the second RE pair occupy different subcarriers. Alternatively, a plurality of REs in the first RE pair occupy different symbols, and a plurality of REs in the second RE pair occupy different symbols.

In an embodiment, the terminal device 600 may correspond to a terminal device in the method 300 or 400 according to the embodiments of this application, and the terminal device 600 may include units configured to perform the method performed by a terminal device in the method 300 in FIG. 3 or the method 400 in FIG. 16. In addition, the units in the terminal device 600 and the other operations and/or functions above are separately used to implement a corresponding procedure of the method 300 in FIG. 3 or the method 400 in FIG. 16.

The processor 601 may be configured to perform an action implemented inside a terminal device described in the foregoing method embodiments, and the transceiver 602 may be configured to perform an action of sending from a terminal device to a network device or an action of receiving by a terminal device from a network device described in the foregoing method embodiments. For details, refer to the description in the foregoing method embodiments. Details are not described herein again.

In an embodiment, the terminal device 600 may further include a power supply 605, configured to supply power to various components or circuits in the terminal device.

In addition, for more comprehensive functions of the terminal device, the terminal device 600 may further include one or more of an input unit 606, a display unit 607, an audio circuit 608, a camera 609, a sensor 610, and the like. The audio circuit may further include a speaker 6082, a microphone 6084, and the like.

FIG. 19 is a schematic structural diagram of a network device 700 according to an embodiment of this application. As shown in the figure, the network device 700 includes the processor 710 and the transceiver 720. In an embodiment, the network device 700 further includes a memory 730. The processor 710, the transceiver 720, and the memory 730 may communicate with each other by using an internal connection path, and transmit a control signal and/or a data signal. The memory 730 is configured to store a computer program. The processor 710 is configured to invoke and run the computer program from the memory 730, so as to control the transceiver 720 to receive and send a signal.

The processor 710 and the memory 730 may be combined into a processing apparatus, and the processor 710 is configured to execute program code stored in the memory 730 to implement the foregoing functions. In specific implementation, the memory 730 may alternatively be integrated into the processor 710, or independent of the processor 710.

The network device 700 may further include an antenna 740, configured to send, by using a wireless signal, downlink data or downlink control signaling that is output by the transceiver 720.

When a program instruction stored in the memory 730 is executed by the processor 710, the processor 710 is configured to generate a DMRS and data, and control the transceiver 720 to receive the DMRS and the data. The DMRS is mapped to a first DMRS port and a second DMRS port, and the DMRS occupies at least one first RE pair. In DMRS modulation symbols carried by each first RE pair, a modulation symbol mapped to the second DMRS port is obtained by performing Alamouti coding on a modulation symbol mapped to the first DMRS port. The data is mapped to a first data port and a second data port, and the data occupies at least one second RE pair. In data modulation symbols carried by each second RE pair, a modulation symbol mapped to the second data port is obtained by performing Alamouti coding on a modulation symbol mapped to the first data port. A plurality of REs in the first RE pair occupy different subcarriers, and a plurality of REs in the second RE pair occupy different subcarriers. Alternatively, a plurality of REs in the first RE pair occupy different symbols, and a plurality of REs in the second RE pair occupy different symbols.

In an embodiment, the network device 700 may correspond to a network device in the method 300 or 400 according to the embodiments of this application, and the network device 700 may include units configured to perform the method performed by a network device in the method 300 in FIG. 3 or the method 400 in FIG. 16. In addition, the units in the network device 700 and the other operations and/or functions above are separately used to implement a corresponding procedure of the method 300 in FIG. 3 or the method 400 in FIG. 16. A specific process of performing the foregoing corresponding operations by the units is described in detail in the foregoing method embodiments. For brevity, details are not described herein again.

The processor 710 may be configured to perform an action implemented inside a network device described in the foregoing method embodiments, and the transceiver 720 may be configured to perform an action of sending from a network device to a terminal device or an action of receiving by a network device from a terminal device described in the foregoing method embodiments. For details, refer to the description in the foregoing method embodiments. Details are not described herein again.

It should be understood that, the processor in the embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like.

It should be further understood that, the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may include a random access memory (RAM), which is used as an external cache. According to description that is used as an example but imposes no limitation, random access memories (random access memory, RAM) of many forms are applicable, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

According to the method provided in the embodiments of this application, this application further provides a computer program product. The computer program product includes computer program code. When the computer program code runs on a computer, the computer is enabled to perform the method in the foregoing embodiments. According to the method provided in the embodiments of this application, this application further provides a computer-readable medium. The computer-readable medium includes computer program code. When the computer program code runs on a computer, the computer is enabled to perform the method in the foregoing embodiments. According to the method provided in the embodiments of this application, this application further provides a system, including one or more terminal devices and one or more network devices described above. A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communications apparatus, comprising:
a transceiver to
receive a demodulation reference signal (DMRS) mapped to a first DMRS port and a second DMRS port, wherein the DMRS occupies at least one first resource element (RE) pair, and in DMRS modulation symbols carried by each first RE pair, a modulation symbol mapped to the second DMRS port is obtained by performing Alamouti coding on a modulation symbol mapped to the first DMRS port, and
receive data mapped to a first data port and a second data port, wherein the data occupies at least one second RE pair, and in data modulation symbols carried by each second RE pair, a modulation symbol mapped to the second data port is obtained by performing Alamouti coding on a modulation symbol mapped to the first data port, wherein a plurality of REs in the first RE pair and the second RE pair occupy different subcarriers or occupy different symbols; and
a processor to demodulate the data based on the DMRS to obtain an estimate of the data.

2. The communications apparatus according to claim 1, wherein each first RE pair comprises a first RE and a second RE, which are consecutive in a frequency domain or are separated by at least one subcarrier in the frequency domain.

3. The communications apparatus according to claim 2, wherein each second RE pair comprises a third RE and a fourth RE, which are consecutive in the frequency domain or are separated by at least one subcarrier in the frequency domain.

4. The communications apparatus according to claim 3, wherein a quantity of subcarriers between the third RE and the fourth RE in each second RE pair is the same as a quantity of subcarriers between the first RE and the second RE in each first RE pair.

5. The communications apparatus according to claim 1, wherein each first RE pair comprises a first RE and a second RE, which are consecutive in a time domain or are separated by at least one symbol in the time domain.

6. The communications apparatus according to claim 5, wherein the second RE pair comprises a third RE and a fourth RE, which are consecutive in the time domain or are separated by at least one symbol in the time domain.

7. The communications apparatus according to claim 6, wherein a quantity of symbols between the third RE and the fourth RE in each second RE pair is the same as a quantity of symbols between the first RE and the second RE in each first RE pair.

8. A communications apparatus, comprising:
a processor to
generate a demodulation reference signal (DMRS) mapped to a first DMRS port and a second DMRS port, wherein the DMRS occupies at least one first RE pair, and in DMRS modulation symbols carried by each first RE pair, a modulation symbol mapped to the second DMRS port is obtained by performing Alamouti coding on a modulation symbol mapped to the first DMRS port, and
generate data mapped to a first data port and a second data port, wherein the data occupies at least one second RE pair, and in data modulation symbols carried by each second RE pair, a modulation symbol mapped to the second data port is obtained by performing Alamouti coding on a modulation symbol mapped to the first data port, wherein a plurality of REs in the first RE pair and the second RE pair occupy different subcarriers or occupy different symbols; and
a transceiver to send the DMRS and the data.

9. The communications apparatus according to claim 8, wherein each first RE pair comprises a first RE and a second RE, which are consecutive in a frequency domain or are separated by at least one subcarrier in the frequency domain.

10. The communications apparatus according to claim 9, wherein each second RE pair comprises a third RE and a fourth RE, which are consecutive in a frequency domain or are separated by at least one subcarrier in the frequency domain.

11. The communications apparatus according to claim 10, wherein a quantity of subcarriers between the third RE and the fourth RE in each second RE pair is the same as a quantity of subcarriers between the first RE and the second RE in each first RE pair.

12. The communications apparatus according to claim 8, wherein each first RE pair comprises a first RE and a second RE, which are consecutive in a time domain or are separated by at least one symbol in the time domain.

13. The communications apparatus according to claim 12, wherein the second RE pair comprises a third RE and a fourth RE, which are consecutive in the time domain or are separated by at least one symbol in the time domain.

14. The communications apparatus according to claim 13, wherein a quantity of symbols between the third RE and the fourth RE in each second RE pair is the same as a quantity of symbols between the first RE and the second RE in each first RE pair.

15. A communications method, comprising:
receiving a demodulation reference signal (DMRS) mapped to a first DMRS port and a second DMRS port, wherein the DMRS occupies at least one first resource element (RE) pair, and in DMRS modulation symbols carried by each first RE pair, a modulation symbol mapped to the second DMRS port is obtained by performing Alamouti coding on a modulation symbol mapped to the first DMRS port;

receiving data mapped to a first data port and a second data port, wherein the data occupies at least one second RE pair, and in data modulation symbols carried by each second RE pair, a modulation symbol mapped to the second data port is obtained by performing Alamouti coding on a modulation symbol mapped to the first data port, wherein a plurality of REs in the first RE pair and the second RE pair occupy different subcarriers or occupy different symbols; and demodulating the data based on the DMRS to obtain an estimate of the data.

16. The method according to claim 15, wherein each first RE pair comprises a first RE and a second RE, which are consecutive in a frequency domain or are separated by at least one subcarrier in the frequency domain.

17. The method according to claim 16, wherein each second RE pair comprises a third RE and a fourth RE, which are consecutive in the frequency domain or are separated by at least one subcarrier in the frequency domain.

18. The method according to claim 17, wherein a quantity of subcarriers between the third RE and the fourth RE in each second RE pair is the same as a quantity of subcarriers between the first RE and the second RE in each first RE pair.

19. The method according to claim 15, wherein each first RE pair comprises a first RE and a second RE, which are consecutive in a time domain or are separated by at least one symbol in the time domain.

20. The method according to claim 19, wherein the second RE pair comprises a third RE and a fourth RE, which are consecutive in the time domain or are separated by at least one symbol in the time domain.

* * * * *